(12) United States Patent
Kato

(10) Patent No.: US 6,302,537 B1
(45) Date of Patent: Oct. 16, 2001

(54) OIL-BASED INK FOR ELECTROSTATIC TYPE INK JET PROCESS

(75) Inventor: Eiichi Kato, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/428,760

(22) Filed: Oct. 28, 1999

(30) Foreign Application Priority Data

Oct. 30, 1998 (JP) .................................................. 10-310947
Mar. 4, 1999 (JP) .................................................. 11-057337

(51) Int. Cl.$^7$ .................................................. G01D 11/00
(52) U.S. Cl. ................... 347/100; 106/31.72; 430/286.1
(58) Field of Search ............................ 347/95, 100, 105; 106/31.72, 31.73, 31.58, 31.27, 31.75; 430/114, 115, 63, 284, 286.1; 101/462; 523/160

(56) References Cited

U.S. PATENT DOCUMENTS

| | | | | |
|---|---|---|---|---|
| 4,599,288 | * | 7/1986 | Fuchizawa | 430/63 |
| 4,840,865 | * | 6/1989 | Kato et al. | 430/114 |
| 4,952,481 | * | 8/1990 | Seio et al. | 430/28 |
| 5,055,369 | * | 10/1991 | Kato et al. | 430/114 |
| 5,275,916 | * | 1/1994 | Kato | 430/286 |
| 5,298,357 | * | 3/1994 | Hattori et al. | 430/115 |
| 5,582,106 | * | 12/1996 | Kanda et al. | 101/462 |

* cited by examiner

Primary Examiner—N. Le
Assistant Examiner—Anh T. N. Vo

(74) Attorney, Agent, or Firm—Reed Smith LLP

(57) ABSTRACT

An oil-based ink for an electrostatic ink jet process, comprising: a nonaqueous carrier liquid having an electric resistance of $10^9$ Ωcm or more and a dielectric constant of 3.5 or less; and chargeable resin particles dispersed in the nonaqueous carrier liquid, wherein the resin particles dispersed are copolymer resin particles obtained by a polymerization granulation of a solution containing: at least one monofunctional monomer (A) which is soluble in a nonaqueous solvent and becomes insoluble in the nonaqueous solvent by polymerization; at least one monofunctional monomer (B) having an amino group represented by formula (I) shown below and being copolymerizable with the monomer (A) and at least one resin for dispersion stabilization (P) comprising a component represented by formula (II) shown below:

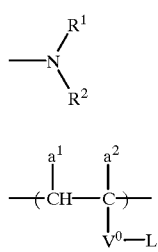

The symbols in the above formulae are defined in the specification.

20 Claims, 4 Drawing Sheets

OIL-BASED INK FOR ELECTROSTATIC TYPE INK JET PROCESS

FIELD OF THE INVENTION

The present invention relates to an oil-based ink for an ink jet process of an electrostatic type which is used for the formation of image by an ink jet recording system of an electrostatic type (electrostatically inducing type or electrostatically attractive type).

BACKGROUND OF THE INVENTION

The ink jet recording system is a recording method capable of printing at a high speed in low noise, and recently has become rapidly widespread.

The ink jet recording system comprises discharging a liquid ink having high fluidity from a narrow nozzle to recording paper and is divided into a continuous discharging system and an on-demand discharging system. The continuous discharging system includes an electrostatic type (Sweet type, Hertz type), and the on-demand discharging system includes a piezoelectric type, a thermal ink jet type and an electrostatically accelerating type, as well known in the art.

Of the ink jet recording system of on-demand type utilizing static electricity, a method called an electrostatically accelerating type ink jet or slit jet is known as described in Susumu Ichinose and Yuuji Ooba, Denshi Tsusin Gakkai Ronbunshi, Vol. J66-C, No. 1, page 47 (1983) and Tadayoshi Oono and Mamoru Mizuguchi, Gazo Denshi Gakkaishi, Vol. 10, No. 3, page 157 (1981). Such an ink jet recording method is also described more specifically, for example, in JP-A-56-170, JP-A-56-4467 and JP-A-57-151374 (the term "JP-A" as used herein means an "unexamined published Japanese patent application").

According to the method, ink is supplied from an ink tank to a slit-shaped ink chamber having many electrodes arranged in inner surfaces of slit-shaped ink retaining part and when a high voltage is selectively applied to the electrodes, the ink neighboring to the electrode is discharged on a recording paper closely positioned against the slits, thereby conducting recording.

A method which does not use such a slit-shaped recording head is also known. In JP-A-61-211048, there is described a method in which pores of a film-like ink retainer having plural pores are filled with ink and the ink in the pores is transferred to a recording paper by applying selectively a voltage to the ink using a multi-needle electrode.

It is believed that the theory of the ink flight is that the high voltage applied to the electrode arranged pours electric charge into the ink adjacent to the electrode and the charged ink neighboring to the electrode is ejected upon the electrostatic power generated. Therefore, the ink is normally not charged but only when the voltage is applied, the ink neighboring to the electrode is charged to get power for the ejection.

The ink employed for these methods is that having electric resistance of from about $10^6$ to about $10^8$ Ωcm. Since water has low electric resistance, an oily solvent containing a coloring agent such as a dye dispersed therein with a dispersing aide such as a surface active agent to control the electric resistance thereof is ordinarily employed.

Further, various proposals for controlling the properties of oil-based ink have been made. For example, there are a method of controlling viscosity and specific resistance of the oil-based ink as described in JP-B-52-13127, a method of controlling dielectric constant of a dispersion medium used in the ink and specific resistance of the ink as described in JP-A-53-29808, and a method of varying the dispersion medium for the oil-based ink or a method of incorporating a specific compound into the ink composition as described in JP-A-3-79677, JP-A-3-64377, JP-A-4-202386 and JP-A-7-109431.

However, the oil-based ink using these known techniques are still insufficient in view of their properties, for example, preservation stability of the oil-based ink, reproducibility of recording image at the time of repeated use of the ink, blur of the ink on an image receiving material, clogging of the ink in a nozzle or an ink delivery channel, and stability on ink ejection. More improvements in these properties have been therefore desired.

Another ink jet technique of an electrostatic type is described in WO 93/11866. This method comprises, after supplying ink containing charged particles or particles which are chargeable under an electric field dispersed therein to an ink ejection apparatus, a series of steps composed of (1) forming ink meniscus at the tip of an ejection electrode for ejecting the ink, (2) increasing particle density in the ink meniscus upon electrophoretic concentration of particles, and (3) ejecting agglomerations of the particles away from the ejection electrode by forming an electric field between the ejection electrode and a counter electrode bearing a recording medium.

This method which does not use a nozzle structure contrary to conventional methods has many advantages in that ink containing dispersed particles such as pigment can be ejected as minute droplets having a particle size of several μm, in that the droplet ejected can have a high concentration of particles, and in that a dot size of image can be varied by changing a size of the droplet by means of controlling an ejection signal.

Accordingly, images composed of pigment having good light-fastness and water-resistance can be formed and clear images of high resolution and high density including continuous gradation dot images can be obtained.

The oil-based ink to be used include those comprising an electrically insulating liquid having an electric resistance of $10^9$ Ωcm or more containing insoluble and chargeable particles and charging agents therein as described in WO 95/1404 and WO 96/10058.

Oil-based ink in which an amount of charge of particles or an average particle size of particles is defined in the specific range as described in JP-A-9-193389 and JP-A-8-291267, and oil-based ink in which thermal properties of solid material in the ink composition are specified as described in JP-A-9-137094 are also proposed.

However, when ink jet recording was conducted using such known oil-based ink, due to unstable ink ejection or insufficient concentration of pigment particles in the ink, disappearance or blur of image formed and poor image density, particularly in a solid image area were observed. Further, in case of using ink preserved for some time, an ejection condition such as a voltage applied was varied from the use of fresh ink and a rate of concentration and ejection remarkably changed. That is, a problem that quality of image obtained varied depending on the preservation condition of the ink arised.

With development in business appliances and progress in office automation in recent years, a plate-making system wherein an image is formed on a lithographic printing plate precursor comprising a water-resistant support having provided thereon an image-receiving layer in a various manner to prepare an offset lithographic printing plate has become widespread in the field of small-scale commercial printing. The ink jet recording method can be employed for the image formation in such a plate-making system. However, when printing was actually conducted using a printing plate having clear images formed using conventional oil-based ink, only several hundred sheets of prints having clear images could be obtained. This is clearly not satisfactory to printing durability. Specifically, there is a problem that the strength of ink particles fixed on the printing plate is insufficient for offset printing.

SUMMARY OF THE INVENTION

Therefore, an object of the present invention is to provide an oil-based ink for an ink jet process of an electrostatic type which is excellent in ejection stability of ink, clear image formation and image strength.

Another object of the present invention is to provide an oil-based ink for an ink jet process of an electrostatic type which prepares a printing plate capable of providing a large number of prints having clear images.

A further object of the present invention is to provide an oil-based ink for an ink jet process of an electrostatic type which is excellent in redispersibility and preservation stability of dispersed particles, does not cause clogging in an ink delivery channel and ensures stable ink ejection.

Other object of the present invention will become apparent from the following description.

It has been found that these objects of the present invention are accomplished by an oil-based ink for an ink jet process of an electrostatic type comprising chargeable resin particles dispersed in a nonaqueous carrier liquid having an electric resistance of $10^9$ Ωcm or more and a dielectric constant of 3.5 or less, wherein the resin particles dispersed are copolymer resin particles obtained by a polymerization granulation of a solution containing at least one monofunctional monomer (A) which is soluble in a nonaqueous solvent and becomes insoluble in the nonaqueous solvent by polymerization, at least one monofunctional monomer (B) having an amino group represented by formula (I) shown below and being copolymerizable with the monomer (A), and at least one resin for dispersion stabilization (P) comprising a component represented by formula (II) shown below:

(I)

in formula (I), $R^1$ and $R^2$, which may be the same or different, each represents a hydrogen atom or a hydrocarbon group having from 1 to 22 carbon atoms, or $R^1$ and $R^2$ may combine with each other to form a ring together with the nitrogen atom;

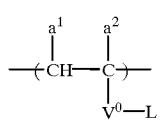

(II)

in formula (II), $V^0$ represents —COO—, —OCO—, —(CH$_2$)$_r$COO—, —(CH$_2$)$_r$OCO—, —O— or

(wherein X represents a direct bond, —O—, —OCO— or —COO—); r represents an integer of 1 to 12; L represents an alkyl group having from 8 to 32 carbon atoms or an alkenyl group having from 8 to 32 carbon atoms; $a^1$ and $a^2$, which may be the same or different, each represents a hydrogen atom, a halogen atom, a cyano group, a hydrocarbon group, —COO—$D^1$ or —COO—$D^1$ linked through a hydrocarbon group (wherein $D^1$ represents a hydrogen atom or a hydrocarbon group).

BRIEF DESCRIPTION OF THE ACCOMPANYING DRAWINGS

Figure 1:
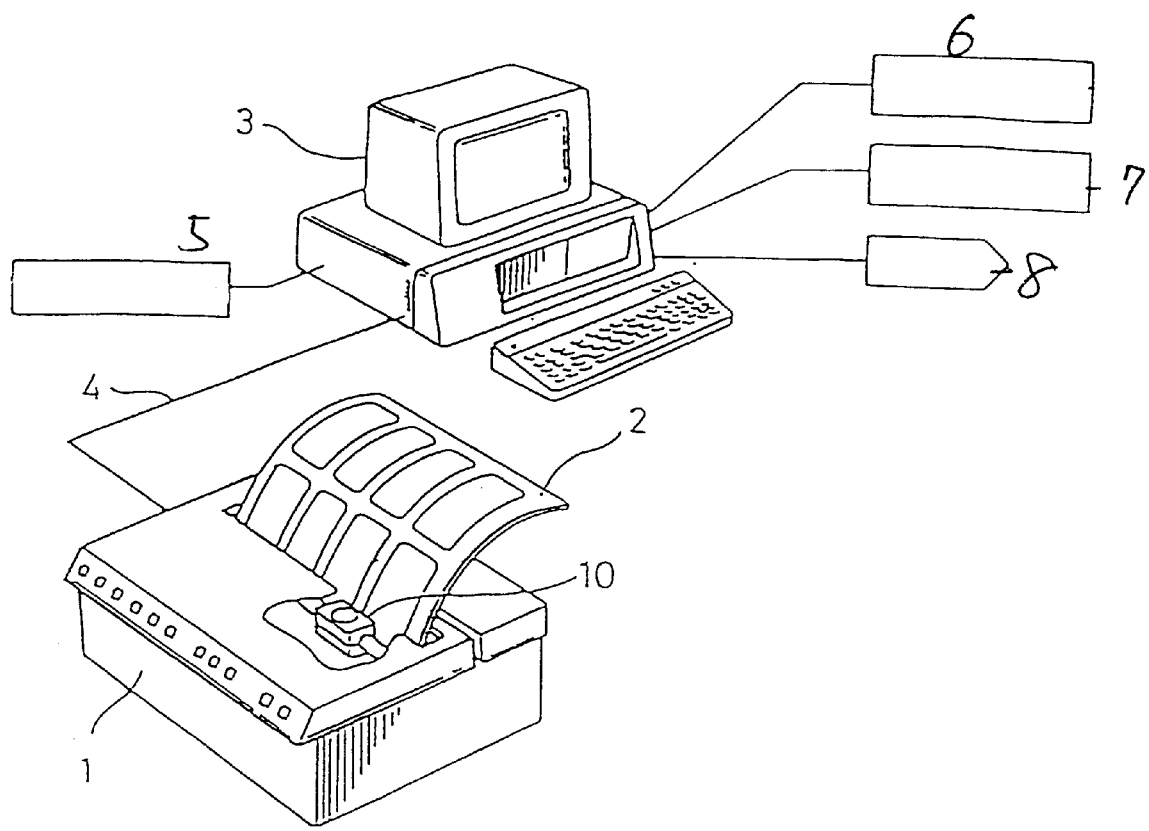
FIG. 1 is a schematic view showing an example of a device system to which the present invention is applied.

In these figures, the numerals denote the following members, respectively.

1 Ink jet recording device
2 Lithographic printing plate precursor (Master)
3 Computer
4 Bus
5 Video camera
6 Hard disk
7 Floppy disk
8 Mouse
10 Ink jet recording head
11 Ink jet recording head
14 Body of head
15 Meniscus regulation board
16 Meniscus regulation board
17 Ejection electrode
18 Ink groove
19 Separator wall
20 Ejection part
20' Ejection part
21 Separator wall
22 Tip part of separator wall
31 Drum-shaped counter electrode
32 Recording medium
33 Electric source
34 Recording head
35 Ink supplying pump
36 Ink tank
37 Waste liquor tank

DETAILED DESCRIPTION OF THE INVENTION

The present invention also includes the following embodiments.

(1) The oil-based ink for an ink jet process of an electrostatic type as described above, wherein the resin particles dispersed are copolymer resin particles obtained by a polymerization granulation of a solution further containing at least one monofunctional monomer (C) having a —$PO_3H_2$ group and being copolymerizable with the monomer (A)

(2) The oil-based ink for an ink jet process of an electrostatic type as described above, wherein the resin for dispersion stabilization (P) contains a polymerizable double bond group represented by formula (III) shown below at one terminal of the polymer main chain thereof or in a substituent of a copolymer component constituting the polymer chain thereof:

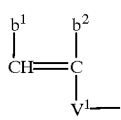

(III)

in formula (III), $V^1$ represents —COO—, —OCO—, —($CH_2$)$_s$COO—, —($CH_2$)$_s$OCO—, —O—, —$SO_2$—, —CONHCOO—, —CONHCONH—, —CON($D^2$)—, —$SO_2N(D^2)$— or a phenylene group (wherein $D^2$ represents a hydrogen atom or a hydrocarbon group having from 1 to 22 carbon atoms, and s represents an integer of 1 to 4); and $b^1$ and $b^2$, which may be the same or different, each has the same meaning as defined for $a^1$ or $a^2$ in formula (II).

(3) The oil-based ink for an ink jet process of an electrostatic type as described above, wherein the resin particles dispersed are copolymer resin particles obtained by a polymerization granulation of a solution further containing at least one monomer (D) represented by formula (IV) shown below:

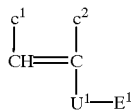

(IV)

in formula (IV), E1 represents an aliphatic group having at least 8 carbon atoms or a substituent having a total number of atoms of 8 or more, provided that hydrogen atoms directly attached to a carbon or nitrogen atom are excluded from the number, and represented by formula (IVa) shown below:

(IVa)

in formula (IVa), $R^{21}$ represents a hydrogen atom or an aliphatic group having from 1 to 18 carbon atoms; $B^1$ and $B^2$, which may be the same or different, each represents —O—, —S—, —CO—, —$CO_2$—, —OCO—, —$SO_2$—, —N($R^{22}$)—, —CON($R^{22}$)—, —N($R^{22}$)CO—, —N($R^{22}$)$SO_2$—, —$SO_2N(R^{22})$—, —$NHCO_2$— or —NHCONH— (wherein $R^{22}$ has the same meaning as defined for $R^{21}$ above); $A^1$ and $A^2$, which may be the same or different, each represents at least one group selected from the group consisting of a group represented by formula (IVb) shown below and a hydrocarbon group having from 1 to 18 carbon atoms:

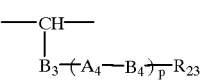

(IVb)

in formula (IVb), $B^3$ and $B^4$, which may be the same or different, each has the same meaning as defined for $B^1$ or $B^2$ above; $A^4$ represents a hydrocarbon group having from 1 to 18 carbon atoms; $R^{23}$ has the same meaning as defined for $R^{21}$ above; and m, n and p, which may be the same or different, each represents an integer of from 0 to 4, provided that the sum of m and n is not 0;

in formula (IV), $U^1$ represents —COO—, —CONH—, —CON($E^2$)— (wherein $E^2$ represents an aliphatic group or a substituent represented by formula (IVa) described above), —OCO—, —CONHCOO—, —$CH_2COO$—, —($CH_2$)$_s$OCO— (wherein s represents an integer from 1 to 4), —O— or —$C_6H_4$—COO—; and $c^1$ and $c^2$, which may be the same or different, each presents a hydrogen atom, an alkyl group, a halogen atom, a cyano group, —COO—$E^3$ or —$CH_2COO$—$E^3$ (wherein $E^3$ represents an aliphatic group).

The oil-based ink according to the present invention is described in more detail below.

The oil-based ink according to the present invention is characterized by comprising chargeable copolymer resin particles dispersed in an electrically insulating nonaqueous carrier liquid wherein the chargeable copolymer resin particles are obtained by a polymerization granulation of a solution containing a monomer being insolubilized, a monomer having an amino group and a resin for dispersion stabilization.

The nonaqueous carrier liquid having an elecriec resistance of $10^9$ Ωcm or more and a dielectric constant of 3.5 or less used in the oil-based ink according to the present invention preferably includes a straight chain or branched aliphatic hydrocarbon, an alycyclic hydrocarbon, an aromatic hydrocarbon, a halogen-substituted product thereof, and a silicone solvent such as a silicone liquid and a silicone oil.

Specific examples of the hydrocarbon solvent include pentane, isoheptane, octane, isooctane, decane, isodecane, decalin, nonane, dodecane, isododecane, cyclohexane, cyclooctane, cyclodecane, benzene, toluene, xylene, mesitylene Isopar E, Isopar G, Isopar H, Isopar L (Isopar: trade name of Exxon Co.), Shellsol 70, Shellsol 71 (Shellsol: trade name of Shell Oil Co.), and Amsco OME and Amsco 460 (Amsco: trade name of American Mineral Spirits Co.).

Specific examples of the halogen-substituted hydrocarbon solvent include fluorocarbon solvents, for example, perfluoro alkanes represented by $C_nF_{2n+2}$, e.g., $C_7F_{16}$ or $C_8F_{18}$ (Florinate PF5080, Florinate PF5070 both manufactured by Sumitomo 3M Ltd.), fluorine-based inert liquids (e.g., Florinate FC Series manufactured by Sumitomo 3M Ltd.), fluorocarbons (e.g., Critox GPL Series manufactured by Du Pont Japan Ltd.), flons (e.g., HCFC-141b manufactured by Daikin Industries, Ltd.) and iodinated fluorocarbons, e.g., $F(CF_2)_4CH_2CH_2I$ or $F(CF_2)_xI$ (I-1420, I-1600 both manufactured by Daikin Finechemical Laboratory).

Specific examples of the silicone solvent including the silicone liquid and silicone oil include dialkyl polysiloxane (e.g., hexamethyl disiloxane, tetramehtyl disiloxane, octamethyl trisiloxane, hexamethyl trisiloxane, heptamethyl trisiloxane, decamethyl tetrasiloxane, trifluoropropyl heptamethyl trisiloxane or diethyl tetramehtyl disiloxane), cyclic dialkyl polysiloxane (e.g., hexamethyl cyclotrisiloxane, octamethyl cyclotetrasiloxane, tetramethyl cyclotetrasiloxane or tetra(trifluoropropyl) Ltetramethyl cyclotetrasiloxane), and methylphenylsilocone oils (e.g., KF 56 or KF 58 both manufactured by Shin-Etsu Silicone Co., Ltd.).

These solvents can be used individually or as a mixture of two or more thereof. The upper limit of the electric resistance of the nonaqueous carrier liquid is preferably about $10^{16}$ Ωcm, and the lower limit value of the dielectric constant thereof is preferably about 1.80.

The nonaqueous dispersed resin particles (hereinafter also referred to as "latex particles"), which are the most important constituent in the oil-based ink of the present invention, are those obtained by polymerization granulation in a nonaqueous solvent containing at least one monofunctional monomer (A) and at least one monofunctional monomer (B) having an amino group represented by formula (I) in the presence of a resin for dispersion stabilization (P) containing the specific component represented by formula (II).

As the nonaqueous solvent, that miscible with the non-aqueous carrier liquid of the oil-based ink described above is basically usable.

Specifically, as the solvent used in the preparation of the dispersed resin particles, any solvent may be used as far as it is miscible with the above-described carrier liquid. Preferred examples thereof include a straight chain or branched aliphatic hydrocarbon, an alicyclic hydrocarbon, an aromatic hydrocarbon and a halogen-substituted product thereof. For example, octane, isooctane, decane, isodecane, decalin, nonane, dodecane, isododecane, Isopar E, Isopar G, Isopar H, Isopar L, Shellsol 70, Shellsol 71, Amsco OME and Amsco 460 can be used individually or as a mixture thereof.

An organic solvent which can be used by mixing together with the nonaqueous solvent includes an alcohol (e.g., ethyl alcohol, propyl alcohol, butyl alcohol, ethylene glycol monomethyl ether, or a fluorinated alcohol), a ketone (e.g., methyl ethyl ketone, acetophenone, or cyclohexanone), a carboxylic acid ester (e.g., methyl acetate, ethyl acetate, propyl acetate, butyl acetate, methyl propionate, ethyl propionate, or ethylene glycol monomethyl ether acetate), an ether (e.g., dipropyl ether, ethylene glycol dimethyl ether, tetrahydrofuran, or dioxane) and a halogenated hydrocarbon (e.g., chloroform, dichloroethane, or methylchloroform).

The organic solvent used together with the nonaqueous solvent is desirably removed by distillation under heating or a reduced pressure after polymerization granulation. However, even if it is introduced into oil-based ink as a latex particle dispersion, no problem is encountered as far as the requirements that the electric resistance of the ink is $10^9$ Ωcm or more and that the dielectric constant thereof is 3.5 or less are satisfied.

It is ordinarily preferred to employ a solvent same as the carrier liquid as described above in the stage of the preparation of a resin dispersion. Therefore, a straight chain or branched aliphatic hydrocarbon, an alicyclic hydrocarbon, an aromatic hydrocarbon and a halogenated hydrocarbon are preferably used.

The monofunctional monomer (A) for use in the present invention may be any monofunctional monomer as far as it is soluble in a nonaqueous solvent, but insolubilized by polymerization. Specific examples thereof include a monomer represented by the following formula (V):

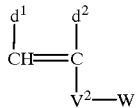

(V)

in formula (V), $V^2$ represents —COO—, —OCO—, —CH$_2$OCO—, —CH$_2$COO—, —O—, —CONHCOO—, —CONHOCO—, —SO$_2$—, —CON(D$^3$)—, —SO$_2$N (D$^3$)— or a phenylene group (phenylene group being hereinafter described as "Ph-" sometimes, and including 1,2-, 1,3- and 1,4-phenylene groups), in which D$^3$ represents a hydrogen atom or an aliphatic group having from 1 to 8 carbon atoms which may be substituted (e.g., methyl, ethyl, propyl, butyl, 2-chloroethyl, 2-bromoethyl, 2-cyanoethyl, 2-hydroxyethyl, benzyl, chlorobenzyl, methylbenzyl, methoxybenzyl, phenethyl, 3-phenylpropyl, dimethylenzyl, fluorobenzyl, 2-methoxyethyl, or 3-methoxypropyl);

W represents a hydrogen atom or an aliphatic group having from 1 to 6 carbon atoms which may be substituted (e.g., methyl, ethyl, propyl, butyl, 2-chloroethyl, 2,2-dichloroethyl, 2,2,2-trifluoroethyl, 2-bromoethyl, 2-hydroxyethyl, 2-hydroxypropyl, 2,3-dihyroxypropyl, 2-hydroxy-3-chloropropyl, 2-cyanoethyl, 3-cyanopropyl, 2-nitroethyl, 2-methoxyethyl, 2-methanesulfonylethyl, 2-ethoxyethyl, 3-bromopropyl, 4-hydroxybutyl, 2-furfurylethyl, 2-thienylethyl, 2-carboxyethyl, 3-carboxypropyl, 4-carboxybutyl, 2-carboxyamidoethyl, 3-sulfoamidopropyl, 2-Nmethylcarboxyamidoethyl, cyclopentyl, chlorocyclohexyl, or dichlorohexyl); and d$^1$ and d$^2$, which may be the same or different, each preferably represents a hydrogen atom, a halogen atom (e.g., chlorine, or bromine), a cyano group, an alkyl group having from 1 to 3 carbon atoms (e.g., methyl, ethyl, or propyl), —COO—G$^1$ or —CH$_2$COO—G$^1$ (wherein G$^1$ represents a hydrogen atom or a hydrocarbon group having 10 or less carbon atoms which may be substituted (e.g., an alkyl, alkenyl, aralkyl, or aryl group).

Specific examples of the monofunctional monomer (A) include a vinyl ester or allyl ester of an aliphatic carboxylic acid having from 1 to 6 carbon atoms such as acetic acid, propionic acid, butyric acid, monochloroacetic acid, or trifluoropropionic acid; an alkyl ester or amide having from 1 to 4 carbon atoms which may be substituted of an unsaturated carboxylic acid such as acrylic acid, methacrylic acid, crotonic acid, itaconic acid or maleic acid (the alkyl group including, for example, methyl, ethyl, propyl, butyl, 2-chloroethyl, 2-bromoethyl, 2-hydroxyethyl, 2-cyanoethyl, 2-nitroethyl, 2-methoxyethyl, 2-methane-sulfonylethyl, 2-benzenesulfonylethyl, 2-carboxyethyl, 4-carboxybutyl, 3-chloropropyl, 2-hydroxy-3-chloropropyl, 2 -furfurylethyl, 2-thienylethyl, and 2-carboxyamidoethyl); a styrene derivative (e.g., styrene, vinyltoluene, α-methylstyrene, vinylnaphthalene, chlorostyrene, dichlorostyrene, bromostyrene, vinylbenzenecarboxylic acid, vinylbenzenesulfonic acid, chloromethylstyrene, hydroxymethylstyrene, methoxymethylstyrene, vinylbenzenecarboxyamide, or vinylbenzenesulfoamide); an unsaturated carboxylic acid (e.g., acrylic acid, methacrylic acid, crotonic acid, maleic acid or itaconic acid); a cyclic acid anhydride of maleic acid or itaconic acid; acrylonitrile; methacrylonitrile; and a heterocyclic compound having a polymerizable double bond group (for example, compounds described in *Polymer Data Handbook, -Fundamental Volume-*, edited by Kobunshi Gakkai, pages 175 to 184, Baifukan (1986), specifically, N-vinylpyridine, N-vinylimidazole, N-vinylpyrrolidone, vinylthiophene, vinyltetrahydrofuran, vinyloxazoline, vinylthiazole, or N-vinylmorpholine).

Two or more kinds of monomers (A) may be used in combination.

The monofunctional monomer (B) copolymerizable with the monomer (A) for use in the present invention is described below.

The monofunctional monomer (B) is a monomer which has an amino group represented by formula (I) described above and is copolymerizable with the monomer (A).

In formula (I), $R^1$ and $R^2$, which may be the same or different, each preferably represents a hydrogen atom, an alkyl group having from 1 to 22 carbon atoms which may be substituted (e.g., methyl, ethyl, propyl, butyl, hexyl heptyl, octyl, nonyl, decyl, dodecyl, tridecyl, tetradecyl, hexadecyl, octadecyl, eicosyl, docosyl, 2-chloroethyl, 2-bromoethyl, 2-cyanoethyl, 2-methoxycarbonylethyl, 2-methoxyethyl, or 3-bromopropyl), an alkenyl group having from 4 to 18 carbon atoms which may be substituted (e.g., 2-methyl-1-propenyl, 2-butenyl, 2-pentenyl, 3-methyl-2-pentenyl, 1-pentenyl, 1-hexenyl, 2-hexyenyl, 4-methyl-2-hexenyl, decenyl, dodecenyl, tridecenyl, hexadecenyl, octadecenyl, or linoleyl), an aralkyl group having from 7 to 12 carbon atoms which may be substituted (e.g., benzyl, phenethyl, 3-phenylpropyl, naphthylmethyl, 2-naphthylethyl, chlorobenzyl, bromobenzyl, methybenzyl, ethylbenzyl, methoxybenzyl, dimethylbenzyl, or dimethoxybenzyl), an aclcyclic group having from 5 to 8 carbon atoms which may be substituted (e.g., cyclohexyl, 2-cycloheylethyl, or 2-cyclopentylethyl) or an aromatic group having from 6 to 12 carbon atoms which may be substituted (e.g., phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propionamidophenyl, or dodecyloylamidophenyl).

Alternatively, $R^1$ and $R^2$ may combine with each other to form a ring together with the nitrogen atom. In such a case, $R^1$ and $R^2$ together represent an organic residue which may contain one or more hetero atoms (for example, an oxygen atom, a nitrogen atom, or a sulfur atom) to form a cyclic amino group. The cyclic amino group includes a morpholino group, a piperidino group, a pyridyl group, an imidazolyl group, and a quinolyl group.

The monomer (B) may contain two or more of such amino groups in the molecule thereof.

By the use of the monomer (B), the resin particles formed have excellent characteristics in that they exhibit good charging property and in that the charging property does not degrade with the lapse of time.

The monomer (B) is used preferably from 1 to 45% by weight, more preferably from 5 to 30% by weight, based on the total amount of the monomer (A) employed.

Specific examples of the monomer (B) are set forth below, but the present invention should not be construed as being limited thereto.

(b-1)

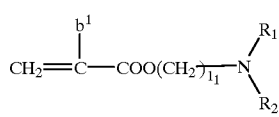

$b^1$: ——H, ——$CH_3$, ——Cl, ——CN
$l_1$: an integer of from 2 to 12

(b-2)

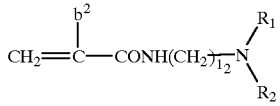

$b^2$: ——H, ——$CH_3$,
$l_1$: an integer of from 2 to 4

(b-3)

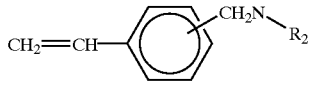

(b-4)

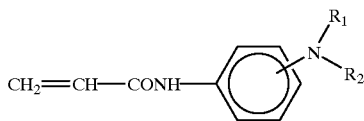

(b-5)

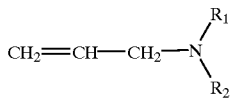

(b-6)

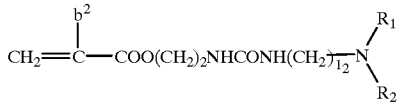

(b-7)

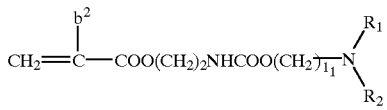

(b-8)

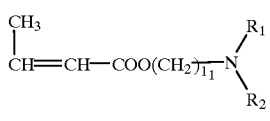

(b-9)

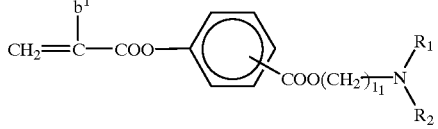

The monofunctional monomer (C) copolymerizable with the monomer (A) preferably used in the present invention is described below.

The monofunctional monomer (C) is a monomer which has a —$PO_3H_2$ group and is copolymerizable with the monomer (A). The monomer (C) may contain two or more —$PO_3H_2$ groups in the molecule thereof.

By the use of the monomer (C), the effect of the present invention, particularly the charging property of the resin particles formed is more improved.

The amount of the monomer (C) used is preferably from 0.2 to 2.5, more preferably from 0.5 to 2.0, in terms of a molar ratio of monomer (B)/monomer (C).

Specific examples of the monomer (C) are set forth below, but the present invention should not be construed as being limited thereto.

(C-1) 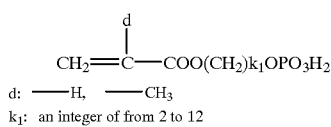
d: —H, —CH₃
k₁: an integer of from 2 to 12

(C-2) 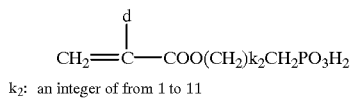
k₂: an integer of from 1 to 11

(C-3) $CH_2\!\!=\!\!CH\!-\!CH_2OPO_3H_2$ (C-4) 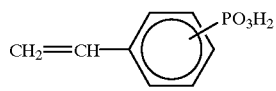

(C-5) 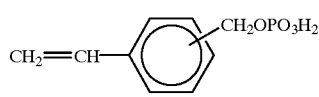

(C-6) 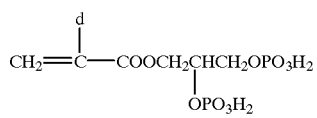

(C-7) 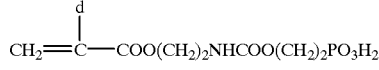

(C-8) 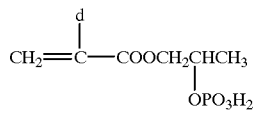

(C-9) $CH_2\!\!=\!\!CH\!-\!CONH(CH_2)_{k_1}OPO_3H_2$ (C-10) 

(C-11) 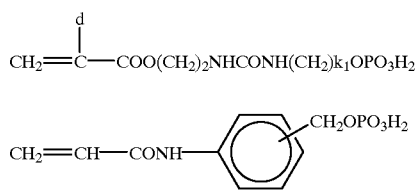

(C-12) 
p₂: an integer of from 1 to 4

(C-13) 

(C-14) 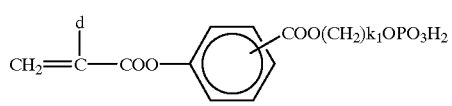

The resin for dispersion stabilization (P) which is used for maintaining the copolymer resin particles obtained by polymerization granulation of the monomers in the state of a stable dispersion in the nonaqueous solvent is a linear polymer containing at least one repeating unit represented by formula (II) described above. The repeating unit represented by formula (II) constitutes a component soluble in a nonaqueous solvent used as a dispersing medium in the oil-based ink.

In formula (II), $V^0$ preferably represents —COO—, —OCO—, —CH₂COO—, —CH₂OCO— or —O—, and more preferably —COO—, —OCO—, —CH₂COO—.

L preferably represents an alkyl group having from 8 to 32 carbon atoms which may be substituted or an alkenyl group having from 8 to 32 carbon atoms which may be substituted. Examples of the substituent include a halogen atom (e.g., fluorine, chlorine, or bromine), —O—E², —COO—E², and —OCO—E² (wherein E² represents an alkyl group having from 6 to 22 carbon atoms, e.g., hexyl, octyl, decyl, dodecyl, hexadecyl, or octadecy). More preferably, L represents an alkyl or alkenyl group having from 10 to 22 carbon atoms. Examples thereof include decyl, dodecyl, tridecyl, tetradecyl, hexadecyl, octadecyl, docosyl, eicosyl, decenyl, dodecenyl, tridecenyl, tetradeceyl, pentadecenyl, hexadecenyl, heptadecenyl, octadecenyl and docosenyl groups.

a¹ and a², which may be the same or different, each preferably represents a hydogen atom, a halogen atom (e.g., fluorine, chlorine, or bromine), a cyano group, an alkyl group having from 1 to 3 carbon atoms, —COO—E³ or —CH²COO—Z³ (wherein E³ represents an aliphatic group having from 1 to 22 carbon atoms, e.g., methyl, ethyl, propyl, butyl, hexyl, octyl, nonyl, decyl, dodecyl, tridecyl, tetradecyl, hexadecyl, octadecyl, docosyl, pentenyl, hexenyl, heptenyl, octenyl, decenyl, dodecenyl, tetradecenyl, hexadecenyl, or octadecenyl, which may have a substituent similar to the substituent described for L above).

More preferably, a¹ and a² each represents a hydrogen atom, an alkyl group having from 1 to 3 carbon atoms (e.g., methyl, ethyl, or propyl), —COO—E⁴ or —CH₂COO—E⁴ (wherein E⁴ represents an alkyl or alkenyl group having from 1 to 12 carbon atoms, e.g., methyl, ethyl, propyl, butyl, hexyl, octyl, decyl, dodecyl, pentenyl, hexenyl, heptenyl, octenyl or decenyl, which each may have a substituent similar to the substituent described for L above).

The resin for dispersion stabilization (P) used in the present invention is preferably a copolymer which contains copolymer components obtained by copolymerizing one or more monomers corresponding to the repeating unit represented by formula (II) with one or more other monomers copolymerizable with the monomers.

The other copolymerizable monomers may be any monomers, as long as they contain a polymerizable double bond group. Examples thereof include an unsaturated carboxylic acid such as acrylic acid, methacrylic acid, crotonic acid and itaconic acid, an ester or amide derivative of unsaturated carboxylic acid having 6 or less carbon atoms, a vinyl ester or allyl ester of carboxylic acid, a styrene derivative, methacrylonitrile, acrylonitrile, and a heterocyclic compound containing a polymerizable double bond group. More specifically, they include the same compounds described for the monomers (A) to be insolubilized.

In the polymer components of the resin for dispersion stabilization (P), the component of the repeating unit represented by formula (II) is 50% by weight or more, preferably 60% by weight or more, more preferably 70% by weight or more, based on the total components of the polymer.

In the resin for dispersion stabilization (P), the component represented by formula (II) constituting a component soluble in the nonaqueous solvent used as a dispersing medium in the oil-based ink and the component corresponding to other copolymerizable monomer (for example, component corresponding to the monomer (A) to be insolubilized in the nonaqueous solvent by polymerization) can form a random copolymer or a block copolymer. The block copolymer is preferred.

According to a preferred embodiment, the resin for dispersion stabilization (P) contains a polymerizable double bond group represented by formula (III) described above at one terminal of the polymer main chain thereof or in a substituent of a copolymer component constituting the polymer chain thereof. Such type of the resin for dispersion stabilization is also referred to as a resin for dispersion stabilization (PG) hereinafter. The polymerizable double bond group may be any functional group which is copolymerizable with the monomer (A).

In formula (III), $V^1$ represents —COO—, —OCO—, —(CH$_2$),COO—, —(CH$_2$),OCO—, —O—, —SO$_2$—, —CONHCOO—, —CONHCONH—, —COND$^2$—, —SO$_2$ND$^2$— or a phenylene group (wherein D$^2$ preferably represents a hydrogen atom or an alkyl group having from 1 to 22 carbon atoms, and s represents an integer of 1 to 4).

The phenylene group has the same meaning as the phenylene group defined for $V^2$ in formula (V) above.

$b^1$ and $b^2$, which may be the same or different, each has the same meaning as defined for $a^1$ or $a^2$ in formula (II). It is more preferred that one of $b^1$ and $b^2$ is a hydrogen atom.

$D^2$ in the —CON(D$^2$)— or —SO$_2$N(D$^2$)— group for $V^1$ preferably represents a hydrogen atom or an alkyl group, for example, methyl, ethyl, propyl, butyl, pentyl, hexyl, heptyl, octyl, decyl, or dodecyl.

One embodiment of the resin for dispersion stabilization (PG) having a polymerizable double bond group at one terminal of the polymer main chain thereof is represented by the following formula (VIa):

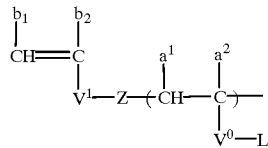
(VIa)

in formula (VIa), Z represents a direct bond or a connecting group attached to one terminal of the polymer main chain; and the symbols other than Z have the same meanings as defined in formulae (II) and (III) described above, respectively.

The connecting group includes a carbon atom-carbon atom bond (either a single bond or a double bond), a carbon atom-hetero atom bond (the hetero atom including, for example, an oxygen atom, a sulfur atom, a nitrogen atom and a silicon atom), a hetero atom-hetero atom bond, and an appropriate combination thereof. Specific examples thereof include

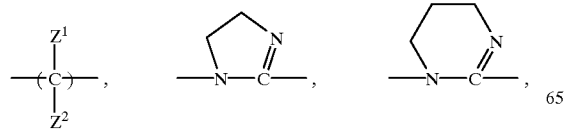

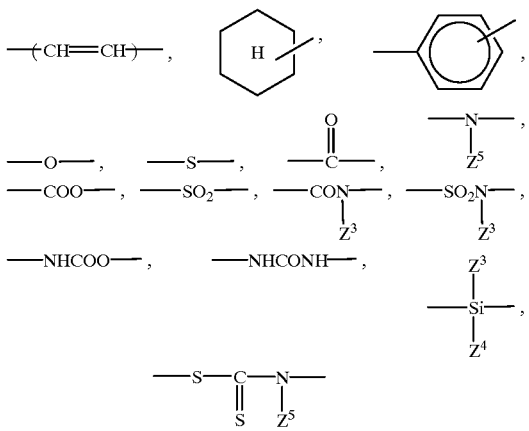

wherein $Z^1$ and $Z^2$, which may be the same or different, each represents a hydrogen atom, a halogen atom (e.g., fluorine, chlorine, or bromine), a cyano group, a hydroxy group, or an alkyl group (e.g., methyl, ethyl, or propyl); and $Z^3$ and $Z^4$, which may be the same or different, each represents a hydrogen atom, a hydrocarbon group having from 1 to 8 carbon atoms (e.g., methyl, ethyl, propyl, butyl, pentyl, hexyl, benzyl, phenetyl, phenyl, or tolyl) or —OZ$^5$ (wherein $Z^5$ represents a hydrocarbon group same as the hydrocarbon group defined for $Z^3$ above).

Specific examples of the polymerizable double bond group represented by formula (III) bonded at only one terminal of the polymer main chain are set forth below, but the present invention should not be construed as being limited thereto. In the following formulae (1) to (37), A represents —H, —CH$_3$ or —CH$_2$COOCH$_3$, B represents —H or —CH$_3$, n represents an integer of from 2 to 10, m represents 2 or 3, t represents 1, 2 or 3, p represents an integer of from 1 to 4, and q represents 1 or 2.

(1)

(2)

(3)

(4)

(5)

(6)

(7)

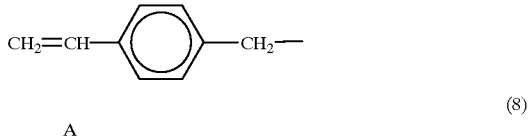
(8)

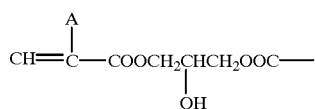 (9)
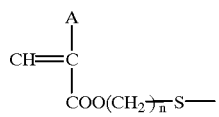 (10)
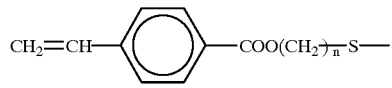 (11)
 (12)
 (13)
 (14)
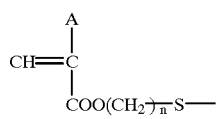 (15)
 (16)
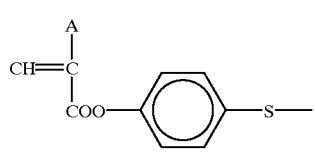 (17)
 (18)
 (19)
 (20)
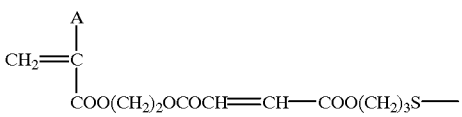 (21)
 (22)
 (23)
 (24)
(25)
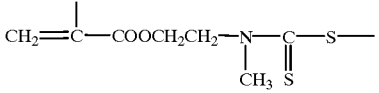 (26)
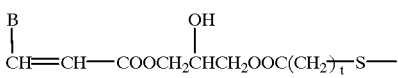 (27)
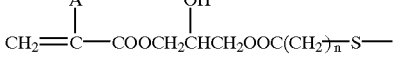 (28)
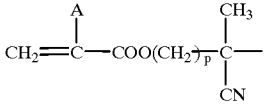 (29)
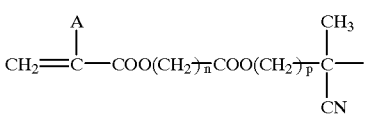 (30)
(31)
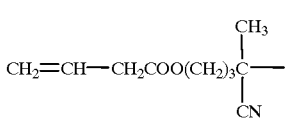 (32)
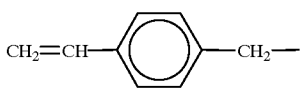 (33)
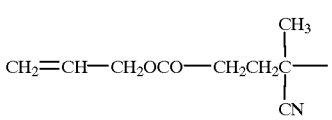 (34)

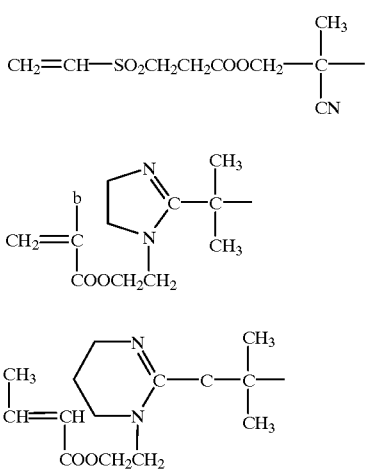

The resin for dispersion stabilization (PG) according to the present invention in which the polymerizable double bound group is bonded at only one terminal of the polymer main chain can be easily prepared by a synthesis method such as a method of reacting one of various reagents having a double bond group with a terminal of a living polymer obtained by conventivelly known radical polymerization (e.g., an iniferter method), anionic polymerization or cationic polymerization, or reacting a reagent containing a "specific reactive group" (for example, —OH, —COOH, —SO₃H, —NH₂, —SH, —PO₃H₂, —NCO, —NCS,

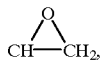

—COCl or —SO₂Cl) to a terminal of the living polymer, followed by introducing a polymerizable double bond group by a polymer reaction (a method by ionic polymerization), or a method of conducting radical polymerization using a polymerization initiator and/or a chain transfer agent containing the above described "specific reactive group" in its molecule, and then conducting a polymer reaction by utilizing the "specific reactive group" bound to one terminal of the polymer main chain, thereby introducing a polymerizable double bond group.

Specifically, the polymerizable double bond group can be introduced according to methods described, for example, in Takayuki Ootsu, Kobunshi, 33, No. 3, 222 (1984), P. Dreyfuss and R. P. Quirk, *Encycl. Polym. Sci. Eng.*, 7, 551 (1987), Yoshiki Nakajyo and Yuya Yamashita, *Senryo to Yakuhin*, 30, 232 (1985), Akira Ueda and Susumu Nagai, *Kagaku to Kogyo*, 60, 57 (1986), P. F. Rempp and E. Franta, *Advance in Polymer Science*, 58, 1 (1984), Koichi Ito, Kobunshi Kato, 35, 262 (1986) and V. Percec, *Applied Polymer Science*, 285, 97 (1984), and references cited therein.

More specifically, the methods include (1) a method of polymerizing a mixture containing at least one kind of monomer corresponding to the repeating unit represented by formula (II), and a chain transfer agent having the above-described "specific reactive group" in its molecule by using a polymerization initiator (for example, an azobis compound or a peroxide), (2) a method of conducting polymerization by using a polymerization initiator having the above described "specific reactive group" in its molecule without using the chain transfer agent described above, and (3) a method of using compounds containing the above described "specific reactive group" in their molecules as both chain transfer agent and polymerization initiator to synthesize a polymer having the "specific reactive group" bonded at only one terminal of the polymer main chain, and then conducting a polymer reaction by utilizing the "specific reactive group", thereby introducing a polymerizable double bond group.

Examples of the chain transfer agent which can be used include mercapto compounds containing the specific reactive group or a substituent derivable to the specific reactive group (e.g., thioglycolic acid, thiomalic acid, thiosalicylic acid, 2-mercaptopropionic acid, 3-mercaptopropionic acid, 3-mercaptobutyric acid, N-(2-mercaptopropionyl)glycine, 2-mercaptonicotinic acid, 3-[N-(2-mercaptoethyl) carbamoyl]propionic acid, 3-[N-(2-mercaptoethyl)amino] propionic acid, N-(3-mercaptopropionyl)alanine, 2-mercaptoethanesulfonic acid, 3-mercaptopropanesulfonic acid, 4-mercaptobutanesulfonic acid, 2-mercaptoethanol, 1-mercapto-2-propanol, 3-mercapto-2-butanol, mercaptophenol, 2-mercaptoethylamine, 2-mercaptoimidazole, or 2-mercapto-3-pyridinol), and iodinated alkyl compounds containing the specific reactive group or a substituent derivable to the specific reactive group (e.g., iodoacetic acid, iodopropionic acid, 2-iodoethanol, 2-iodoethanesulfonic acid, or 3-iodopropanesulfonic acid). Preferred examples thereof include mercapto compounds.

Suitable examples of the polymerization initiator containing the specific reactive group or a substituent derivable to the specific reactive group in the molecule thereof include azobis compounds such as 4,4'-azobis(4-cyanovaleric acid), 4,4'-azobis(4-cyanovaleric acid chloride), 2,2'-azobis(2-cyanopropanol), 2,2'-azobis(2-cyanopentanol), 2,2'-azobis [2-(5-hydroxy-3,4,5,6-tetrahydropyrimidin-2-yl)propane], 2,2'-azobis{2-methyl-N-[1,1-bis(hydroxymethyl)-2-hydroxyethyl]propioamide}, 2,2'-azobis{2-methyl-N-[1,1-bis(hydroxymethyl)ethyl]propion-amide}, 2,2'-azobis[2-methyl-N-(2-hydroxyethyl)propionamide], or 2,2'-azobis(2-amidinopropane) and dithiocarbamate compounds such as benzyl N-methyl-N-hydroxyethyldithiocarbamate, 2-carboxyethyl N,N-diethyldithiocarbamate, or 3-hydroxypropyl N,N-dimethyldithiocarbamate.

The amount of the chain transfer agent or polymerization initiator used is preferably from 0.05 to 10 parts by weight, more preferably from 0.1 to 5 parts by weight, based on 100 parts by weight of the total monomers employed.

One embodiment of the resin for dispersion stabilization (PG) having a polymerizable double bond group in a substituent of a copolymer component constituting the polymer chain thereof is represented by the following formula (VIb):

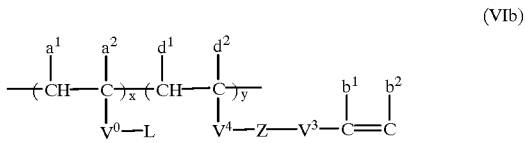

(VIb)

in formula (VIb), $a^1$, $a^2$, $V^0$, L, $b^1$, $b^2$, $d^1$ and $d^2$ each has the same meaning as defined in formulae (II), (III) and (V) described above; x and y each represents a weight ratio of each repeating unit; $V^3$ and $V^4$, which may be the same or different, each has the same meaning as defined for $V^1$ in the formula (III); and $Z^0$ represents a group connecting $V^3$ and $V^4$ and comprising at least one of a carbon atom and a hetero atom (for example, an oxygen atom, a sulfur atom, a silicon atom or a nitrogen atom).

In the resin for dispersion stabilization (PG) represented by formula (IVb), the components accompanied by x and y (hereinafter simply referred to as components x and y, respectively) may contain two or more kinds of repeating units, respectively.

The connecting group represented by $Z^0$ includes a carbon atom-carbon atom bond (either a single bond or a double bond), a carbon atom-hetero atom bond (the hetero atom including an oxygen atom, a sulfur atom, a nitrogen atom and a silicon atom), a hetero atom-hetero atom bond, a heterocyclic group, and an appropriate combination thereof. Specific examples thereof include

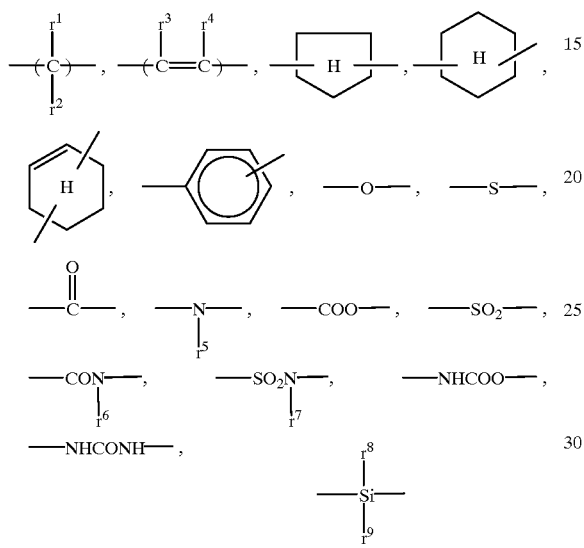

wherein $r^1$ $r^2$, $r^3$ and $r^4$, which may be the same or different, each represents a hydrogen atom, a halogen atom (e.g., fluorine, chlorine, or bromine), a cyano group, a hydroxy group or an alkyl group (e.g., methyl, ethyl, or propyl); $r^5$, $r^6$ and $r^7$, which may be the same or different, each represents a hydrogen atom or an alkyl group (e.g., methyl, ethyl, propyl, or butyl); and $r^8$ and $r^9$, which may be the same or different, each represents a hydrogen atom, a hydrocarbon group having from 1 to 8 carbon atoms (e.g., methyl, ethyl, propyl, butyl, pentyl, hexyl, benzyl, phenethyl, phenyl, or tolyl) or —$Or^{10}$ (wherein $r^{10}$ represents a hydrocarbon group same as the hydrocarbon group defined for $R^8$ above).

The heterocyclic group for the connecting group is derived from a heterocyclic ring containing a hetero atom, for example, an oxygen atom, a sulfur atom or a nitrogen atom (e.g., thiophene, pyridine, pyrane, imidazole, benzimidazole, furan, piperidine, pyrazine, pyrrole, or piperazine).

The connecting chain group represented by —$V^4$—Z—$V^3$— contained in the component y of formula (VIb) preferably contains a total number of atoms of 8 or more. The number of atoms constituting the connecting chain group means that, for example, when $V^4$ represents —COO— or —CONH—, the oxo group (=O) and the hydrogen atom are not contained in the number of atoms, and the carbon atom, the ether type oxygen atom and the nitrogen atom constituting the connecting chain group are contained in the number of atoms. Therefore, in case of —COO— or —CONH—, the number of atoms is counted as 2.

Specific examples of the component y having a polymerizable double bond group are set forth below, but the present invention should not be construed as being limited thereto.

In the following formulae (Y-1) to (Y-12), $e^1$ represents —H or —$CH_3$, $e^2$ represents —H, —$CH_3$, —Cl or —CN, $k_1$ represents an integer of from 4 to 12, $k_2$ represents an integer of from 2 to 6, $L_1$ represents

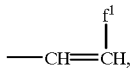

—CH=$CH_2$ or

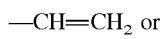

(wherein $f^1$ represents —H or —$CH_3$), and $L_2$ represents

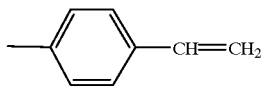

or —$CH_2CH=CH_2$ (wherein $f^2$ represents —$CH_3$, —Cl or —CN).

(Y-1)

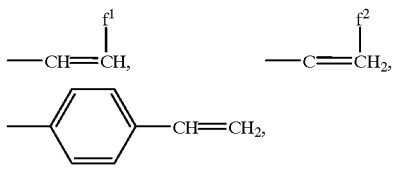

(Y-2)

(Y-3)

(Y-4)

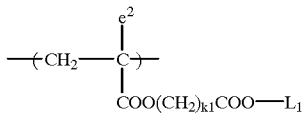

(Y-5)

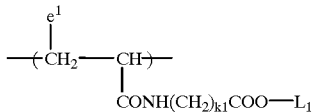

(Y-6)

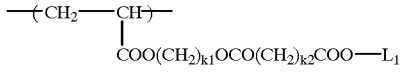

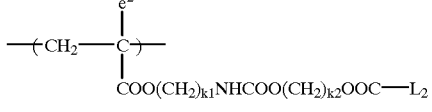

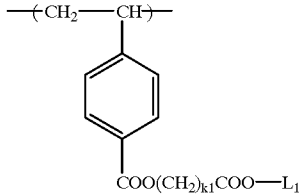

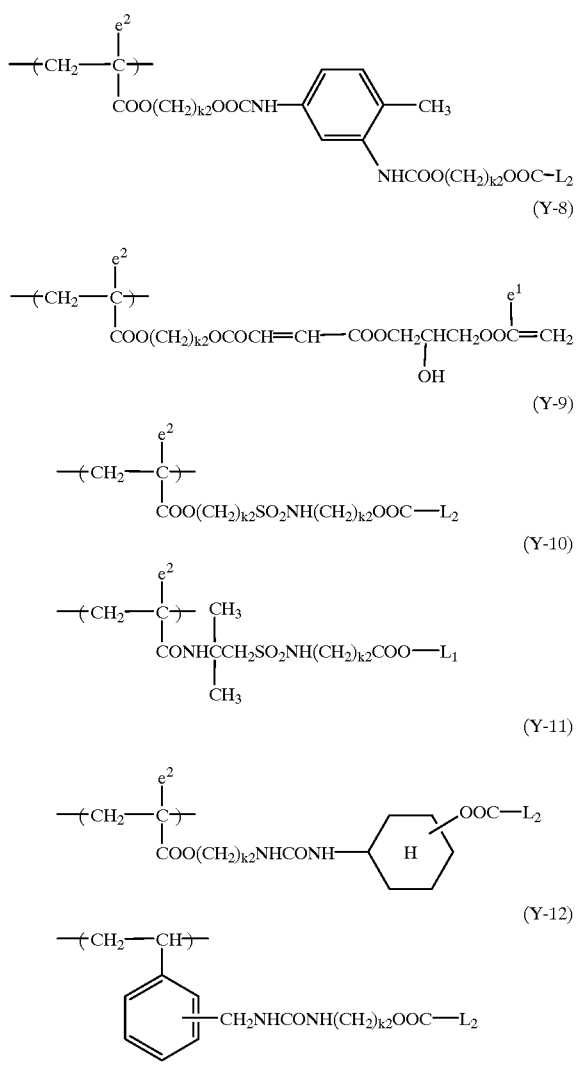

The resin for dispersion stabilization (PG) according to the present invention in which the polymerizable double bond group is bonded in a substituent of a copolymer component constituting the polymer chain thereof can be easily prepared by a conventionally known synthesis method. More specifically, in order to introduce a copolymer component having a polymerizable double bond group (component y), there is a method in which a polymerization reaction is first conducted using a monomer having a "specific reactive group" (for example, —OH, —COOH, —SO$_3$H, —NH$_2$, —SH, —PO$_3$H$_2$, —NCO, —NCS, —COCl, —SO$_2$Cl or an epoxy group) and a monomer corresponding to a component x in formula (VIb), and then a reagent having a polymerizable double bond group is reacted with the resulting copolymer, thereby introducing the polymerizalbe double bond group into the copolymer by a polymer reaction.

Specifically, the polymerizable double bond group can be introduced according to the methods described in the literature and references cited therein set forth with respect to the preparation of the resin for dispersion stabilization (PG) in which the polymerizable double bond group is bonded at one terminal of the polymer main chain thereof.

Another method in which a bifunctional monomer having functional groups having different reactivity in a radical polymerization is subjected to copolymerization reaction with a monomer corresponding to the component x to prepare a copolymer represented by formula (VIb) without the occurrence of gelation as described in JP-A-60-185962 is also utilized.

In the resin represented by formula (VIb), a weight ratio of component x/component y is from 90/10 to 99/1, preferably from 92/8 to 98/2. In such a range of the weight ratio, the occurrence of gelation in the reaction mixture and the formation of coarse resin particles may be prevented, and the dispersion stability and redispersibility of the dispersed resin particles are excellent.

The resin for dispersion stabilization (PG) for use in the present invention may contain, as a copolymer component, a repeating unit other than the repeating units shown in formulae (VIa) and (VIb), respectively. The copolymer component to be included may be selected from any monomers copolymerizable with the monomers corresponding to the repeating units shown in formulae (VIa) and (VIb), respectively. Such monomers, however, are preferably employed in a range of not more than 20 parts by weight based on 100 parts by weight of the total polymer components. In the above-described range of the amount of other monomers used, the dispersion stability of the dispersed resin particles is well achieved.

The weight average molecular weight (Mw) of the resin for dispersion stabilization (P) according to the present invention is preferably from $2\times10^4$ to $10\times10^6$, more preferably from $3\times10^4$ to $2\times10^5$.

Now, the monofunctional monomer (D) which is copolymerizable with the monomer (A) is described below.

The monofunctional monomer (D) which is preferably used for the preparation of the resin particles dispersed in the oil-based ink of the present invention has the specific substituent and is represented by formula (IV) described above.

First, the case wherein $E^1$ represents an aliphatic group having 8 or more carbon atoms is described in detail below.

$E^1$ preferably represents an alkyl group having a total number of carbon atoms of 10 or more which may be substituted or an alkenyl group having a total number of carbon atoms of 10 or more which may be substituted.

$U^1$ preferably represents —COO—, —CONH—, —CON($E^2$)— (wherein $E^2$ preferably represents an aliphatic group having from 1 to 32 carbon atoms (examples of the aliphatic group including an alkyl group, an alkenyl group and an aralkyl group) or a substituent represented by formula (IVa) described above), —OCO—, —CH$_2$OCO— or —O—. $a^1$ and $a^2$, which may be the same or different, each preferably represents a hydrogen atom, a fluorine atom, a chlorine atom, a bromine atom, a cyano group, a methyl group, —COO—$E^3$ or —CH$_2$COO—$E^3$ (wherein $E^3$ preferably represents an alkyl group, an alkenyl group, an aralkyl group or a cycloalkyl group each having 32 or less carbon atoms).

More preferably, in formula (IV), $U^1$ represents —COO—, —CONH— or —CON($E^2$)—; $a^1$ and $a^2$, which may be the same or different, each represents a hydrogen atom, a fluorine atom, a chlorine atom, a cyano group, or a methyl group; and $E^1$ represents the alkyl group or alkenyl group as described above.

When $E^1$ represents an aliphatic group having 8 or more carbon atoms in the monomer (D) represented by formula (IV) as described above, specific examples thereof include an ester of an unsaturated carboxylic acid such as acrylic acid, α-fluoroacrylic acid, α-chloroacrylic acid, α-cyanoacrylic acid, methacrylic acid, crotonic acid, maleic acid or itaconic acid, having an aliphatic group having a total number of carbon atoms of from 10 to 32 (the aliphatic group may have a substituent such as a halogen atom, a hydroxyl group, an amino group or an alkoxy group, or a hetero atom such as an oxygen atom, a sulfur atom or a nitrogen atom may intervene a carbon-carbon bond of its main chain) (examples of the aliphatic group including decyl, dodecyl, tridecyl, tetradecyl, hexadecyl, octadecyl, docosyl, dodecenyl, hexadecenyl, oleyl, linoleyl and docosenyl); an amide of the above-described unsaturated carboxylic acid having an aliphatic group (the aliphatic group has the same meaning as defined for the ester); a vinyl ester or allyl ester of a higher fatty acid (examples of the higher fatty acid including lauric acid, myristic acid, stearic acid, oleic acid, linoleic acid and behenic acid); and a vinyl ether substituted with an aliphatic group having a total number of carbon atoms of from 10 to 32 (the aliphatic group has the same meaning as defined for the ester of unsaturated carboxylic acid described above).

Now, the case where $E^1$ represents a substituent having a total number of atoms of 8 or more (excluding hydrogen atoms directly attached to a carbon or nitrogen atom) represented by formula (IVa) in the monomer (D) represented by formula (IV) is described in detail below.

$A^1$ and $A^2$ each represents at least one group selected from the group consisting of a group represented by formula (IVb) and a hydrocarbon group having from 1 to 18 carbon atoms (in the case of two or more, each represents a combination of the group represented by formula (IVb) and/or the hydrocarbon group). More specifically, $A^1$ and $A^2$ each is composed of any appropriate combination of atomic groups such as $—C(R^2)(R^2)—$ (in which R and R each represents a hydrogen atom, an alkyl group or a halogen atom), $—(CH=CH)—$, a cyclohexylene group (the cyclohexylene group is hereinafter often represented by "$—C_6H_{10}$", including 1,2-, 1,3- and 1,4-cyclohexylene groups) and the group represented by formula (IVb).

When $E^1$ represents the substituent having a total number of atoms of 8 or more represented by formula (IVa), it is preferred that a "connecting main chain" composed of $U^1$ to $R^{21}$ (namely, $U^1$, $A^1$, $B^1$, $A^2$, $B^2$ and $R^{21}$) in a connecting group ($—U^1—(A^1—B^1)m—(A^2—B^2)_n—R^{21}$) in the formula (IV) has a total number of atoms of 8 or more.

The number of atoms constituting the "connecting main chain" means that, for example, when $U^1$ represents —COO— or —CONH—, the oxo group (=O) and the hydrogen atom are not contained in the number of atoms, and the carbon atom, the ether type oxygen atom and the nitrogen atom constituting the connecting main chain are contained in the number of atoms. Therefore, in case of —COO— and —CONH—, the number of atoms is counted as 2. Further, when $R^{21}$ represents $—C_9H_{19}$, the hydrogen atoms are not contained in the number of atoms, and the carbon atoms are contained therein. In this case, therefore, the number of atoms is counted as 9.

When $U^1$ represents $—CON(E^2)—$, and $E^2$ represents the substituent represented by formula (IVa), namely $—(A^1—B^1)_m—(A^2—B^2)_n—R^{21}$, a connecting main chain composed of $E^2$ is also included in the above-described "connecting main chain". Furthermore, when $A^1$ and $A^2$ each has the group represented by formula (IVb), a ($—B^3—(A^4—B^4)_p—R^{23}$) group is also included in the above-described "connecting main chain".

Of the monomers (D) represented by formula (IV) described above, specific examples of monomer wherein El represents the substituent represented by formula (IVa) include the following compounds.

In the following formulae (D-1) to (D-19), $r_1$ represents —H, —CH$_3$, —Cl or —CN, $r_2$ represents —H or —CH$_3$, $\lambda$ represents an integer of from 2 to 10, p represents an integer of from 2 to 6, q represents an integer of from 2 to 4, m represents an integer of from 1 to 12, and n represents an integer of from 4 to 18.

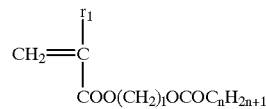
(D-1)

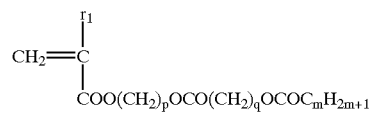
(D-2)

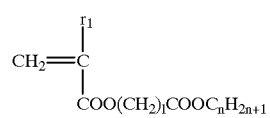
(D-3)

(D-4)

(D-5)

(D-6)

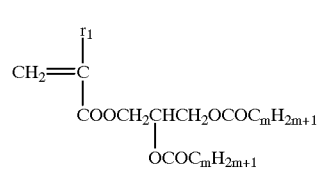
(D-7)

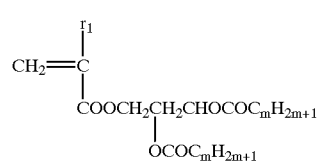
(D-8)

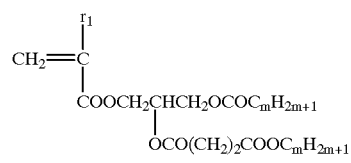
(D-9)

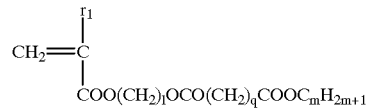
(D-10)

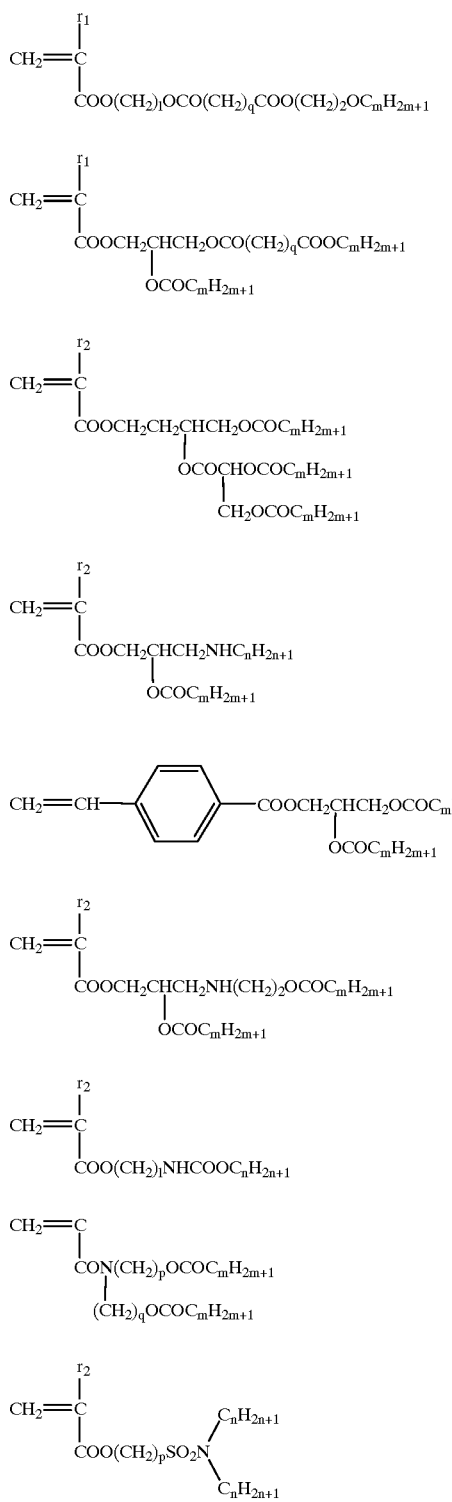

The monomer (D) is used preferably from 0.5 to 20% by weight, more preferably from 1 to 15% by weight, based on the total amount of monomers employed.

By the use of the monomer (D), the dispersion stability and redispersibility of the resin particles dispersed are more improved. It is believed that this is because the copolymer component corresponding to the monomer (D) is oriented in the surface area of the resin particle due to its good solvent affinity for the dispersion medium and thus, the affinity for the dispersion medium on the surface of the resin particle is improved, thereby preventing coagulation and precipitation of the resin particles.

The dispersed resin particles used in the present invention are generally prepared by polymerization of the resin for dispersion stabilization (P), the monomer (A) and the monomer (B), and if desired, the monomer (C) and/or the monomer (D), as described above in the nonaqueous solvent in the presence of a polymerization initiator such as benzoyl peroxide, azobisisobutyronitrile or butyl lithium under heating. Specifically, there are (1) a method of adding a polymerization initiator to a mixed solution of the resin for dispersion stabilization (P), the monomer (A) and the monomer (B), and if desired, the monomer (C) and/or the monomer (D), (2) a method of adding dropwise the monomer (A) and the monomer (B), and if desired, the monomer (C) and/or the monomer (D) together with a polymerization initiator to a solution in which the resin for dispersion stabilization (P) is dissolved, (3) a method of simultaneously added dropwise a mixture of one half of the monomer (A) and the monomer (B), and if desired, the monomer (D) and a mixture of the other half of the monomer (A) and a polymerization initiator, and if desired, the monomer (C) to a solution in which the resin for dispersion stabilization (P) is dissolved. The dispersed resin particles can be prepared according to any of these methods.

The total amount of the monomer (A) and the monomer (B), and if desired, the monomer (C) and/or the monomer (D), is preferably from 10 to 100 parts by weight, more preferably from 10 to 80 parts by weight, based on 100 parts by weight of the nonaqueous solvent.

The resin for dispersion stabilization (P) is used preferably in an amount of from 3 to 25 parts by weight, more preferably from 5 to 20 parts by weight, based on 100 parts by weight of the total amount of the monomers employed.

The amount of the polymerization initiator is suitably from 0.1 to 10% by weight based on the total amount of monomers used. The polymerization temperature is preferably from about 40 to about 180° C., and more preferably from 50 to 120° C. The reaction time is preferably from 3 to 15 hours.

When a polar solvent such as an alcohol, a ketone, an ether or an ester as described above is used in combination with the nonaqueous solvent in the reaction, or when unreacted monomers of the monomer (A) to be subjected to polymerization granulation remain, it is preferred that the polar solvent or the unreacted monomers are removed by distillation under heating to temperature equal to or higher than a boiling point of the solvent or the monomers, or under a reduced pressure.

The nonaqueous dispersed resin particles according to the present invention prepared as described above are present as particles which are very fine and uniform in particle size distribution. The average particle size thereof is preferably from 0.15 to 1.5 $\mu$m, more preferably from 0.2 to 1.0 $\mu$m. The particle size can be determined using CAPA-500 (manufactured by Horiba Ltd.) The weight average molecular weight (Mw) of the dispersed resin according to the present invention is preferably from $5\times10^3$ to $1\times10^6$, more preferably from $8\times10^3$ to $5\times10^5$.

As to thermal properties, the dispersed resin according to the present invention has preferably a glass transition point ranging from 0 to 80° C. or a softening point ranging from 35 to 120° C., more preferably a glass transition point ranging from 10 to 70° C. or a softening point ranging from 38 to 90° C.

The oil-based ink of the present invention are excellent in dispersion stability, redispersibility and storage stability of the dispersed resin particles. Also, rapid fixing property after image formation is good, the image formed retains sufficient strength in printing, thereby exhibiting good press life.

More specifically, since it has very stable dispersibility, even when it is repeatedly used in a recording device for a long period of time, it is good in dispersibility and easily redispersed, so that contamination due to adhesion of the resin particles to each part of the device is not observed at all.

Furthermore, due to its good fixing property, a strong coating is formed on a surface of a lithographic printing plate precursor by a rapid fixing treatment with heating after ink image formation. This makes it possible to print a large number of sheets (good press life) in offset printing.

The oil-based ink of the present invention having the effects as described above becomes available by a nonaqueous latex of the dispersed resin particles according to the present invention.

According to a particularly preferred embodiment, the resin for dispersion stabilization (P) which is a block copolymer comprising a soluble component block composed of the repeating unit represented by formula (II) and an insoluble component block is used. In this case, the insoluble component block sufficiently adsorbs to the insoluble resin particle. In another particularly preferred embodiment, the resin for dispersion stabilization (PG) containing a polymerizable double bond group is used. In this case, the resin for dispersion stabilization (PG) chemically bonds to the insoluble resin particle.

In the above described embodiments, it is believed that increase in the affinity for the dispersion medium due to the soluble component of the resin for dispersion stabilization (P) adsorbed on or chemically bonded to the resin particle dispersed brings about a so-called steric repulsion effect, thereby enhancing the dispersion stability of the resin particles in the nonaqueous solvent.

The resin particles dispersed in the oil-based ink of the present invention are positively charged in the presence of a charge control agent (CD).

In order to impart the electroscopicity to the resin particles, the technology of a liquid developer for electrostatic photography can be appropriately utilized. Specifically, it is carried out using an electroscopic material, for example, a charge control agent and other additives as described, for example, in *Recent Developments and Utilization of Electrophotoaraphic Development Systems and Toner Materials*, pages 139 to 148, *Fundamentals and Applications of Electrophotographic Techniques*, edited by Denshi Shashin Gakkai, pages 497 to 505, Corona Co. (1988), and Yuji Harazaki, *Electrophotography*, 16 (No. 2), page 44 (1977).

Suitable charge control agents include metal soap, an organic phosphoric acid and a salt thereof, an organic sulfonic acid and a salt thereof, and an amphoteric surface active compound.

Specific examples of the metal soap include a metal salt of a fatty acid having from 6 to 24 carbon atoms (e.g., 2-ethylhexynoic acid, 2-ethylcaproic acid, lauric acid, palmitic acid, elaidic acid, linoleic acid, ricinoleic acid, oleic acid, stearic acid, enanthic acid, naphthenic acid, or ethylenediaminetetraacetic acid), a resin acid, a dialkylsuccinic acid, an alkylphtharic acid or an alkylsalicylic acid (metal for a metal ion including e.g., Na, K, Li, B, Al, Ti, Ca, Pb, Mn, Co, Zn, Mg, Ce, Ag, Cd, Zr, Cu, Fe, or Ba), and those described, for example, in U.S. Pat. Nos. 3,411,936 and 3,900,412, JP-B-49-27707 (the term "JP-B" as used herein means an "examined Japanese patent publication"), JP-A-51-37651, JP-A-52-38937, JP-A-52-107837 and JP-A-53-123138.

Specific examples of the organic phosphoric acid and salt thereof include a mono-, di- or tri-alkyl phosphoric acid and a dialkyl dithiophosphoric acid as described, for example, in British Patents 1,411,739 and 1,276,363.

Specific examples of the organic sulfonic acid and salt thereof include a long-chain aliphatic sulfonic acid, a long-chain alkylbenzenesulsonic acid, a dialkylsulfosuccinic acid and a metal salt thereof as described, for example, in JP-B-47-37128, JP-A-53-123138, JP-A-51-47437, JP-A-50-79640 and JP-A-53-30340.

Specific examples of the amphoteric surface active compound include a phospholipid such as lecithin, or cephalin as described, for example, in JP-B-51-47046, a β-alanine containing an alkyl group having 8 or more carbon atoms as described, for example, in JP-A-50-17642 and JP-A-49-17741, a metal complex of β-diketone as described, for example, in JP-B-49-27707, and a copolymer containing a maleic monoamide component as described, for example, in JP-B-6-19596, JP-B-6-19595 and JP-B-6-23865.

The charge control agents (CD) may be employed individually or in combination of two or more thereof.

The charge control agent is preferably used in an amount of from 0.001 to 1.0 part by weight based on 1,000 parts by weight of the carrier liquid as a dispersing medium.

The oil-based ink of the present invention comprises a dispersion of positively charged particles comprising the dispersed resin particles containing at least components corresponding to the monomer to be insolubilized (monomer (A)) and the basic monomer (monomer (B)) respectively, preferably at least components corresponding to the monomer (A), the monomer (B) and the monomer having a —$PO_3H_2$ group (monomer (C)) respectively, and the charge control agent as described above.

When the oil-based ink is used in the method of image formation by the electrostatic type ink jet recording system described in the above-mentioned WO 93/11866, highly accurate images are obtained without disappearance of ink dot and change of dot shape and a thickness of dot image obtained is maintained in a range of 1 $\mu$n or more even under the condition of ejection of minute droplets and high printing speed.

It is believed that this is because the positively charged resin particles of the oil-based ink are moved and condensed to form agglomerations of particles upon rapid electrophoresis occurred by the application of an electrostatic field in ink meniscus formed at the tip of an ejection electrode, and ejected completely corresponding to the application of pulse voltage according to image signal.

Further, even if the oil-based ink of the present invention which has been preserved for a long period of time or under conditions of high temperature and high humidity (for example, at 40° C. and 80% RH) is used in the ink jet recording method, the oil-based ink exhibits excellent characteristics same as those obtained using the ink just after the production.

It is believed that this is because the charging property of the oil-based ink, particularly the charging property of the positively charged particles is stably retained.

Various additives may be further added to the oil-based ink of the present invention if desired, and the upper limit of the total amount of these additives is restricted by the electric resistance of the oil-based ink. Specifically, if the electric resistance of the ink in a state of excluding the dispersed particles therefrom is lower than $10^9$ Ωcm, it may be difficult to obtain continuous gradation images of good quality. It is therefore desired to control the amount of each additive added within the above described value of electric resistance.

It is preferred that the oil-based ink of the present invention contains a coloring material as a color component for purpose such as visual inspection of a printing plate after plate-making, in addition to the above-described dispersed resin particles.

As the coloring material, any pigment and dye conventionally employed in an oil-based ink composition or a liquid developer for electrostatic photography can be employed.

The pigments which can be used include those ordinarily employed in the technical field of printing, regardless of inorganic pigments or organic pigments. Specifically, known pigments, for example, carbon black, cadmium red, molybdenum red, chrome yellow, cadmium yellow, Titan Yellow, chromium oxide, pyridian, cobalt green, ultramarine blue, Prussian blue, cobalt blue, azo pigments, phthalocyanine pigments, quinacridone pigments, isoindolinone pigments, dioxazine pigments, threne pigments, perylene pigments, perynone pigments, thioindigo pigments, quinophthalone pigments and metal complex pigments can be used without particular limitation.

Preferred examples of the dye include oil-soluble dyes, for example, azo dyes, metal complex dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes and metallophthalocyanine dyes.

The pigments and dyes may be used individually or in an appropriate combination. They are preferably employed within the range of from 0.05 to 5% by weight based on the whole ink.

The coloring material may be dispersed by itself in the nonaqueous solvent as dispersed particles, separately from the dispersed resin particles, or incorporated into the dispersed resin particles. In order to incorporate the coloring material into the dispersed resin particles, there is a method in which the dispersed resin is dyed with an appropriate dye as described in JP-A-57-48738. Alternatively, there is a method in which the dispersed resin is chemically bonded to a dye as described in JP-A-53-54029, or a method in which a monomer previously containing a dye is used at the time of polymerization granulation to form a dye-containing copolymer as described in JP-B-44-22955.

Now, a method of image formation on an image receiving material by the electrostatic type ink jet recording method using the oil-based ink of the present invention will be described below.

The method is explained using a printing plate precursor as the image receiving material to perform image formation (plate-making), thereby preparing a printing plate.

The printing plate precursors are broadly divided into two classes, that is, those having a lithographically printable hydrophilic surface and those having a hydrophobic surface, and both of them can be employed for the application of the oil-based ink according to the present invention. The former printing plate precursors include those wherein the support per se has a lithographically printable hydrophilic surface and those comprising a support having provided thereon an image-receiving layer having a lithographically printable hydrophilic surface.

The water-resistant support having a lithographically printable hydrophilic surface may be any support as far as it provides a hydrophilic surface suitable for use in lithography. Supports used for conventional offset printing plates having a hydrophilic surface are employed as they are. Specific examples of the support include an aluminum plate, a zinc plate, a bimetal plate (e.g., a copper-aluminum plate, a copper-stainless steel plate, or a chromium-copper plate), a trimetal plate (e.g., a chromium-copper-aluminum plate, a chromium-lead-iron plate, or a chromium-copper-stainless steel plate). A thickness of the support is preferably from 0.1 to 3 mm, more preferably from 0.1 to 1 mm. A plastic sheet and paper possessing printing durability are also used.

A support with an aluminum surface is preferably subjected to a surface treatment, for example, surface graining, immersion in an aqueous solution of sodium silicate, potassium fluorozirconate or a phosphate, or anodizing. Also, an aluminum plate subjected to surface graining and then immersion in an aqueous solution of sodium silicate as described in U.S. Pat. No. 2,714,066, or an aluminum plate subjected to anodizing and then immersion in an aqueous solution of alkali silicate as described in JP-B-47-5125 is preferably employed.

Anodizing of an aluminum plate can be carried out by electrolysis in an electrolytic solution comprising one or more aqueous or nonaqueous solutions of an inorganic acid (e.g., phosphoric acid, chromic acid, sulfuric acid or boric acid) or an organic acid (e.g., oxalic acid or sulfamic acid) or a salt thereof to oxidize the aluminum plate as an anode.

Silicate electrodeposition as described in U.S. Pat. No. 3,658,662 or a treatment with polyvinylsulfonic acid described in West German Patent Application (OLS) 1,621,478 is also effective.

According to the use of the oil based-ink of the present invention in combination with the electrostatic type ink jet recording method, blur of image is prevented even in the image formation on a metal surface, since the ink droplets are ejected in the state wherein the resin particles in the ink are sufficiently concentrated and thus, blur of the ink on the metal surface does not occur.

The surface treatment is conducted not only for rendering the surface of the support hydrophilic, but also for increasing adhesion of the ink image onto the support. Further, in order to adjust an adhesion property between the ink image and the support, a surface layer may be provided on the surface of the support.

A plastic sheet or paper as the support should have a hydrophilic surface layer (an image-receiving layer), since its area other than those corresponding to the ink images must be hydrophilic. Specifically, a known direct drawing type lithographic printing plate precursor per se or a lithographic printing plate precursor having a layer same as an image-receiving layer of such a direct drawing type printing plate precursor can be employed.

The image-receiving layer comprises, for example, a water-soluble binder, an inorganic pigment and a water-resistance imparting agent as its main component. The binder includes a water-soluble resin, for example, PVA, modified PVA (e.g., carboxy modified PVA), starch and a derivative thereof, CMC, hydroxyethyl cellulose, casein, gelatin, polyvinylpyrrolidone, a copolymer of vinyl acetate and crotonic acid, and a copolymer of styrene and maleic acid.

Examples of the water-resistance imparting agent includes glyoxal, a primary condensation product of an aminoplasts such as a melamine formaldehyde resin or urea formaldehyde resin, a modified polyamide resin (e.g., methylol polyamide resin), a polyamide-polyamine-epichlorohydrin adduct, a polyamide-epichlorohydrin resin, and a modified polyamide-polyimide resin. Examples of the inorganic pigment include kaolin, clay, calcium carbonate, silica, titanium oxide, zinc oxide, barium sulfate, and alumina. Among these, silica is preferred.

In addition, the image-receiving layer may contain a crosslinking agent such as ammonium chloride or a silane coupling agent.

On the other hand, in case of using the lithographic printing plate precursor comprising an image-receiving layer having a hydrophobic surface, after image formation, the non-image area is oil-desensitized upon oil-desensitizing treatment to convert the hydrophobic surface of the non-image area to a hydrophilic surface which repels printing ink, thereby preparing a printing plate.

Such printing plate precursors include those having an image-receiving layer containing at least zinc oxide and a binder resin, and those having an image-receiving layer containing at least a binder resin which is hydrophobic but can be converted hydrophilic upon a chemical reaction when oil-desensitizing treatment (for example, treatment with a processing solution, irradiation with light, or treatment with heat) is performed as described, for example, in JP-A-1-226394 and JP-B-7-94191.

The lithographic printing plate precursor having an image-receiving layer containing at least zinc oxide and a binder resin is described in detail below.

The zinc oxide used in the image-receiving layer is any of zinc oxide, zinc white, wet-type zinc white, and activated zinc white, which are comercially available, as described in *Shinban Ganryo Binran* (*New Edition of Pigment Handbook*), Nippon Ganryo Gijutsu Kyokai, ed., pp. 319, Kabushiki Kaisha Seibundo (1968).

Specifically, depending on the starting materials and production manners, zinc oxide is classified into two groups, those produced by a wet method and those produced by a dry method which are further sub-classified into zinc oxide produced by French method (indirect method) and those produced by American method (direct method).

Suitable examples of zinc oxide are those commercially available, for example, from Seido Kagaku Kogyo K.K., Sakai Chemical Industry Co., Ltd., Hakusui Chemical Industries, Ltd., Honjo Chemical K.K., Toho Zinc Co., Ltd., or Mitsui Mining & Smelting Co., Ltd.

When the content of zinc oxide is too small, it is difficult to render the surface of the image-receiving layer sufficiently hydrophilic by oil-desensitizing treatment. On the contrary, when the content of zinc oxide is too large, mechanical strength of the image-receiving layer tends to decrease. Therefore, the content of zinc oxide in the image-receiving layer is preferably from about 75 to about 90% by weight, more preferably from 78 to 88% by weight.

The binder resin used in the image-receiving layer is the main component of the image-receiving layer as well as zinc oxide and has a hydrophobic property.

The weight average molecular weight of the binder resin to be used is preferably from $1 \times 10^3$ to $1 \times 10^6$, and more preferably from $5 \times 10^3$ to $5 \times 10^5$. The glass transition temperature of the binder resin is preferably from 0 to 120° C., and more preferably from 10 to 90° C.

Specific examples of the binder resin include styrene copolymers, methacrylate copolymers, acrylate copolymers, vinylL acetate copolymers, polyvinylbutyral, alkyd resins, epoxy resins, epoxy ester resins, polyester resins and polyurethane resins. These resins can be used individually or as a mixture of two or more thereof.

The image-receiving layer may contain other components, in addition to the above-described zinc oxide and binder resin. Examples of other components include inorganic pigments other than zinc oxide. Such inorganic pigments include kaolin, clay, calcium carbonate, barium carbonate, calcium sulfate, barium sulfate, magnesium carbonate, titanium dioxide, silica and alumina. When the inorganic pigment other than zinc oxide is employed together with the zinc oxide, it is preferably used in an amount of not more than 20 parts by weight par 100 parts by weight of zinc oxide.

Further, in order to improve the oil-desensitizing property of the image-receiving layer, acrylic resin grains having specific functional groups as described in JP-A-4-201387, JP-A-4-223196, JP-A-4-319491, JP-A-5-58071, JP-A-4-353495 and JP-A-5-119545 may be incorporated thereto. Such resin grains are ordinarily spherical and an average particle size thereof is preferably from 0.1 to 2 $\mu$m. The amount of resin grains used is preferably 20% by weight or less based on the total weight of the image-receiving layer.

The use of these other inorganic pigments or resin grains allows sufficient oil-desensitization of the non-image area to render hydrophilic upon oil-desensitizing treatment, preventing background stain on resulting prints, and ensures sufficient adhesion of the image area onto the image-receiving layer, providing prints of good image qualities without disappearance of image, even when the number of prints is increased.

To the image-receiving layer, a crosslinking agent may be added in order to enhance the film strength.

The binder resin is preferably photochemically and/or thermally cured after coating the coating composition of the image-receiving layer. The thermal curing can be effected by setting the drying conditions for the coated layer to be severer than conventional drying conditions during formation of the image-receiving layer. For example, as to the drying conditions, it is preferred that a higher temperature and/or a longer period of time are applied. Alternatively, after drying the coated layer to eliminate a solvent, heat treatment is further carried out. For example, the heat treatment is conducted at a temperature of from 60 to 15°° C. for a period of from 5 to 120 minutes. With use of a reaction accelerator, the heat treatment can be carried out under milder conditions.

The photochemical curing of the binder resin can be effected by exposing functional groups in the resin to a chemically active ray. Examples of the chemically active ray include any of visible light, ultraviolet ray, far ultraviolet ray, electron beam, X-ray, 7-ray, and a-ray. An ultraviolet ray is preferred. A ray having a wavelength of from 310 to 500 nm is more preferred. For the purpose, a low-pressure, high-pressure or ultrahigh-pressure mercury lamp or a halogen lamp is ordinarily used. The light-exposure is conducted usually at a distance of from 5 to 50 cm for a period of 10 seconds to 10 minutes.

The thickness of the image-receiving layer is preferably in a range of from about 3 to about 30 g/m$^2$ in terms of a dry coating amount of the composition of the image-receiving layer. The image-receiving layer has preferably a porosity of from about 3 to about 50% by volume, more preferably from 10 to 40% by volume.

The image-receiving layer is provided on the water-resistant support. Examples of the water-resistant support include paper subjected to water-resistant treatment, paper laminated with a plastic film or metal foil, and a plastic film.

It is preferred that the support has a highly smooth surface. Specifically smoothness of its surface on the side adjacent to the image-receiving layer is adjusted to preferably at least 300 (second/10 ml), more preferably from 900 to 3,000 (second/10 ml) and particularly preferably from 1,000 to 3,000 (second/10 ml) in the Bekk smoothness.

The image reproducibility and the press life can be still more improved by restricting the smoothness of the surface on the side adjacent to the image-receiving layer of the support to the above described value. Such improving effects are obtained even if surface smoothness of the image-receiving layer used per se is same, and it is considered that the increase in the smoothness of the surface of the support has improved the adhesion of the image area to the image-receiving layer.

The Bekk smoothness can be measured by a Bekk smoothness tester. The Bekk smoothness tester is a tester for measuring a time required for a definite amount (10 ml) of air to pass through between a test piece and a glass surface under a reduced pressure, wherein the test piece is pressed to a highly smoothly finished circular glass plate having a hole at its center under a definite pressure (1 Kg/cm$^2$).

The highly smooth surface of the water-resistant support thus restricted means a surface directly coated with the image-receiving layer. Therefore, for example, when an under layer or an overcoat layer is provided on the support, it means the surface of the under layer or the overcoat layer.

Thus, the image-receiving layer whose surface condition is appropriately adjusted as described above is firmly held without being subjected to the influence of unevenness of the surface of the support and as a result, it makes possible to yet more improve the image quality.

The adjustment of the surface smoothness within the above-described range can be made using various known methods. Specifically, such methods of adjusting the Beck smoothness of the surface of the support include a method of melt-adhering a resin to a surface of a substrate and a method of calender reinforcement with a highly smooth hot roller.

As the above-described method of melt-adhering a resin, an extrusion lamination method is preferred. The support adjusted to the desired smoothness can be produced by coating by the extrusion lamination method. The extrusion lamination method is a method in which a resin is melted into a film, which is immediately pressed to base paper, followed by cooling, thus laminating the base paper with the film, and various apparatuses are known.

The thickness of the resin layer thus laminated is 10 $\mu$m or more in view of production stability, and preferably from 10 to 30 $\mu$m.

Furthermore, the under layer can be provided between the support and the image-receiving layer for improving the water resistance and a interlayer adhesion property as described above, and also a backcoat layer (back surface layer) can be provided on a surface of the support opposite to the image-receiving layer for preventing curling. It is preferred that the backcoat layer has a smoothness value ranging from 150 to 700 (second/10 ml) in the Bekk smoothness.

By providing such a backcoat layer on the support, when the printing plate obtained is supplied to an offset printing machine, the printing plate can be accurately mounted on the machine without the occurrence of shears or slippage.

When the under layer and the backcoat layer of the support are each adjusted to such a smoothness, it is preferred that the smoothness is controlled by repeating a calender treatment step plural times, for example, by once conducting calender treatment after formation of the under layer and conducting it again after formation of the backcoat layer, or by a combination of the adjustment with respect to compositions of the under layer and the backcoat layer described later, for example, the ratio and the grain size of a pigment, and the adjustment of calender treatment conditions.

As a substrate for use in the printing plate precursor, a substrate, for example, wood pulp paper, synthetic pulp paper, mixed paper of wood pulp and synthetic pulp, a nonwoven fabric, a plastic film, cloth, a metal sheet or a composite sheet-like product thereof can be used as it is. Furthermore, for obtaining the desired smoothness and adjusting the water resistance and other characteristics, the above described substrate may be impregnated with a hydrophobic resin or a coating comprising a water-dispersible or water-soluble resin and a pigment, which is used in the under layer or the backcoat layer as described below.

It is preferred that the support comprising the above described substrate having provided thereon the under layer and the backcoat layer is used for satisfying printability required for the lithographic printing plate precursor such as recording characteristics, water resistance and durability, and for adjusting to the desired smoothness as described above. The under layer and backcoat layer is each formed by applying a coating solution containing a resin and a pigment onto the support, followed by drying, or laminating the support.

Various resins are appropriately selected for the resin used herein. Specifically, there are a hydrophobic resin including, for example, an acrylic resin, a vinyl chloride resin, a styrenic resin, a urethane resin, a vinylidene chloride resin and vinyl acetate resin, and a hydrophilic resin including, for example, a polyvinyl alcohol resin, a cellulose derivative, starch and a derivative thereof, a polyacrylamide resin and a styrene-maleic anhydride copolymer.

Suitable examples of the pigment include clay, kaolin, talc, diatom earth, calcium carbonate, aluminum hydroxide, magnesium hydroxide, titanium oxide and mica. In order to attain the desired smoothness, the pigment is preferably used by appropriately selecting its gain size. For example, a relatively high smoothness is required in the under layer, so that pigment from which small-sized and large-sized grains are cut off, specifically, having a grain size of 8 $\mu$m or less, and more preferably about 0.5 to about 5 $\mu$m, is preferably used. On the other hand, a relatively low smoothness is required in the backcoat layer compared with the under layer, so that pigment having relatively a large grain size, specifically, having a grain size of about 0.5 $\mu$m to about 10 $\mu$m is preferably used. The pigment described above is preferably used at a ratio of 80 to 150 parts by weight in the under layer and at a ratio of 80 to 200 parts by weight in the backcoat layer, based on 100 parts by weight of the resin. In order to obtain excellent water resistance, the under layer and the backcoat layer effectively contain a water resistance imparting agent such as a melamine resin and a polyamide-epichlorohydrin resin. The above described grain size can be measured using a scanning electron microscopic (SEM) photograph. When the grain is not spherical, the size means a diameter determined by converting a projected area of the grain to a circle and obtaining the equivalent circle.

In order to prepare the lithographic printing plate precursor, generally, a solution containing components for the under layer is applied onto one side of the support, followed by drying to form the under layer, if desired, a solution containing components for the backcoat layer is further applied onto the other side of the support, followed by drying to form the backcoat layer, if desired, and subsequently, a coating solution containing components for the image-receiving layer is applied, followed by drying to form the image-receiving layer. The coating amounts of the image-receiving layer, the under layer and the backcoat layer are each suitably from 1 to 30 g/m², and preferably from 6 to 20 g/m².

More preferably, the thickness of the water-resistant support provided with the under layer and/or the backcoat layer ranges suitably from 90 to 130 μm, and preferably from 100 to 120 μm.

A method for forming an image on the lithographic printing plate precursor as described above (hereinafter also referred to as a "master") is described below. One example of a device system suitable for performing such a method is shown in FIG. 1.

The device system shown in FIG. 1 comprises an ink jet recording device 1 using an oil-based ink.

As shown in FIG. 1, pattern information of images (figures and letters) to be formed on a master 2 is first supplied from an information supply source such as a computer 3 to the ink jet recording device 1 using oil-based ink through a transmittal means such as a bus 4. An ink jet recording head 10 of the recording device 1 stores oil-based ink therein, and sprays fine droplets of the ink on the master 2 according to the above-described information, when the master 2 passes through in the ink jet recording device 1, whereby the ink adheres to the master 2 in accordance with the above-described pattern.

Thus, the image formation on the master 2 is completed to obtain a printing plate precursor having the image thereon.

Figure 2:
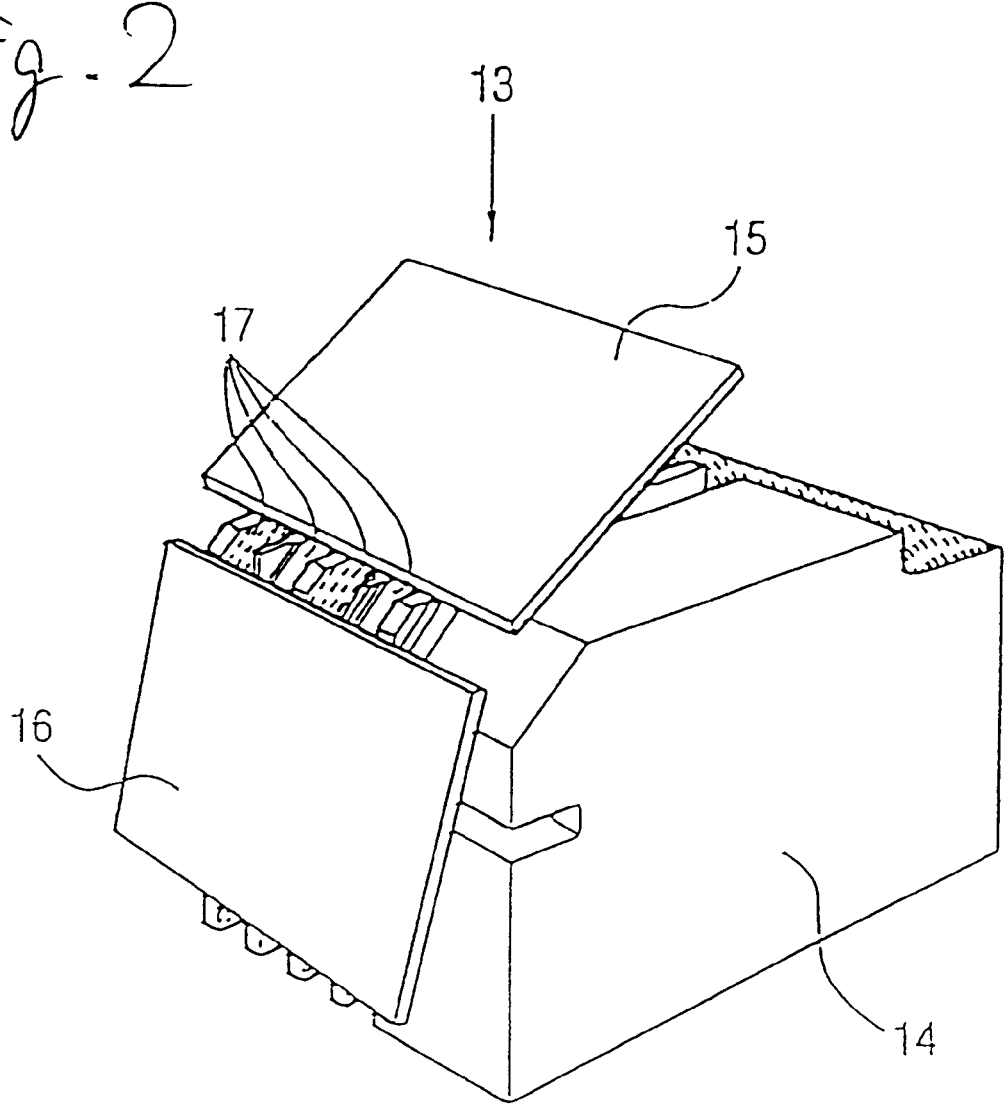
FIG. 2 is a schematic view showing a head of an ink jet recording device to which the present invention is applied.
Figure 3:
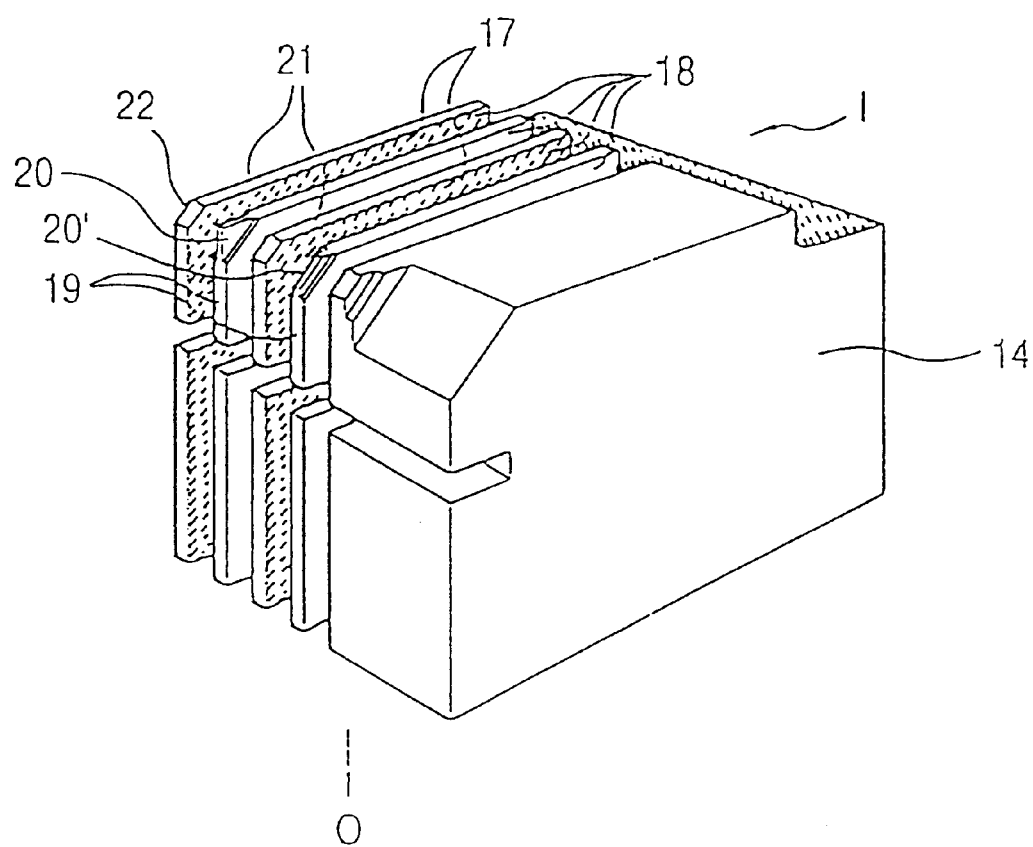
FIG. 3 is a schematic view of the head shown in FIG. 2 from which regulation boards are removed.

Components of the ink jet recording device as shown in the device system of FIG. 1 are shown in FIG. 2 and FIG. 3, respectively.

FIG. 2 is a schematic view showing a part of a head of such an ink jet recording device, and FIG. 3 is a schematic view showing a structure of the head in detail.

The ink jet recording head 10 installed in the ink jet recording device comprises a body of head 14 made of an insulating material such as plastics or ceramics, and meniscus regulation boards 15 and 16. The symbol 17 in the figure stands for an ejection electrode to which a voltage is applied to eject the oil-based ink. The body of head is illustrated in more detail with reference to FIG. 3 wherein the regulation boards are removed.

The body of head 14 has plural ink grooves 18 cut perpendicularly to the edge thereof for the purpose of ink circulation. The ejection electrodes 17 are provided in the grooves respectively. Two ink grooves adjacent to each other to form one cell, a separator wall 19 present in the center of the cell has an ejection part 20 or 20' in its tip part. The separator wall is made thinner in the ejection part 20 or 20' than the other part thereof, and the ejection part is sharpened. The tip of the ejection part may be slightly cut off as shown the ejection part 20'. Only two cells are depicted in the figure for convenience's sake. Between two cells, the separator wall 21 is disposed, and the tip part thereof 22 is cut off so as to stand back compared with the ejection parts 20 and 20'.

The ink is flowed into the head via the ink grooves from the direction of I by means of an ink supplying device (not shown) to supply the ink to the ejection parts. The excess ink is recovered in the direction of O by means of a recovering device (not shown). As a result, fresh ink is always supplied to each ejection part. A counter electrode holding a printing plate precursor on its surface (not shown) is arranged so as to face the ejection part. While keeping such a condition, a voltage is applied to the ejection electrode, and the ink is ejected from the ejection part to form an image on the printing plate precursor.

The image is formed on the lithographic printing plate precursor by the ink jet recording method using the oil-based ink as described above, thereby performing the plate-making.

When a lithographic printing plate precursor having a hydrophilic surface is used, the lithographic printing plate precursor having the image formed thereon is used as it is for offset printing.

On the other hand, in case of using a lithographic printing plate precursor requiring oil-desensitization, the lithographic printing plate precursor having the image formed thereon is subjected to surface treatment with an oil-desensitizing solution to oil-desensitize the non-image area therof, thereby preparing a printing plate.

For the oil-desensitization of zinc oxide in the image-receiving layer, an oil-desensitizing solution conventionally known, for example, a cyan compound-containing desensitizing solution containing a ferrocyanate or ferricyanate as the main component, a cyan-free desensitizing solution containing an ammine-cobalt complex, phytic acid and a derivative thereof, or a guanidine derivative as the main component, a desensitizing solution containing, as the main component, an inorganic or organic acid capable of forming a chelate with zinc ion, and a desensitizing solution containing a water-soluble polymer can be used.

More specifically, the cyan compound-containing desensitizing solutions include those described, for example, in JP-B-44-9045, JP-B-46-39403, JP-A-52-76101, JP-A-57-107889 and JP-A-54-117201. The phytic acid compound-containing desensitizing solutions include those described, -or example, in JP-A-53-83807, JP-A-53-83805, JP-A-53-102102, JP-A-53-109701, JP-A-53-127003, JP-A-54-2803 and JP-A-54-44901. The desensitizing solutions containing a metal complex such as a cobalt complex include those described, for example, in JP-A-53-104301, JP-A-53-140103, JP-A-54-18304, and JP-B-43-28404. The desensitizing solutions containing an inorganic or organic acid include those described, for example, in JP-B-39-13702, JP-B-40-10308, JP-B-43-28408, JP-B-40-26124 and JP-A-51-118501. The guanidine-containing desensitizing solutions include those described, for example, in JP-A-56-111695. The water-soluble polymer-containing desensitizing solutions include those described, for example, in JP-A-52-126302, JP-A-52-134501, JP-A-53-49506, JP-A-53-59502, JP-A-53-104302, JP-B-38-9665, JP-B-39-22263, JP-B-40-763, JP-B-40-2202 and JP-A-49-36402.

Upon the desensitizing treatment using any of the above-described desensitizing solutions, it is believed that zinc oxide in the non-image area of the image-receiving layer is ionized to form a zinc ion which reacts with a chelate-forming compound contained in the desensitizing solution to form a zinc chelate compound which is then deposited on the surface of non-image area, making the non-image area hydrophilic.

The oil-desensitizing treatment is ordinarily conducted at room temperature (about from 15 to 35° C.) for a period of from 2 to 60 seconds.

The lithographic printing plate can provide several thousand sheets of prints or more by offset printing using dampening water in a conventional manner.

The oil-based ink for an ink jet process of an electrostatic type of the present invention is excellent in redispersibility and preservation stability of dispersed particles, does not cause clogging in an ink delivery channel and ensures stable ink ejection.

Also, by the use of the oil-based ink of the present invention in the ink jet process of an electrostatic type, images excellent in ejection stability of ink, clear image formation and image strength are obtained, and a printing plate prepared can provide a large number of prints having clear images.

The present invention will be described in greater detail with reference to the following examples, but the present invention should not be construed as being limited thereto.

PREPARATION EXAMPLE 1 OF RESIN PARTICLE (LA)

Preparation of Resin Particle (LA-1)

A mixed solution of 10 g of Resin for Dispersion Stabilization (P-1) shown below and 280 g of Isopar G was heated to temperature of 70° C. with stirring under a nitrogen gas stream. To the solution was dropwise added a mixture of 30 g of methyl methacrylate, 61 g of methyl acrylate, 9 g of 2-(N,N-dimethylamino)ethyl methacrylate and 1.5 g of 2,2'-azobis(isovaleronitrile) (abbreviated as AIVN) over a period of one hour, followed by stirring for 2 hours. Then, 1.0 g of AIVN was added to the reaction mixture and the mixture was heated to temperature of 75° C., followed by stirring for 3 hours. Then, 0.8 g of 2,2'-azc)bis(isobutyronitrile) (abbreviated as AIBN) was added to the mixture and the mixture was heated to temperature of 80° C., followed by stirring for 3 hours. The temperature of the reaction mixture was raised to 100° C., followed by stirring under a reduced pressure of 200 mmHg for 2 hours, thereby distilling off the unreacted monomers. After cooling the reaction mixture, it was passed through a nylon cloth of 200 mesh. The resulting white dispersion was a latex having a polymerization rate of 99% and an average particle size of 0.35 $\mu$m. The particle size was measured by CAPA-500 manufactured by Horiba Ltd. (hereinafter the same).

A part of the above-described white dispersion was centrifuged at a rotation of $1\times10^4$ r.p.m. for one hour and the resin particles precipitated were collected and dried. A weight average molecular weight (Mw) and a glass transition point (Tg) of the resin particles were measured. The weight average molecular weight (Mw) was measured by GPC method and calculated in terms of polystyrene (hereinafter the same). The weight average molecular weight (Mw) of the resin particles was $2\times10^5$, and the glass transition point (Tg) thereof was 42° C.

Resin for Dispersion Stabilization (P-1)

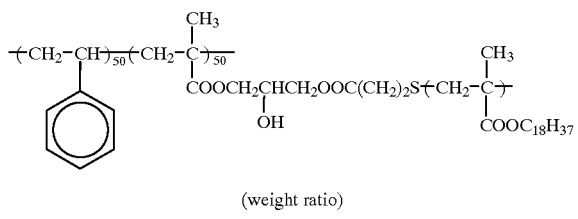

(weight ratio)

Mw: $4 \times 10^4$ (Mw of the octadecyl methacrylate polymer portion: $\times 10^4$)

PREPARATION EXAMPLES 2 TO 4 OF RESIN PARTICLE (LA)

Preparation of Resin Particles (LA-2) to (LA-4)

Each of the resin particles was prepared in the same manner as in Preparation Example 1 of Resin Particle (LA) except for using the basic monomer (B) set forth in Table A below in place of the 2-(N,N-dimethylamino)ethyl methacrylate employed in Preparation Example 1 of Resin Particle (LA) Each of the latexes obtained has an average particle size of from 0.35 to 0.45 $\mu$m. The weight average molecular weight (Mw) of each of the resin particles was in a range of from $1\times10^5$ to $3\times10^5$ and the glass transition point (Tg) thereof was in a range of from 40 to 50° C.

TABLE A

| Preparation Example of Resin Particle (LA) | Resin Particle (LA) | Monomer (B) |
| --- | --- | --- |
| 2 | LA-2 | 2-(N,N-diethylamino) ethyl acrylate |
| 3 | LA-3 | 4-(N,N-dimethylamino) methylstyrene |
| 4 | LA-4 | 3-(N-methyl-N-ethylamino) propyl methacrylate |

PREPARATION EXAMPLE 1 OF RESIN PARTICLE (LB)

Preparation of Resin Particle (LB-1)

A mixed solution of 15 g of Resin for Dispersion Stabilization (P-1) shown above and 280 g of Isopar G was heated to temperature of 70° C. with stirring under a nitrogen gas stream. To the solution were dropwise added simultaneously a mixture of 15 g of methyl methacrylate, 27.9 g of methyl acrylate, 7.5 g of 2-(N,N-dimethylamino)-ethyl methacrylate and 1.5 g of AIVN and a mixture of 15 g of methyl methacrylate, 27.9 g of methyl acrylate, 6.7 g of 2-phosphonoethyl methacrylate and 5 g of ethanol over a period of one hour, followed by stirring for 2 hours. Then, 1.0 g of AIVN was added to the reaction mixture and the mixture was heated to temperature of 75° C., followed by stirring for 3 hours. Then, 0.8 g of AIBN was added to the mixture and the mixture was heated to temperature of 80° C., followed by stirring for 3 hours. The temperature of the reaction mixture was raised to 100° C., followed by stirring under a reduced pressure of 200 mmHg for 2 hours, thereby distilling off the ethanol and unreacted monomers. After cooling the reaction mixture, it was passed through a nylon cloth of 200 mesh. The resulting white dispersion was a latex having a polymerization rate of 99% and an average particle size of 0.33 $\mu$m. The weight average molecular weight (Mw) of the resin particles was $2\times10^5$, and the glass transition point (Tg) thereof was 44° C.

PREPARATION EXAMPLE 2 OF RESIN PARTICLE (LB)

Preparation of Resin Particle (LB-2)

A mixed solution of 12 g of Resin for Dispersion Stabilization (P-2) shown below and 283 g of Isopar G was heated to temperature of 70° C. with stirring under a nitrogen gas stream. To the solution were dropwise added simultaneously a mixture of 20 g of methyl methacrylate, 30 g of ethyl acrylate, 8 g of 2-(N,N-diethylamino)ethyl methacrylate and 1.5 g of AIVN and a mixture of 15 g of methyl methacrylate, 18 g of ethyl acrylate, 9 g of 2-phcsphonoethyl acrylate and 5 g of ethanol over a period of one hour, followed by stirring for 2 hours. Then, 1.0 g of AIVN was added to the reaction mixture and the mixture was heated to temperature of 75° C., followed by stirring for 3 hours. Then, 0.8 g of AIBN was added to the mixture and the mixture was heated to temperature of 80° C., followed by stirring for 3 hours. The temperature of the reaction mixture was raised to 100° C., followed by stirring under a reduced pressure of 200 mmHg for 2 hours, thereby distilling off the ethanol and unreacted monomers. After cooling the reaction mixture, it was passed through a nylon cloth of 200 mesh. The resulting white dispersion was a latex having a polymerization rate of 99% and an average particle size of 0.35 Wm. The weight average molecular weight (Mw) of the resin particles was $3\times10^5$, and the glass transition point (Tg) thereof was 43° C.

Resin for Dispersion Stabilization (P-2)

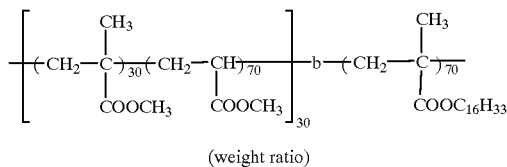

(weight ratio)

Mw: $5 \times 10^4$ (—b— represents a bond between blocks)

PREPARATION EXAMPLE 3 OF RESIN PARTICLE (LB)

Preparation of Resin Particle (LB-3)

A mixed solution of 12 g of Resin for Dispersion Stabilization (P-3) shown below and 280 g of Isopar G was heated to temperature of 75° C. with stirring under a nitrogen gas stream. To the solution were dropwise added simultaneously a mixture of 20 g of methyl methacrylate, 19.7 g of ethyl acrylate, 10 g of 3-(N,N-diethylamino)-propyl methacrylate and 1.5 g of AIBN and a mixture of 20 g of methyl acrylate, 20 g of ethyl acrylate, 10.3 g of 2-phosphonoethyl methacrylate and 8 g of ethanol over a period of one hour, followed by stirring for 2 hours. Then, 1.0 g of AIBN was added to the reaction mixture, followed by stirring for 3 hours. Further, 0.8 g of AIBN was added to the mixture and the mixture was heated to temperature of 80° C., followed by stirring for 3 hours. The temperature of the reaction mixture was raised to 100° C., followed by stirring under a reduced pressure of 200 mmHg for 2 hours, thereby distilling off the ethanol and unreacted monomers. After cooling the reaction mixture, it was passed through a nylon cloth of 200 mesh. The resulting white dispersion was a latex having a polymerization rate of 99% and an average particle size of 0.37 $\mu$m. The weight average molecular weight (Mw) of the resin particles was $1\times10^5$, and the glass transition point (Tg) thereof was 40° C.

Resin for Dispersion Stabilization (P-3)

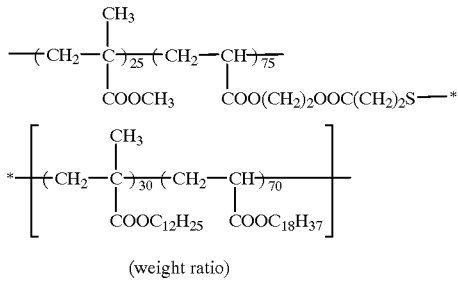

(weight ratio)

Mw: $5 \times 10^4$ (Mw of the soluble portion: $1.5\times10^4$)

PREPARATION EXAMPLE 4 OF RESIN PARTICLE (LB)

Preparation of Resin Particle (LB-4)

A mixed solution of 8 g of Resin for Dispersion Stabilization (PG-1) shown below and 280 g of Isopar G was heated to temperature of 75° C. with stirring under a nitrogen gas stream. To the solution were dropwise added simultaneously a mixture of 15 g of methyl methacrylate, 26 g of methyl acrylate, 8 g of 4-(N,N-dimethylamino) methylstyrene and 1.5 g of AIBN and a mixture of 10 g of methyl methacrylate, 25 g of methyl acrylate, 16 g of 4-phosphonomethylstyrene and 10 g of ethanol over a period of one hour, followed by stirring for 2 hours. Then, 1.0 g of AIBN was added to the reaction mixture, followed by stirring for 3 hours. Further, 0.8 g of AIBN was added to the mixture and the mixture was heated to temperature of 80° C., followed by stirring for 3 hours. The temperature of the reaction mixture was raised to 100° C., followed by stirring under a reduced pressure of 200 mmHg for 2 hours, thereby distilling off the ethanol and unreacted monomers. After cooling the reaction mixture, it was passed through a nylon cloth of 200 mesh. The resulting white dispersion was a latex having a polymerization rate of 98% and an average particle size of 0.33 $\mu$m. The weight average molecular weight (Mw) of the resin particles was $9\times10^4$, and the glass transition point (Tg) thereof was 40° C.

Resin for Dispersion Stabilization (PC-1)

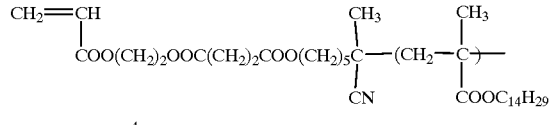

Mw: $4 \times 10^4$

PREPARATION EXAMPLE 5 OF RESIN PARTICLE (LB)

Preparation of Resin Particle (LB-5)

A mixed solution of 8 g of Resin for Dispersion Stabilization (PG-2) shown below and 287 g of Isopar G was heated to temperature of 75° C. with stirring under a nitrogen gas stream. To the solution were dropwise added simultaneously a mixture of 20 g of ethyl methacrylate, 28 g of methyl acrylate, 6 g of 2-(N,N-dimethylamino)ethyl acrylate and 1.5 g of AIVN and a mixture of 10 g of methyl methacrylate, 28 g of methyl acrylate, 8 g of 3-phosphonopropyl methacrylate and 5 g of ethanol over a period of one hour, followed by stirring for 2 hours. Then, 1.0 g of AIVN was added to the reaction mixture and the mixture was heated to temperature of 75° C., followed by stirring for 3 hours. Then, 0.8 g of AIBN was added to the mixture and the mixture was heated to temperature of 80° C., followed by stirring for 3 hours. The temperature of the reaction mixture was raised to 100° C., followed by stirring under a reduced pressure of 200 mmHg for 2 hours, thereby distilling off the ethanol and unreacted monomers. After cooling the reaction mixture, it was passed through a nylon cloth of 200 mesh. The resulting white dispersion was a latex having a polymerization rate of 99% and an average particle size of 0.38 $\mu$m. The weight average molecular weight (Mw) of the resin particles was $1\times10^5$, and the glass transition point (Tg) thereof was 43° C.

Resin for Dispersion Stabilization (PG-2)

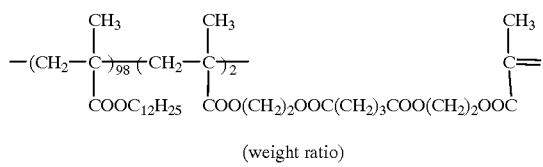

(weight ratio)

Mw: $4.5 \times 10^4$

PREPARATION EXAMPLES 6 TO 10 OF RESIN PARTICLE (LB)

Preparation of Resin Particles (LB-6) to (LB-10)

Each of the resin particles was prepared in the same manner as in Preparation Example 5 of Resin Particle (LB) except for using 0.05 moles (a molar ratio of monomer (B)/monomer (C): 1.2) of each of the monomers (C) each having a —$PO_3H_2$ group set forth in Table B below in place of the 3-phosphonopropyl methacrylate employed in Preparation Example 5 of Resin Particle (LB). Each of the latexes obtained has an average particle size of from 0.35 to 0.45 $\mu$m. The weight average molecular weight (Mw) of each of the resin particles was in a range of from $9\times10^4$ to $2\times10^5$ and the glass transition point (Tg) thereof was in a range of from 40 to 48° C.

TABLE B

| Preparation Example of Resin Particle (LB) | Resin Particle (LB) | Monomer (C) |
|---|---|---|
| 6 | LB-6 | $CH_2=\overset{CH_3}{\underset{|}{C}}-COO(CH_2)_5PO_3H_2$ |
| 7 | LB-7 | $CH_2=CH-\!\!\!\!\begin{array}{c}\phantom{x}\\\text{\Large{\textcircled{}}}\end{array}\!\!\!\!-PO_3H_2$ |
| 8 | LB-8 | $CH_2=\overset{CH_3}{\underset{|}{C}}-COO-\!\!\!\!\begin{array}{c}\phantom{x}\\\text{\Large{\textcircled{}}}\end{array}\!\!\!\!-COO(CH_2)_2OPO_3H_2$ |
| 9 | LB-9 | $CH_2=CH-CONH(CH_2)_{10}OPO_3H_2$ |
| 10 | LB-10 | $CH_2=\overset{CH_3}{\underset{|}{C}}-COO(CH_2)_2NHCOO(CH_2)_3PO_3H_2$ |

PREPARATION EXAMPLE 11 OF RESIN PARTICLE (LB)

Preparation of Resin Particle (LB-11)

A mixed solution of 10 g of Resin for Dispersion Stabilization (PG-3) shown above and 230 g of Isopar G was heated to temperature of 75° C. with stirring under a nitrogen gas stream. To the solution were dropwise added simultaneously a mixture of 42 g of vinyl acetate, 7 g of 2-(N,N-dimethylamino)ethyl crotonate and 1.5 g of AIBN and a mixture of 42.5 g of vinyl acetate, 8.5 g of 2-phosphonoethyl crotonate and 6 g of ethanol over a period of 30 minutes, followed by stirring for 2.5 hours. Then, 1.0 g of AIBN was added to the reaction mixture and the mixture was heated to temperature of 80° C., followed by stirring for 3 hours. Further, 0.8 g of AIBN was added to the mixture and the mixture was heated to temperature of 85° C., followed by stirring for 3 hours. The temperature of the reaction mixture was raised to 100° C., followed by stirring under a reduced pressure of 200 mmHg for 2 hours, thereby distilling off the ethanol and unreacted monomers. After cooling the reaction mixture, it was passed through a nylon cloth of 200 mesh. The resulting white dispersion was a latex having a polymerization rate of 93% and an average particle size of 0.40 um. The weight average molecular weight (Mw) of the resin particles was $8\times10^4$, and the glass transition point (Tg) thereof was 45° C.

Resin for Dispersion Stabilization (PG-3)

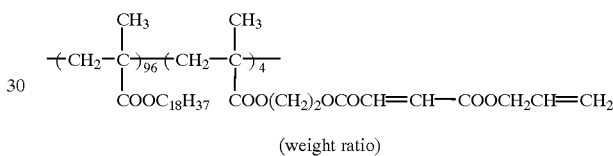

(weight ratio)

Mw: $4 \times 10^4$

PREPARATION EXAMPLES 12 TO 16 OF RESIN PARTICLE (LB)

Preparation of Resin Particles (LB-12) to (LB-16)

Each of the resin particles was prepared in the same manner as in Preparation Example 5 of Resin Particle (LB) except for using 9 g of Resin for Dispersion Stabilization (PG-4) shown below and 0.042 moles of each of the monomers (B) set forth in Table C below in place of 8 g of Resin for Dispersion Stabilization (PG-2) and 6 g of 2-N, N-dimethylamino)ethyl acrylate employed in Preparation Example 5 of Resin Particle (LB), respectively. Each of the latexes obtained has an average particle size of from 0.35 to 0.45 $\mu$m. The weight average molecular weight (Mw) of the resin particles was in a range of from $1\times10^5$ to $3\times10^5$ and the glass transition point (Tg) thereof was in a range of from 40 to 50° C.

Resin for Dispersion Stabilization (PG-4)

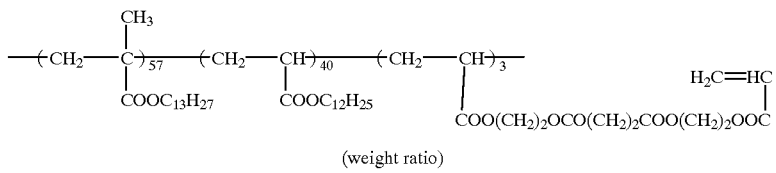

(weight ratio)

Mw: $5 \times 10^4$

TABLE C

| Preparation Example of Resin Particle (LB) | Resin Particle (LB) | Monomer (B) |
|---|---|---|
| 12 | LB-12 | $CH_2=CH-CONH(CH_2)_3N(C_3H_7)_2$ |
| 13 | LB-13 | $CH_2=\overset{CH_3}{\underset{|}{C}}-COO(CH_2)_2N\diagup O$ |
| 14 | LB-14 | $CH_2=\overset{CH_3}{\underset{|}{C}}-COO(CH_2)_2NHCOO(CH_2)_2N\diagup\overset{CH_3}{\underset{CH_2C_6H_5}{}}$ |
| 15 | LB-15 | $CH_2=CH-COO(CH_2)_2NH(CH_2)_2N(C_2H_5)_3$ |
| 16 | LB-16 | $CH_2=CH-CO\underset{CH_3}{N}-\bigcirc-N(CH_3)_2$ |

PREPARATION EXAMPLE 1 OF COMPARATIVE RESIN PARTICLE

Preparation of Comparative Resin Particle (LL-1)

A mixed solution of 10 g of Resin for Dispersion Stabilization (P-1) shown above and 290 g of isopar G was heated to temperature of 70° C. with stirring under a nitrogen gas stream. To the solution was dropwise added a mixture of 30 g of methyl methacrylate, 70 g of methyl acrylate and 1.5 g of AIVN over a period of one hour, followed by stirring for 2 hours. Then, 1.0 g of AIVN was added to the reaction mixture and the mixture was heated to temperature of 75° C., followed by stirring for 3 hours. Then, 0.8 g of AIBN was added to the mixture and the mixture was heated to temperature of 80° C., followed by stirring for 3 hours. The temperature of the reaction mixture was raised to 100° C., followed by stirring under a reduced pressure of 200 mmHg for 2 hours, thereby distilling off the unreacted monomers. After cooling the reaction mixture, it was passed through a nylon cloth of 200 mesh. The resulting white dispersion was a latex having a polymerization rate of 99% and an average particle size of 0.30 μm. The weight average molecular weight (Mw) of the resin particles was $2\times10^5$, and the glass transition point (Tg) thereof was 38° C.

PREPARATION EXAMPLE 2 OF COMPARATIVE RESIN PARTICLE

Preparation of Comparative Resin Particle (LL-2)

A mixed solution of 10 g of Resin for Dispersion Stabilization (P-1) shown above and 285 g of Isopar G was heated to temperature of 70° C. with stirring under a nitrogen gas stream. To the solution were dropwise added simultaneously a mixture of 30 g of methyl methacrylate, 63.3 g of methyl acrylate, 6.7 g of 2-phosphonoethyl methacrylate, 5 g of ethanol and 1.5 g of AIVN over a period of one hour, followed by stirring for 2 hours. Then, 1.0 g of AIVN was added to the reaction mixture and the mixture was heated to temperature of 75° C., followed by stirring for 3 hours. Then, 0.8 g of AIBN was added to the mixture and the mixture was heated to temperature of 80° C., followed by stirring for 3 hours. The temperature of the reaction mixture was raised to 100° C., followed by stirring under a reduced pressure of 200 mmHg for 2 hours, thereby distilling off the ethanol and unreacted monomers. After cooling the reaction mixture, it was passed through a nylon cloth of 200 mesh. The resulting white dispersion was a latex having a polymerization rate of 99% and an average particle size of 0.35 μm. The weight average molecular weight (Mw) of the resin particles was $2\times10^5$, and the glass transition point (Tg) thereof was 45° C.

EXAMPLE 1

Preparation of Lithographic Printing Plate Precursor

A composition having the following component was placed in a paint shaker (manufactured by Toyo Seiki Co., Ltd.) together with glass beads and dispersed for 60 minutes. Then, the glass beads were removed by filtration to obtain a dispersion.

| | |
|---|---|
| Gelatin | 10 g |
| Silica: Silysia 310 (manufactured by Fuji Silysia Chemical Co., Ltd.) | 8 g |
| 20% Solution of Colloidal Silica: Snowtex CR 503 (manufactured by Nissan Chemical Industries, Ltd.) | 38 g |
| Fluorinated Alkyl Ester: FC 430 manufactured by 3M Co.) | 0.8 g |
| Hardening Compound: $CH_2=CHSO_2CH_2CONH(CH_2)_3NHCOCH_2SO_2CH=CH_2$ | 0.24 g |
| Water | 54 g |

On a support of ELP-1 Type Master (manufactured by Fuji Photo Film Co., Ltd.) used as an electrophotographic lithographic printing plate precursor for small-scale commercial printing, the above-described composition was coated using a wire bar and dried at 100° C. for 10 minutes to form an image-receiving layer having a coating amount of 8 g/m², thereby obtaining a lithographic printing plate precursor.

The surface smoothness of the image-receiving layer was determined by measuring the Bekk smoothness (second/10 ml) using a Bekk smoothness tester (manufactured by Kurnagaya Riko Co., Ltd.) under the condition of an air volume of 10 ml.

The contact angle of the image-receiving layer with water was determined by placing 2 μl of distilled water on the surface of the printing plate precursor and measuring the surface contact angle (degree) after 30 seconds using a surface contact angle meter (CA-D, manufactured by Kyowa Kaimen Kagaku Co., Ltd.).

The Bekk smoothness of the surface of the printing plate precursor was 250 (second/10 ml), and the contact angle with water thereof was 0 degree.

Preparation of Oil-Based Ink (IK-1)

Ten grams of poly(dodecyl methacrylate), 10 g of Alkali Blue and 30 g of Shellsol 71 were placed in a paint shaker (manufactured by Toyo Seiki Co., Ltd.) together with glass beads and dispersed for 4 hours, followed by removing glass beads to obtain a blue-colored fine dispersion of Alkali Blue.

Fifty grams (as a solid basis) of Resin Particle (LA-1) according to Preparation Example 1 of Resin Particle (LA), 18 g of the above-described dispersion of Alkali Blue and 0.08 g of octadecene-maleic acid monooctadecylamide copolymer were diluted with one liter of Isopar E, thereby preparing blue-colored oil-based ink.

COMPARATIVE EXAMPLE A

Comparative Example A was conducted in the same manner as in Example 1 with the exception that Oil-Base Ink (IKR-1) for Comparison described below was employed in place of Oil-Based Ink (IK-1) used in Example 1.

Preparation of Oil-Based Ink (IKR-1) for Comparison

Oil-Base Ink (IKR-1) for Comparison was prepared in the same manner as in Oil-Based Ink (IK-1) with the exception that 50 g (as a solid basis) of Comparative Resin Particle (LL-1) was employed in place of Resin Particle (LA-1) used in Oil-Based Ink (IK-1).

COMPARATIVE EXAMPLE B

Comparative Example B was conducted in the same manner as in Example 1 with the exception that Oil-Base Ink (IKR-2) for Comparison described below was employed in place of Oil-Based Ink (IK-1) used in Example 1.

Preparation of Oil-Based Ink (IKR-2) for Comparison Oil-Base Ink (IKR-2) for Comparison was prepared in the same manner as in Oil-Based Ink (IK-1) with the exception that 50 g (as a solid basis) of Comparative Resin Particle (LL-2) was employed in place of Resin Particle (LA-1) used in Oil-Based Ink (IK-1).

With these oil-based ink, various properties, for example, charging property, ejection property, shape of printed dot, image reproducibility and press life were evaluated. The results obtained are shown in Table D below.

TABLE D

|  | Example 1 | Comparative Example A | Comparative Example B |
|---|---|---|---|
| Charging Property[1] Alternating Electric Conductivity (pS/cm) |  |  |  |
| Condition I | 550 | 150 | 130 |
| Condition II | 540 | 115 | 100 |
| Charging Ratio of Particle (%) |  |  |  |
| Condition I | 85% | 50% | 45% |
| Condition II | 80% | 30% | 30% |
| Ejection Property[2] (%) |  |  |  |
| Condition I | 100% | 45% | 35% |
| Condition II | 100% | 20% | 15% |

TABLE D-continued

|  | Example 1 | Comparative Example A | Comparative Example B |
|---|---|---|---|
| Shape of Printed Dot[3] |  |  |  |
| Thickness of Dot | 1.5 μm | 0.8 μm | 0.1 μm or less |
| Shape of Dot | ○ circular shape, neither blur nor distortion | XX occurrence of blur | XX occurrence of severe blue and distortion |
| Image Reproducibility[4] |  |  |  |
| Condition I | ○ good | XX occurrence of disappearance of image | XX occurrence of disappearance of image |
| Condition II | ○ good | XX occurrence of disappearance of image | XX occurrence of disappearance of image |
| Press Life[5] | 3,000 sheets or more | disappearance of image from the start of printing | disappearance of image from the start of printing |

The properties described in Table D were evaluated in the following manner.

Charging Property[1]

<Alternating Electric Conductivity>

A charging amount of the oil-based ink was determined by measuring alternating electric conductivity (pS/cm). The alternating electric conductivity of the ink was measured by an LCR meter (AG-4311 manufactured by Ando Denki Co., Ltd.). Specifically, an electrode for liquid (LP-05 manufactured by Kawaguchi Denki Co., Ltd., electrode constant: 198) positioned in a shield box containing 2.3 ml of the ink to be measured was connected with the LCR meter through a test lead (AG-4912 manufactured by Ando Denki Co., Ltd.), and conductance was measured under the conditions of a voltage applied of 5 V and a measuring frequency of 1 kHz. The value measured was converted into the alternating electric conductivity of the ink using the electrode constant. In the measurement, a measuring parameter of the LCR meter was capacitance and a circuit mode was a parallel mode.

<Charging Ratio of Particle>

A ratio of charging amount of particle dispersed in the ink was determined by the following formula:

$(C_T - C_U)/C_T \times 100$ = Charging Ratio of Particle (%)

wherein $C_T$ represents a charging amount of the whole ink, and $C_U$ represents an charging amount of supernatant fluid.

The charging amount of supernatant fluid is determined by measuring alternating electric conductivity of a transparent supernatant fluid obtained by centrifuging (at $1 \times 10^4$ r.p.m. for one hour) the ink to separate the particles precipitated.

The measurement of the charging property was conducted using two kinds of the ink different in storage conditions after the preparation thereof. In Condition I, the ink allowed to stand under natural conditions (under ordinary temperature and ordinary humidity) for one week after the preparation thereof (Fresh Sample) was used. On the other hand, in Condition II, the ink used was that obtained by further storing the ink of Fresh Sample under high temperature and high humidity conditions (at 40° C. and 85°, RH) for 2 weeks (Stored Sample).

Ejection Property[2]

Figure 4:
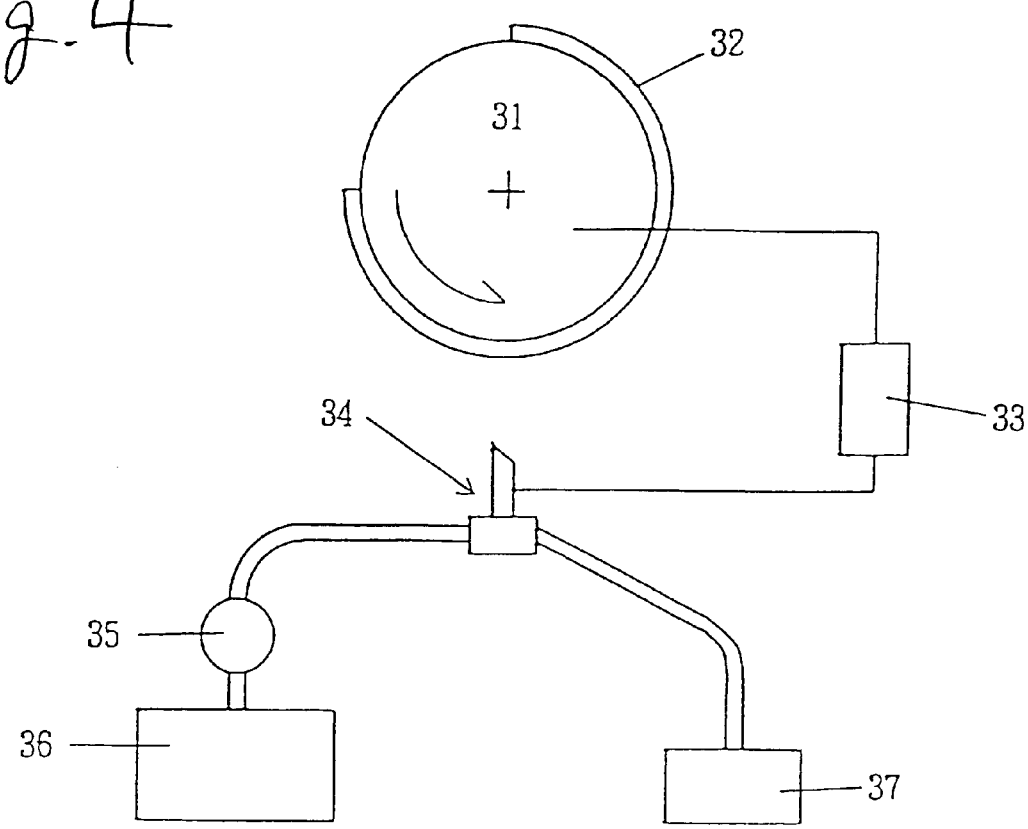
FIG. 4 is a schematic view showing an ejection test device used in the examples.

The ejection property was determined using an ejection test device having an injection needle as an ejection head as illustrated in FIG. 4. The injection needle was made of stainless steel and had the inner diameter of 360 μm, the outer diameter of 615 μm, the cut angle of the tip was 19 degrees, and the radius of curvature was 13 μm. The ink was regularly supplied from the inside of the needle to the tip by a pump and the excess ink was recovered by flowing over on the surface of the needle. The flux of the ink was 0.75 ml/min. The injection needle was positioned at a distance of 300 μm from the surface of the lithographic printing plate precursor mounted on a counter electrode, and while applying a bias voltage of 700 V, a pulse voltage of 800 V and 100 μsec width was additionally applied at a frequency of 2.5 kHz as an ejection voltage.

An ejection ratio (%) was calculated from a number of dots practically printed on the lithographic printing plate precursor to a number of the pulse applied and used for indicating the ejection property.

Conditions I and II used have the same meanings as described in the measurement of the charging property above, respectively.

Shape of Printed Dot[3]

<Thickness of Dot>

The ejection of the ink was conducted according to the method described in the evaluation of ejection property described above. A thickness of the dot printed on the lithographic printing plate precursor was measured using a photograph of scanning electron microscope (SEM). The thicker the dot printed, the more concentrated the particles in the ejected ink.

<Shape of Dot>

Using the lithographic printing plate precursor having the dot image described above, the occurrence of blur or distortion of dot was observed by an optical microscope and the photograph of scanning electron microscope (SEM).

Image Reproducibility[4]

A servo plotter (DA 8400, manufactured by Graphtech Co.) able to write an output from a personal computer was converted so that an ink ejection head as shown in FIG. 2 was mounted on a pen plotter section, and the lithographic printing plate precursor described above was placed on a counter electrode positioned at a distance of 500 μm from the ink ejection head. Printing was performed on the lithographic printing plate precursor using Oil-Based Ink (IK-1) described above to conduct plate-making. Successively, heating was carried out for one minute using a Ricoh Fuser Model 592 (manufactured by Ricoh Co., Ltd.) so as to adjust the surface temperature of the ink image formed to 80° C., thereby sufficiently fixing the image area.

The image formed on the resulting printing plate was visually observed under an optical microscope of 200 magnifications.

Press Life[5]

The printing plate prepared according to the method described in the evaluation of image reproducibility described above was subjected to printing using, as dampening water, a solution prepared by diluting SLM-OD (manufactured by Mitsubishi Paper Mills, Ltd.) 30 times with water, Oliver 94 Type (manufactured by Sakurai Seisakusho Co., Ltd.) as a printing machine, and black ink for offset printing.

A number of prints having clear images without the occurrence of background stain and disappearance of fine lines and fine letters was determined to evaluate the press life.

As is apparent from the results shown in Table D, the excellent charging property is obtained only in Example 1. Further, the change of the charging property is small in Example 1 with the lapse of time and practically acceptable.

On the contrary, both the charging amount of the ink and the charging ratio of particle are small in Comparative Examples A and B. Further, in Comparative Examples A and B, both of the ink exhibit the large change in the charging property and particularly, the charging ratio of particle severely decreases with the lapse of time.

With respect to the results on ejection property and the shape of printed dot on the lithographic printing plate precursor, both the fresh sample and the stored sample had good properties only in Example 1. Specifically, in Comparative Examples A and B, the thickness is low as 1 μm or less and blur of the dot is observed.

As the result of the observation of the image formed by the plate-making, only the ink of Example 1 exhibits the good image reproducibility in both the fresh sample and the stored sample.

Regarding to the press life of the printing plate subjected to the offset printing, more than 3,000 sheets of good prints are obtained only in Example 1. In Comparative Examples A and B, the disappearance of image occurs from the start of printing and the printing plates can not be practically used. Further, the image area on each printing plate disappears after the printing of about 1,000 sheets or less.

From these results, it can be seen that the oil-based ink of the present invention has the large charging amount of the whole ink and the very large charging ratio of particle as 80%. As a result, at the ejection of ink in the electrostatic type ink jet process, the ink meniscus is stably formed on the ejection electrode, the charged particles in the ink rapidly move electrophoretically under controlling the voltage to concentrate the particles, and the ink is ejected from the ejection electrode as it is onto the printing plate precursor as an image receiving material to print.

Thus, the dot formed on the printing plate precursor is thick as the thickness of 1.5 μm or more and has the circular shape, and blur or distortion of the dot is not observed.

Moreover, due to the sufficient thickness of the image area, the printing plate thus prepared exhibits the good property on press life as more than 3,000 sheets of prints as the result of printing.

On the contrary, the ink of Comparative Examples A and B have the small charging amount of the whole ink and the small charging ratio of particle as 50% or less. Therefore, both the ejection property and the concentration of particles are insufficient and the image formed by the plate-making is poor.

In summary, the oil-based ink of the present invention only exhibits the good properties even after the lapse of time.

EXAMPLES 2 TO 4

Each of the oil-based ink was prepared in the same manner as in Example 1 except for using 50 g (as a solid basis) of each of the resin particles shown in Table E below in place of 50 g (as a solid basis) of Resin Particle (LA-1) employed in Oil-Based Ink (IK-1). The properties of each ink was evaluated in the same manner as in Example 1.

TABLE E

| | | | Charging Property (Condition II) | |
|---|---|---|---|---|
| Example | Oil-Based Ink | Resin Particle | Alternating Electric Conductivity (pS/cm) | Charging Ratio of Particle (%) |
| 2 | IK-2 | LA-2 | 530 | 85 |
| 3 | IK-3 | LA-3 | 540 | 82 |
| 4 | IK-4 | LA-4 | 520 | 86 |

Each of Oil-Based Ink (IK-2) to (IK-4) exhibited the charging property similar to that of Oil-Based Ink (IK-1). As a result of the evaluation of the ejection property, shape of printed dot, image reproducibility and press life, the results similar to those in Example 1 were obtained.

EXAMPLE 5

Preparation of Lithographic Printing Plate Precursor

A composition having the following component was placed in a paint shaker together with glass beads and dispersed for 80 minutes. Then, the glass beads were removed by filtration to obtain a dispersion.

| | |
|---|---|
| Silica: Silysia 445 (manufactured by Fuji Silysia Chemical Co., Ltd.) | 40 g |
| 20% Solution of Colloidal Silica: Snowtex C (manufactured by Nissan Chemical Industries, Ltd.) | 200 g |
| 50% Dispersion of Clay | 40 g |
| 10% Solution of Polyvinyl Alcohol: PVA-117 (manufactured by Kuraray Co., Ltd.) | 120 g |
| Melamine Resin | 2.0 g |
| Ammonium Chloride | 0.2 g |
| Water | 50 g |

On a support of ELP-2 Type Master (manufactured by Fuji Photo Film Co., Ltd.) used as an electrophotographic lithographic printing plate precursor for small-scale commercial printing, the above-described composition was coated using a wire bar and dried at 110° C. for 10 minutes to form an image-receiving layer having a coating amount of 6 g/m², thereby obtaining a lithographic printing plate precursor.

The surface smoothness of the image-receiving layer was 300 (second/10 ml) in terms of the Bekk smoothness, and the contact angle with water thereof was 0 degree.

The printing plate precursor was subjected to the plate-making in the same manner as in Example 1 except for using Oil-Based Ink (IK-5) shown below in place of Oil-Based Ink (IK-1) employed in Example 1.

Preparation of Oil-Based Ink (IK-5)

A mixture of 500 g of Resin Particle (LB-5) according to Preparation Example 5 of Resin Particle (LB) and 5 g of Victoria Blue B was heated to temperature of 100° C. and stirred for 3 hours under heating. After cooling to room temperature, the mixture was passed through a nylon cloth of 200 mesh to remove the remaining dye, thereby obtaining a blue-colored resin particle dispersion having an average particle size of 0.40 μm.

Then, 250 g of the above-described blue-colored resin particle dispersion and 0.20 g of zirconium naphthenate, as a charge control agent, were diluted with one liter of a solvent mixture of hexamethyl disiloxane and Isopar G (3:2 in a ratio by weight), thereby preparing blue-colored oil-based ink.

The properties of the ink thus obtained were evaluated in the same manner as in Example 1. The results obtained are shown in Table F below. As can be seen from the results, the charging property, ejection property and shape of printed dot are good even after the lapse of time.

TABLE F

| | Condition I | Condition II |
|---|---|---|
| Alternating Electric Conductivity (pS/cm) | 580 | 560 |
| Charging Ratio of Particle (%) | 95 | 92 |
| Ejection Property | 100% | 100% |
| Shape of Dot | true circle | true circle |
| Thickness of Dot | 1.9 μm | 1.9 μm |

Then, using the printing plate thus prepared the printing was conducted in the same manner as in Example 1. The prints obtained had clear images without the occurrence of stain in the non-image area similar to those obtained in Example 1. The press life was good as 10,000 sheets or more. In case of using the oil-based ink stored under the high temperature and high humidity conditions (Condition II) as described in Example 1, the good results substantially same as those obtained by using the fresh ink were obtained.

EXAMPLES 6 TO 17

The plate-making and printing were conducted in the same manner as in Example 5 using each of the oil-based ink shown in Table G below in place of Oil-Based Ink (IK-5) Each of the oil-based ink was prepared in the same manner as in Example 1 except for using 50 g (as a solid basis) of each of the resin particles shown in Table G below in place of 50 g (as a solid basis) of Resin Particle (LA-1) employed in Oil-Based Ink (IK-1).

TABLE G

| Example | Oil-Based Ink | Resin Particle | | Oil-Based Ink | Resin Particle |
|---|---|---|---|---|---|
| 6 | IK-6 | LB-2 | 12 | JK-12 | LB-9 |
| 7 | IK-7 | LB-3 | 13 | JK-13 | LB-10 |
| 8 | JK-8 | LB-4 | 14 | IK-14 | LB-13 |
| 9 | IK-9 | LB-6 | 15 | IK-15 | LB-14 |
| 10 | IK-10 | LB-7 | 16 | IK-16 | LB-15 |
| 11 | IK-11 | LB-8 | 17 | IK-17 | LB-16 |

The properties of each ink thus obtained were evaluated in the same manner as in Example 1. The alternating electric conductivity of the ink was in a range of from 480 to 550 pS/cm, and the charging ratio of particle thereof was in a range of from 90 to 95%. The image reproducibility was good same as in Example 5. As a result of the printing, each printing plate exhibited press life of 10,000 or more.

In case of using the oil-based ink stored under the high temperature and high humidity conditions (Condition II) as described in Example 1, the good image reproducibility and press life similar to those obtained by using the fresh ink (Fresh Sample) were obtained.

EXAMPLE 18

Preparation of Water-Resistant Support

Using wood free paper having a basis weight of 100 g/m² as a substrate, one surface of the substrate was coated with a coating for an under layer having the composition shown below using a wire bar to form the under layer having a dry coating amount of 10 g/m². The smoothness of the surface of the under layer was 150 (second/10 ml) in terms of the Bekk smoothness, and it was then adjusted to 1,500 (second/10 ml) by conducting a calender treatment.

Coating for Under Layer

| | |
|---|---|
| Silica Gel | 10 parts |
| SBR Latex | 92 parts |
| (50% aqueous dispersion, Tg: 25° C.) | |
| Clay (45% aqueous dispersion) | 110 parts |
| Melamine (80% aqueous solution) | 5 parts |
| Water | 191 parts |

The other surface of the substrate was coated with a coating for a backcoat layer having the composition shown below using a wire bar to form the backcoat layer having a dry coating amount of 12 g/m². Then, a calender treatment was conducted so that the smoothness of the backcoat layer is adjusted to about 50 (second/10 ml) in terms of the Bekk smoothness.

Coating for Backcoat Layer

| | |
|---|---|
| Kaolin (50% aqueous dispersion) | 200 parts |
| Polyvinyl Alcohol (10% aqueous solution) | 60 parts |
| SBR Latex (solid content: 49%, Tg: 0° C.) | 100 parts |
| Primary Condensate of Melamine Resin (solid content: 80%, Sumirez Resin SR-613) | 5 parts |

Preparation of Lithographic Printing Plate Precursor

A mixture of 100 g of zinc oxide, 16 g of Binder Resin (B-1) shown below, 2 g of Binder Resin (B-2) shown below, 0.15 g of benzoic acid and 155 g of toluene was dispersed using a wet-type dispersing machine (Homogenizer, manufactured by Nippon Seiki Co., Ltd.) at a rotation of 6×10³ r.p.m. for 8 minutes to prepare a coating composition for an image-receiving layer.

Binder Resin (B-1)

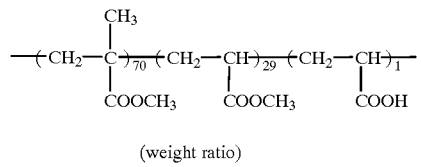

(weight ratio)

Mw: 6 x 10⁴

Binder Resin (B-2)

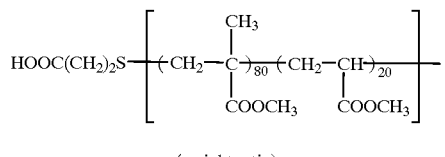

(weight ratio)

Mw: 9 x 10³

The resulting coating composition was coated on the above described water-resistant support using a wire bar and dried to form an image-receiving layer having a coating amount of 10 g/m², thereby preparing a lithographic printing plate precursor. The surface smoothness of the image-receiving layer was 250 (second/10 ml) in terms of the Bekk smoothness, and the contact angle with water thereof was 102 degrees.

Preparation of Oil-Based Ink (IK-18)

Ten grams of Resin for Dispersion Stabilization (P-i) described above, 10 g of black pigment (Microlith Black Conn., manufactured by Ciba-Geigy Ltd.) and 113 g of Isopar E were placed in a paint shaker together with glass beads and dispersed for 6 hours, followed by removing glass beads to obtain a black-colored dispersion.

Forty grams (as a solid basis) of Resin Particle (LB-11) according to Preparation Example 11 of Resin Particle (LB), 66 g of the above-described black-colored dispersion and 0.03 g of octadecyl vinyl ether-maleic acid monodecylamide copolymer were diluted with hexamethyl disiloxane to make one liter, thereby preparing black-colored Oil-Based Ink (IK-18). The alternating electric conductivity of the ink was 580 pS/cm and the charging ratio of particles thereof was 95%.

The plate-making was conducted in the same manner as in Example 1 except for using Oil-Based Ink (IK-18) in place of Oil-Based Ink (IK-1). The resulting printing plate had clear images without disappearance of fine lines and fine letters. The thickness of dot was 2.0 μm and the dots had circular shapes without blur and distortion.

The printing plate was then subjected to printing using a full-automatic printing machine (AM-2850, manufactured by AM Co., Ltd.) provided with an oil-desensitizing solution (ELP-E2, manufactured by Fuji Photo Film Co., Ltd.) in an etcher part thereof and a solution prepared by diluting ELP-E2 four times with distilled water, as dampening water, in a dampening water saucer thereof, and black ink for offset printing.

As a result, more than 3,000 sheets of prints having clear images without the occurrence of background stain were obtained.

PREPARATION EXAMPLE 101 OF RESIN PARTICLE (LA)

Preparation of Resin Particle (LA-101)

A mixed solution of 10 g of Resin for Dispersion Stabilization (P-101) shown below and 280 g of Isopar G was heated to temperature of 70° C. with stirring under a nitrogen gas stream. To the solution was dropwise added a mixture of 30 g of methyl methacrylate, 57 g of methyl acrylate, 4 g of octadecyl acrylate, 9 g of 2-(N,N-dimethylamino)ethyl methacrylate and 1.5 g of 2,2'-azobis (isovaleronitrile) (abbreviated as AIVN) over a period of one hour, followed by stirring for 2 hours. Then, 1.0 g of AIVN was added to the reaction mixture and the mixture was heated to temperature of 75° C., followed by stirring for 3 hours. Then, 0.8 g of 2,2'-azobis(isobutyronitrile)

(abbreviated as AIBN) was added to the mixture and the mixture was heated to temperature of 80° C., followed by stirring for 3 hours. The temperature of the reaction mixture was raised to 100° C., followed by stirring under a reduced pressure of 200 mmHg for 2 hours, thereby distilling off the unreacted monomers. After cooling the reaction mixture, it was passed through a nylon cloth of 200 mesh. The resulting white dispersion was a latex having a polymerization rate of 99% and an average particle size of 0.35 μm. The particle size was measured by CAPA-500 manufactured by Horiba Ltd. (hereinafter the same).

A part of the above-described white dispersion was centrifuged at a rotation of $1\times10^4$ r.p.m. for one hour and the resin particles precipitated were collected and dried. A weight average molecular weight (Mw) and a glass transition point (Tg) of the resin particles were measured. The weight average molecular weight (Mw) was measured by GPC method and calculated in terms of polystyrene (hereinafter the same). The weight average molecular weight (Mw) of the resin particles was $2\times10^5$, and the glass transition point (Tg) thereof was 39° C.

Resin for Dispersion Stabilization (P-101)

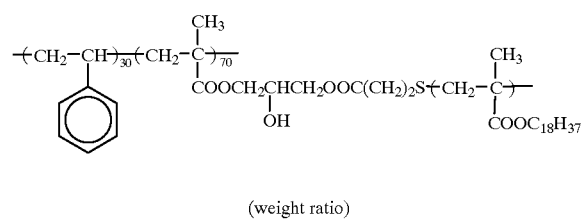

(weight ratio)

Mw: $4 \times 10^4$ (Mw of the octadecyl methacrylate polymer portion: $1\times10^4$)

PREPARATION EXAMPLES 102 TO 106 OF RESIN PARTICLE (LA)

Preparation of Resin Particles (LA-102) to (LA-106)

Each of the resin particles was prepared in the same manner as in Preparation Example 101 of Resin Particle (LA) except for using the monomer (D) and the basic monomer (B) set forth in Table A2 below in place of the octadecyl acrylate and 2-(N,N-dimethylamino)ethyl methacrylate employed in Preparation Example 101 of Resin Particle (LA), respectively. Each of the latexes obtained has an average particle size of from 0.35 to 0.45 μm. The weight average molecular weight (Mw) of each of the resin particles was in a range of from $1\times10^5$ to $3\times10^5$ and the glass transition point (Tg) thereof was in a range of from 40 to 50° C.

TABLE A2

| Preparation Example of Resin Particle (LA) | Resin Particle (LA) | Monomer (B) | Monomer (D) |
| --- | --- | --- | --- |
| 102 | LA-102 | 2-(N,N-diethyl-amino) ethyl acrylate | Steary methacrylate |
| 103 | LA-103 | 4-(N,N-dimethyl-amino)methylstyrene | 2-(Decyloxy-carbonyl) ethyl methacrylate |

TABLE A2-continued

| Preparation Example of Resin Particle (LA) | Resin Particle (LA) | Monomer (B) | Monomer (D) |
| --- | --- | --- | --- |
| 104 | LA-104 | 3-(N-methyl-N-ethylamino) propyl methacrylate | 2,3-Diheptanoyl oxypropyl methacrylate |
| 105 | LA-105 | 2-(N,N-diethyl-amino) ethyl methacrylate | Dodecyl acrylate |
| 106 | LA-106 | 2-(N,N-dipropyl-amino) ethyl acrylate | Hexadecyl methacrylate |

PREPARATION EXAMPLE 101 OF RESIN PARTICLE (LB)

Preparation of Resin Particle (LB-101)

A mixed solution of 15 g of Resin for Dispersion Stabilization (P-101) shown above and 280 g of Isopar G was heated to temperature of 70° C. with stirring under a nitrogen gas stream. To the solution were dropwise added simultaneously a mixture of 15 g of methyl methacrylate, 22.9 g of methyl acrylate, 5 g of dodecyl methacrylate, 7.5 g of 2-(N,N-dimethylamino)ethyl methacrylate and 1.5 g of AIVN and a mixture of 15 g of methyl methacrylate, 27.9 g of methyl acrylate, 6.7 g of 2-phosphonoethyl methacrylate and 5 g of ethanol over a period of one hour, followed by stirring for 2 hours. Then, 1.0 g of AIVN was added to the reaction mixture and the mixture was heated to temperature of 75° C., followed by stirring for 3 hours. Then, 0.8 g of AIBN was added to the mixture and the mixture was heated to temperature of 80° C., followed by stirring for 3 hours. The temperature of the reaction mixture was raised to 100° C., followed by stirring under a reduced pressure of 200 mmHg for 2 hours, thereby distilling off the ethanol and unreacted monomers. After cooling the reaction mixture, it was passed through a nylon cloth of 200 mesh. The resulting white dispersion was a latex having a polymerization rate of 99% and an average particle size of 0.34 μm. The weight average molecular weight (Mw) of the resin particles was $2\times10^5$, and the glass transition point (Tg) thereof was 42° C.

PREPARATION EXAMPLE 102 OF RESIN PARTICLE (LB)

Preparation of Resin Particle (LB-102)

A mixed solution of 12 g of Resin for Dispersion Stabilization (P-102) shown below and 283 g of Isopar G was heated to temperature of 70° C. with stirring under a nitrogen gas stream. To the solution were dropwise added simultaneously a mixture of 20 g of methyl methacrylate, 30 g of ethyl acrylate, 3 g of Monomer (d-1) shown below, 5 g of 2-(N,N-diethylamino)ethyl methacrylate and 1.5 g of AIVN and a mixture of 15 g of methyl methacrylate, 22.8 g of ethyl acrylate, 4.2 g of 2-phosphonoethyl acrylate and 5 g of ethanol over a period of one hour, followed by stirring for 2 hours. Then, 1.0 g of AIVN was added to the reaction mixture and the mixture was heated to temperature of 75° C., followed by stirring for 3 hours. Then, 0.8 g of AIBN was added to the mixture and the mixture was heated to temperature of 80° C., followed by stirring for 3 hours. The temperature of the reaction mixture was raised to 100° C., followed by stirring under a reduced pressure of 200 mmHg for 2 hours, thereby distilling off the ethanol and unreacted monomers. After cooling the reaction mixture, it was passed through a nylon cloth of 200 mesh. The resulting white dispersion was a latex having a polymerization rate of 99% and an average particle size of 0.36 μm. The weight average molecular weight (Mw) of the resin particles was $3 \times 10^5$, and the glass transition point (Tg) thereof was 42° C.

Monomer (d-1)

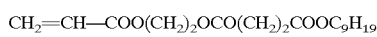

Resin for Dispersion Stabilization (P-102)

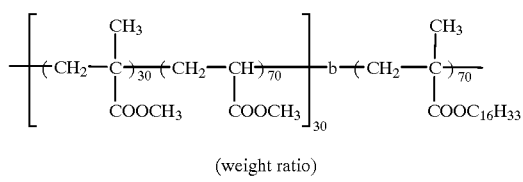

(weight ratio)

Mw: $5 \times 10^4$ (—b— represents a bond between blocks)

PREPARATION EXAMPLE 103 OF RESIN PARTICLE (LB)

Preparation of Resin Particle (LB-103)

A mixed solution of 12 g of Resin for Dispersion Stabilization (P-103) shown below and 280 g of Isopar G was heated to temperature of 75° C. with stirring under a nitrogen gas stream. To the solution were dropwise added simultaneously a mixture of 21 g of methyl methacrylate, 19.7 g of ethyl acrylate, 4 g of hexadecyl acrylate, 5 g of 3-(N,N-diethylamino)propyl methacrylate and 1.5 g of AIBN and a mixture of 20 g of methyl acrylate, 25.1 g of ethyl acrylate, 5.2 g of 2-phosphonoethyl methacrylate and 8 g of ethanol over a period of one hour, followed by stirring for 2 hours. Then, 1.0 g of AIBN was added to the reaction mixture, followed by stirring for 3 hours. Further, 0.8 g of AIBN was added to the mixture and the mixture was heated to temperature of 80° C., followed by stirring for 3 hours. The temperature of the reaction mixture was raised to 100° C., followed by stirring under a reduced pressure of 200 mmHg for 2 hours, thereby distilling off the ethanol and unreacted monomers. After cooling the reaction mixture, it was passed through a nylon cloth of 200 mesh. The resulting white dispersion was a latex having a polymerization rate of 99% and an average particle size of 0.37 μm. The weight average molecular weight (Mw) of the resin particles was $1 \times 10^5$, and the glass transition point (Tg) thereof was 40° C.

Resin for Dispersion Stabilization (P-103)

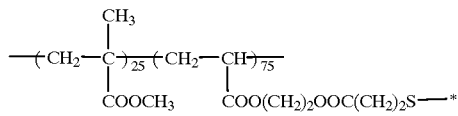

-continued

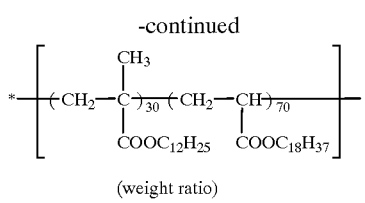

(weight ratio)

Mw: $5 \times 10^4$ (Mw of the soluble portion: $1.5 \times 10^4$)

PREPARATION EXAMPLE 104 OF RESIN PARTICLE (LB)

Preparation of Resin Particle (LB-104)

A mixed solution of 8 g of Resin for Dispersion Stabilization (PG-101) shown below and 280 g of Isopar G was heated to temperature of 75° C. with stirring under a nitrogen gas stream. To the solution were dropwise added simultaneously a mixture of 17 g of methyl methacrylate, 26 g of methyl acrylate, 2 g of Monomer (d-2) shown below, 4 g of 4-(N,N-dimethylamino)methylstyrene and 1.5 g of AIBN and a mixture of 17 g of methyl methacrylate, 25 g of methyl acrylate, 8 g of 4-phosphonomethylstyrene and 10 g of ethanol over a period of one hour, followed by stirring for 2 hours. Then, 1.0 g of AIBN was added to the reaction mixture, followed by stirring for 3 hours. Further, 0.8 g of AIBN was added to the mixture and the mixture was heated to temperature of 80° C., followed by stirring for 3 hours. The temperature of the reaction mixture was raised to 100° C., followed by stirring under a reduced pressure of 200 mmHg for 2 hours, thereby distilling off the ethanol and unreacted monomers. After cooling the reaction mixture, it was passed through a nylon cloth of 200 mesh. The resulting white dispersion was a latex having a polymerization rate of 98% and an average particle size of 0.35 μm. The weight average molecular weight (Mw) of the resin particles was $9 \times 10^4$, and the glass transition point (Tg) thereof was 41° C.

Monomer (d-2)

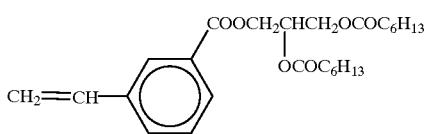

Resin for Dispersion Stabilization (PG-101)

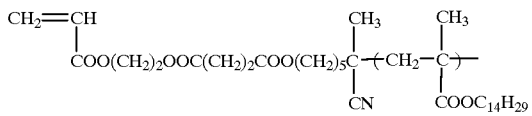

Mw: $4 \times 10^4$

PREPARATION EXAMPLE 105 OF RESIN PARTICLE (LB)

Preparation of Resin Particle (LB-105)

A mixed solution of 8 g of Resin for Dispersion Stabilization (PG-102) shown below and 287 g of Isopar G was heated to temperature of 75° C. with stirring under a nitrogen gas stream. To the solution were dropwise added simultaneously a mixture of 20 g of ethyl methacrylate, 24 g of methyl acrylate, 4 g of octadecyl acrylate, 6 g of 2-(N,N-dimethylamino)ethyl acrylate and 1.5 g of AIVN and a mixture of 11 g of ethyl methacrylate, 28 g of methyl acrylate, 7 g of 3-phosphonopropyl methacrylate and 5 g of ethanol over a period of one hour, followed by stirring for 2 hours. Then, 1.0 g of AIVN was added to the reaction mixture and the mixture was heated to temperature of 75° C., followed by stirring for 3 hours. Then, 0.8 g of AIBN was added to the mixture and the mixture was heated to temperature of 80° C., followed by stirring for 3 hours. The temperature of the reaction mixture was raised to 100° C., followed by stirring under a reduced pressure of 200 mmHg for 2 hours, thereby distilling off the ethanol and unreacted monomers. After cooling the reaction mixture, it was passed through a nylon cloth of 200 mesh. The resulting white dispersion was a latex having a polymerization rate of 99% and an average particle size of 0.38 µm. The weight average molecular weight (Mw) of the resin particles was $1\times10^5$, and the glass transition point (Tg) thereof was 40° C.

Resin for Dispersion Stabilization (PC-102)

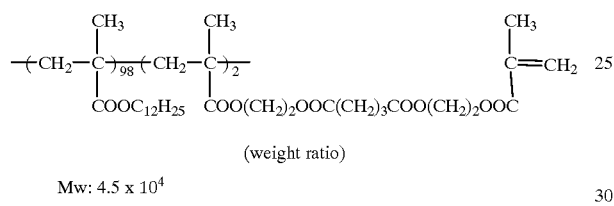

(weight ratio)

Mw: $4.5 \times 10^4$

PREPARATION EXAMPLES 106 TO 110 OF RESIN PARTICLE (LB)

Preparation of Resin Particles (LB-106) to (LB-110)

Each of the resin particles was prepared in the same manner as in Preparation Example 105 of Resin Particle (LB) except for using 0.042 moles (a molar ratio of monomer (B)/monomer (C): 1.0) of each of the monomers (C) each having a —$PO_3H_2$ group set forth in Table B2 below in place of the 3-phosphonopropyl methacrylate employed in Preparation Example 105 of Resin Particle (LB). Each of the latexes obtained has an average particle size of from 0.35 to 0.45 µm. The weight average molecular weight (Mw) of each of the resin particles was in a range of from $9\times10^4$ to $2\times10^5$ and the glass transition point (Tg) thereof was in a range of from 40 to 48° C.

TABLE B2

| Preparation Example of Resin Particle (LB) | Resin Particle (LB) | Monomer (C) |
|---|---|---|
| 106 | LB-106 | $CH_2=\overset{CH_3}{\underset{|}{C}}-COO(CH_2)_5PO_3H_2$ |
| 107 | LB-107 | $CH_2=CH-\langle C_6H_4\rangle-PO_3H_2$ |

TABLE B2-continued

| Preparation Example of Resin Particle (LB) | Resin Particle (LB) | Monomer (C) |
|---|---|---|
| 108 | LB-108 | $CH_2=\overset{CH_3}{\underset{|}{C}}-COO-\langle C_6H_4\rangle-COO(CH_2)_2OPO_3H_2$ |
| 109 | LB-109 | $CH_2=CH-CONH(CH_2)_{10}OPO_3H_2$ |
| 110 | LB-110 | $CH_2=\overset{CH_3}{\underset{|}{C}}-COO(CH_2)_2NHCOO(CH_2)_3PO_3H_2$ |

PREPARATION EXAMPLES 111 TO 115 OF RESIN PARTICLE (LB)

Preparation of Resin Particles (LB-111) to (LB-115)

Each of the resin particles was prepared in the same manner as in Preparation Example 105 of Resin Particle (LB) except for using each of the monomers (D) set forth in Table C2 below in place of the octadecyl acrylate employed in Preparation Example 105 of Resin Particle (LB). Each of the latexes obtained has an average particle size of from 0.35 to 45 µm. The weight average molecular weight (Mw) of each of the resin particles was in a range of from $8\times10^4$ to $2\times10^5$ and the glass transition point (Tg) thereof was in a range of from 38 to 42° C.

TABLE C2

| Preparation Example of Resin Particle (LB) | Resin Particle (LB) | Monomer (D) |
|---|---|---|
| 111 | LB-111 | $CH_2=CH-COO(CH_2)_2OCOCH=CH-COOC_{10}H_{21}$ |
| 112 | LB-112 | $CH_2=\overset{CH_3}{\underset{|}{C}}-COOCHCH_2CHOCOC_5H_{11}$<br>$\quad\quad\quad\quad\quad\quad\quad\quad\quad\quad\quad\underset{|}{OCO(CH_2)_2COOC_5H_{11}}$ |
| 113 | LB-113 | $CH_2=\overset{CH_3}{\underset{|}{C}}-COOCH_2CHCH_2OCO(CH_2)_2COOC_6H_{13}$<br>$\quad\quad\quad\quad\quad\quad\quad\quad\quad\underset{|}{OCOC_6H_{13}}$ |
| 114 | LB-114 | $CH_2=CH$<br>$\quad\underset{|}{COOCH_2CHCH_2NH(CH_2)_2OCOC_8H_{17}}$<br>$\quad\quad\quad\quad\quad\underset{|}{OCOC_6H_{13}}$ |
| 115 | LB-115 | $CH_2=\overset{CH_3}{\underset{|}{C}}-COO(CH_2)_2NHCOOC_{13}H_{27}$ |

PREPARATION EXAMPLE 116 OF RESIN PARTICLE (LB)

Preparation of Resin Particle (LB-116)

A mixed solution of 10 g of Resin for Dispersion Stabilization (PG-103) shown above and 230 g of Isopar G was heated to temperature of 75° C. with stirring under a nitrogen gas stream. To the solution were dropwise added simultaneously a mixture of 45 g of vinyl acetate, 5 g of 2-(N,N-dimethylamino)ethyl crotonate, 5 g of 2,3-dioctanoyloxypropyl methacrylate and 1.5 g of AIBN and a mixture of 45 g of vinyl acetate, 6 g of 2-phosphonoethyl crotonate and 6 g of ethanol over a period of 30 minutes, followed by stirring for 2.5 hours. Then, 1.0 g of AIBN was added to the reaction mixture and the mixture was heated to temperature of 80° C., followed by stirring for 3 hours. Further, 0.8 g of AIBN was added to the mixture and the mixture was heated to temperature of 85° C., followed by stirring for 3 hours. The temperature of the reaction mixture was raised to 100° C., followed by stirring under a reduced pressure of 200 mmHg for 2 hours, thereby distilling off the ethanol and unreacted monomers. After cooling the reaction mixture, it was passed through a nylon cloth of 200 mesh. The resulting white dispersion was a latex having a polymerization rate of 93% and an average particle size of 0.40 μm. The weight average molecular weight (Mw) of the resin particles was $8 \times 10^4$, and the glass transition point (Tg) thereof was 44° C.

Resin for Dispersion Stabilization (PG-103)

$$-(CH_2-\underset{COOC_{18}H_{37}}{\underset{|}{\overset{CH_3}{\underset{|}{C}}}})_{97}(CH_2-\underset{COO(CH_2)_2OCOCH=CH-COOCH_2CH=CH_2}{\underset{|}{\overset{CH_3}{\underset{|}{C}}}})_{3}-$$

(weight ratio)

Mw: $4 \times 10^4$

PREPARATION EXAMPLES 117 TO 121 OF RESIN PARTICLE (LB)

Preparation of Resin Particles (LB-117) to (LB-121)

Each of the resin particles was prepared in the same manner as in Preparation Example 105 of Resin Particle (LB) except for using 9 g of Resin for Dispersion Stabilization (PG-104) shown below and 0.042 moles of each of the monomers (B) set forth in Table D2 below in place of 8 g of Resin for Dispersion Stabilization (PG-102) and 6 g of 2-N,N-dimethylamino)ethyl acrylate employed in Preparation Example 105 of Resin Particle (LB), respectively. Each of the latexes obtained has an average particle size of from 0.35 to 0.45 μm. The weight average molecular weight (Mw) of the resin particles was in a range of from $1 \times 10^5$ to $3 \times 10^5$ and the glass transition point (Tg) thereof was in a range of from 40 to 50C.

Resin for Dispersion Stabilization (PG-104)

TABLE D2

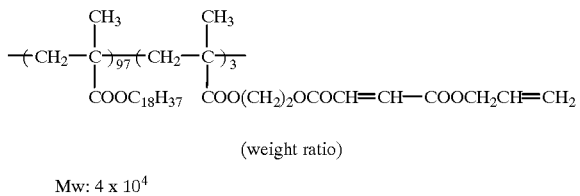

Mw: $5 \times 10^4$

| Preparation Example of Resin Particle (LB) | Resin Particle (LB) | Monomer (B) |
|---|---|---|
| 117 | LB-117 | $CH_2=CH-CONH(CH_2)_3N(C_3H_7)_2$ |
| 118 | LB-118 | $CH_2=\underset{CH_3}{\overset{|}{C}}-COO(CH_2)_2N\!\!\bigcirc\!\!O$ (morpholine) |
| 119 | LB-119 | $CH_2=\underset{CH_3}{\overset{|}{C}}-COO(CH_2)_2NHCOO(CH_2)_2N\!\!\begin{array}{l}CH_3\\CH_2C_6H_5\end{array}$ |
| 120 | LB-120 | $CH_2=CH-COO(CH_2)_2NH(CH_2)_2N(C_2H_5)_3$ |
| 121 | LB-121 | $CH_2=CH-CON(CH_3)-C_6H_4-N(CH_3)_2$ |

PREPARATION EXAMPLE 101 OF COMPARATIVE RESIN PARTICLE

Preparation of Comparative Resin Particle (LL-101)

A mixed solution of 10 g of Resin for Dispersion Stabilization (P-101) shown above and 290 g of Isopar G was heated to temperature of 70° C. with stirring under a nitrogen gas stream. To the solution was dropwise added a mixture of 30 g of methyl methacrylate, 66 g of methyl acrylate, 4 g of octadecyl acrylate and 1.5 g of AIVN over a period of one hour, followed by stirring for 2 hours. Then, 1.0 g of AIVN was added to the reaction mixture and the mixture was heated to temperature of 75° C., followed by stirring for 3 hours. Then, 0.8 g of AIBN was added to the mixture and the mixture was heated to temperature of 80° C., followed by stirring for 3 hours. The temperature of the reaction mixture was raised to 100° C., followed by stirring under a reduced pressure of 200 mmHg for 2 hours, thereby distilling off the unreacted monomers. After cooling the reaction mixture, it was passed through a nylon cloth of 200 mesh. The resulting white dispersion was a latex having a polymerization rate of 99% and an average particle size of 0.30 μm. The weight average molecular weight (Mw) of the resin particles was $2 \times 10^5$, and the glass transition point (Tg) thereof was 38° C.

PREPARATION EXAMPLE 102 OF COMPARATIVE RESIN PARTICLE

Preparation of Comparative Resin Particle (LL-102)

A mixed solution of 10 g of Resin for Dispersion Stabilization (P-101) shown above and 285 g of Isopar G was heated to temperature of 70° C. with stirring under a nitrogen gas stream. To the solution were dropwise added simultaneously a mixture of 30 g of methyl methacrylate, 63.3 g of methyl acrylate, 4 g of octadecyl acrylate, 6.7 g of 2-phosphonoethyl methacrylate, 5 g of ethanol and 1.5 g of AIVN over a period of one hour, followed by stirring for 2 hours. Then, 1.0 g of AIVN was added to the reaction mixture and the mixture was heated to temperature of 75° C., followed by stirring for 3 hours. Then, 0.8 g of AIBN was added to the mixture and the mixture was heated to temperature of 80° C., followed by stirring for 3 hours. The temperature of the reaction mixture was raised to 100° C., followed by stirring under a reduced pressure of 200 mmHg for 2 hours, thereby distilling off the ethanol and unreacted monomers. After cooling the reaction mixture, it was passed through a nylon cloth of 200 mesh. The resulting white dispersion was a latex having a polymerization rate of 99% and an average particle size of 0.35 $\mu$m. The weight average molecular weight (Mw) of the resin particles was $2\times10^5$, and the glass transition point (Tg) thereof was 45° C.

EXAMPLE 101
Preparation of Lithographic Printing Plate Precursor

A composition having the following component was placed in a paint shaker (manufactured by Toyo Seiki Co., Ltd.) together with glass beads and dispersed for 60 minutes. Then, the glass beads were removed by filtration to obtain a dispersion.

| | |
|---|---|
| Gelatin | 10 g |
| Silica: Silysia 310 (manufactured by Fuji Silysia Chemical Co., Ltd.) | 8 g |
| 20% Solution of Colloidal Silica: Snowtex CR 503 (manufactured by Nissan Chemical Industries, Ltd.) | 38 g |
| Fluorinated Alkyl Ester: FC 430 manufactured by 3M Co.) | 0.8 g |
| Hardening Compound: $CH_2$=$CHSO_2CH_2CONH(CH_2)_3NHCOCH_2SO_2CH$=$CH_2$ | 0.24 g |
| Water | 54 g |

On a support of ELP-1 Type Master (manufactured by Fuji Photo Film Co., Ltd.) used as an electrophotographic lithographic printing plate precursor for small-scale commercial printing, the above-described composition was coated using a wire bar and dried at 100° C. for 10 minutes to form an image-receiving layer having a coating amount of 8 g/m$^2$, thereby obtaining a lithographic printing plate precursor.

The surface smoothness of the image-receiving layer was determined by measuring the Bekk smoothness (second/10 ml) using a Bekk smoothness tester (manufactured by Kumagaya Riko Co., Ltd.) under the condition of an air volume of 10 ml.

The contact angle of the image-receiving layer with water was determined by placing 2 $\mu$l of distilled water on the surface of the printing plate precursor and measuring the surface contact angle (degree) after 30 seconds using a surface contact angle meter (CA-D, manufactured by Kyowa Kaimen Kagaku Co., Ltd.).

The Bekk smoothness of the surface of the printing plate precursor was 250 (second/10 ml), and the contact angle with water thereof was 0 degree.

Preparation of Oil-Based Ink (IK-101)

Ten grams of poly(dodecyl methacrylate), 10 g of Alkali Blue and 30 g of Shellsol 71 were placed in a paint shaker (manufactured by Toyo Seiki Co., Ltd.) together with glass beads and dispersed for 4 hours, followed by removing glass beads to obtain a blue-colored fine dispersion of Alkali Blue.

Fifty grams (as a solid basis) of Resin Particle (LA-101) according to Preparation Example 101 of Resin Particle (LA), 18 g of the above-described dispersion of Alkali Blue and 0.15 g of cobalt naphthenate were diluted with one liter of Isopar E, thereby preparing blue-colored oil-based ink.

COMPARATIVE EXAMPLE 101A

Comparative Example 101A was conducted in the same manner as in Example 101 with the exception that Oil-Base Ink (IKR-101) for Comparison described below was employed in place of Oil-Based Ink (IK-101) used in Example 101.

Preparation of Oil-Based Ink (IKR-101) for Comparison

Oil-Base Ink (IKR-101) for Comparison was prepared in the same manner as in Oil-Based Ink (IK-101) with the exception that 50 g (as a solid basis) of Comparative Resin Particle (LL-101) was employed in place of Resin Particle (LA-101) used in Oil-Based Ink (IK-101).

COMPARATIVE EXAMPLE 101B

Comparative Example 101B was conducted in the same manner as in Example 101 with the exception that Oil-Base Ink (IKR-102) for Comparison described below was employed in place of Oil-Based Ink (IK-101) used in Example 101.

Preparation of Oil-Based Ink (IER-102) for Comparison

Oil-Base Ink (IKR-102) for Comparison was prepared in the same manner as in Oil-Based Ink (IK-101) with the exception that 50 g (as a solid basis) of Comparative Resin Particle (LL-102) was employed in place of Resin Particle (LA-101) used in Oil-Based Ink (IK-101).

With these oil-based ink, various properties, for example, charging property, ejection property, shape of printed dot, image reproducibility, press life and dispersion stability were evaluated. The results obtained are shown in Table E2 below.

TABLE E2

| | Example 1 | Comparative Example A | Comparative Example B |
|---|---|---|---|
| Charging Property[1] Alternating Electric Conductivity (ps/cm) | | | |
| Condition I | 400 | 150 | 130 |
| Condition II | 380 | 115 | 100 |
| Charging Ratio of Particle (%) | | | |
| Condition I | 80% | 40% | 35% |
| Condition II | 77% | 30% | 25% |
| Ejection Property[2] (%) | | | |
| Condition I | 100% | 45% | 30% |
| Condition II | 100% | 20% | 15% |
| Shape of Printed Dot[3] | | | |
| Thickness of Dot | 1.5 $\mu$m | 0.8 $\mu$m | 0.1 $\mu$m or less |
| Shape of Dot | ○ circular shape, neither blur nor distortion | xx occurrence of blur | xx occurrence of severe blue and distortion |

TABLE E2-continued

|  | Example 1 | Comparative Example A | Comparative Example B |
|---|---|---|---|
| Image Reproducibility[4] | | | |
| Condition I | ◯ good | XX occurrence of disappearance of image | XX occurrence of disappearance of Image |
| Condition II | ◯ good | XX occurrence of disappearance of image | XX occurrence of disappearance of image |
| Press Life[5] | 3,000 sheets ore more | disappearance of image from the start of printing | disappearance of image from the start of printing |

The properties described in Table E2 were evaluated in the following manner.

Charging Property[1]

<Alternating Electric Conductivity>

A charging amount of the oil-based ink was determined by measuring alternating electric conductivity (pS/cm). The alternating electric conductivity of the ink was measured by an LCR meter (AG-4311 manufactured by Ando Denki Co., Ltd.). Specifically, an electrode for liquid (LP-05 manufactured by Kawaguchi Denki Co., Ltd., electrode constant: 198) positioned in a shield box containing 2.3 ml of the ink to be measured was connected with the LCR meter through a test lead (AG-4912 manufactured by Ando Denki Co., Ltd.), and conductance was measured under the conditions of a voltage applied of 5 V and a measuring frequency of 1 kHz. The value measured was divided by the electrode constant to obtain the alternating electric conductivity of the ink. In the measurement, a measuring parameter of the LCR meter was capacitance and a circuit mode was a parallel mode.

<Charging Ratio of Particle>

A ratio of charging amount of particle dispersed in the ink was determined by the following formula:

$(C_T - C_U)/C_T \times 100 =$ Charging Ratio of Particle (%)

wherein $C_T$ represents a charging amount of the whole ink, and $C_U$ represents an charging amount of supernatant fluid.

The charging amount of supernatant fluid is determined by measuring alternating electric conductivity of a transparent supernatant fluid obtained by centrifuging (at $1 \times 10^4$ r.p.m. for one hour) the ink to separate the particles precipitated.

The measurement of the charging property was conducted using two kinds of the ink different in storage conditions after the preparation thereof. In Condition I, the ink allowed to stand under natural conditions (under ordinary temperature and ordinary humidity) for one week after the preparation thereof (Fresh Sample) was used. On the other hand, in Condition II, the ink used was that obtained by further storing the ink of Fresh Sample under high temperature and high humidity conditions (at 35° C. and 80% RH) for 3 months (Stored Sample).

Ejection Property[2]

The ejection property was determined using an ejection test device having an injection needle as an ejection head as illustrated in FIG. 4. The injection needle was made of stainless steel and had the inner diameter of 360 μm, the outer diameter of 615 μm, the cut angle of the tip was 19 degrees, and the radius of curvature was 13 μm. The ink was regularly supplied from the inside of the needle to the tip by a pump and the excess ink was recovered by flowing over on the surface of the needle. The flux of the ink was 0.75 ml/min. The injection needle was positioned at a distance of 300 μm from the surface of the lithographic printing plate precursor mounted on a counter electrode, and while applying a bias voltage of 700 V, a pulse voltage of 800 V and 100 μsec width was additionally applied at a frequency of 2.5 kHz as an ejection voltage.

An ejection ratio (%) was calculated from a number of dots practically printed on the lithographic printing plate precursor to a number of the pulse applied and used for indicating the ejection property.

Conditions I and II used have the same meanings as described in the measurement of the charging property above, respectively.

Shape of Printed Dot[3]

<Thickness of Dot>

The ejection of the ink was conducted according to the method described in the evaluation of ejection property described above. A thickness of the dot printed on the lithographic printing plate precursor was measured using a photograph of scanning electron microscope (SEM). The thicker the dot printed, the more concentrated the particles in the ejected ink.

<Shape of Dot>

Using the lithographic printing plate precursor having the dot image described above, the occurrence of blur or distortion of dot was observed by an optical microscope and the photograph of scanning electron microscope (SEM).

Image Reproducibility[4]

A servo plotter (DA 8400, manufactured by Graphtech Co.) able to write an output from a personal computer was converted so that an ink ejection head as shown in FIG. 2 was mounted on a pen plotter section, and the lithographic printing plate precursor described above was placed on a counter electrode positioned at a distance of 500 μm from the ink ejection head. Printing was performed on the lithographic printing plate precursor using Oil-Based Ink (IK-101) described above to conduct plate-making. Successively, heating was carried out for 30 seconds using a Ricoh Fuser Model 592 (manufactured by Ricoh Co., Ltd.) so as to adjust the surface temperature of the ink image formed to 90° C., thereby sufficiently fixing the image area.

The image formed on the resulting printing plate was visually observed under an optical microscope of 200 magnifications.

Press Life[5]

The printing plate prepared according to the method described in the evaluation of image reproducibility described above was subjected to printing using, as dampening water, a solution prepared by diluting SLM-OD (manufactured by Mitsubishi Paper Mills, Ltd.) 30 times with water, Oliver 94 Type (manufactured by Sakurai Seisakusho Co., Ltd.) as a printing machine, and black ink for offset printing.

A number of prints having clear images without the occurrence of background stain and disappearance of fine lines and fine letters was determined to evaluate the press life.

As is apparent from the results shown in Table E2, the excellent charging property is obtained only in Example 101. Further, the change of the charging property is small in Example 101 with the lapse of time and practically acceptable.

On the contrary, both the charging amount of the ink and the charging ratio of particle are small in Comparative Examples 101A and 101B. Further, in Comparative Examples 101A and 101B, both of the ink exhibit the large change in the charging property and particularly, the charging ratio of particle severely decreases with the lapse of time.

With respect to the results on ejection property and the shape of printed dot on the lithographic printing plate precursor, both the fresh sample and the stored sample had good properties only in Example 101. Specifically, in Comparative Examples 101A and 101B, the thickness is low as 1 μm or less and blur of the dot is observed.

As the result of the observation of the image formed by the plate-making, only the ink of Example 101 exhibits the good image reproducibility in both the fresh sample and the stored sample.

Regarding to the press life of the printing plate subjected to the offset printing, more than 3,000 sheets of good prints are obtained only in Example 101. In Comparative Examples 101A and 101B, the disappearance of image occurs from the start of printing and the printing plates can not be practically used. Further, the image area on each printing plate disappears after the printing of about 1,000 sheets or less.

From these results, it can be seen that the oil-based ink of the present invention has the large charging amount of the whole ink and the very large charging ratio of particle as 80%. As a result, at the ejection of ink in the electrostatic type ink jet process, the ink meniscus is stably formed on the ejection electrode, the charged particles in the ink rapidly move electrophoretically under controlling the voltage to concentrate the particles, and the ink is ejected from the ejection electrode as it is onto the printing plate precursor as an image receiving material to print. Further, even when the oil-based ink of the present invention is stored under the severe conditions, it maintains the dispersion stability and charging property similar to those of the fresh sample, and provides the images of good quality.

Thus, the dot formed on the printing plate precursor is thick as the thickness of 1.5 μm or more and has the circular shape, and blur or distortion of the dot is not observed. Moreover, due to the sufficient thickness of the image area, the printing plate thus prepared exhibits the good property on press life as more than 3,000 sheets of prints as the result of printing.

On the contrary, the ink of Comparative Examples 101A and 101B have the small charging amount of the whole ink and the small charging ratio of particle as 50% or less. Therefore, both the ejection property and the concentration of particles are insufficient and the image formed by the plate-making is poor.

In summary, the oil-based ink of the present invention only exhibits the good properties even after the lapse of time.

EXAMPLES 102 TO 106

Each of the oil-based ink was prepared in the same manner as in Example 101 except for using 50 g (as a solid basis) of each of the resin particles shown in Table F2 below in place of 50 g (as a solid basis) of Resin Particle (LA-101) employed in Oil-Based Ink (IK-101). The properties of each ink was evaluated in the same manner as in Example 101.

TABLE F2

| Example | Oil-Based Ink | Resin Particle | Charging Property (Condition II) | |
|---|---|---|---|---|
| | | | Alternating Electric Conductivity (pS/cm) | Charging Ratio of Particle (%) |
| 102 | IK-102 | LA-102 | 360 | 75 |
| 103 | IK-103 | LA-103 | 370 | 70 |
| 104 | IK-104 | LA-104 | 340 | 75 |
| 105 | IK-105 | LA-105 | 330 | 73 |
| 106 | IK-106 | LA-106 | 345 | 76 |

Each of Oil-Based Ink (IK-102) to (IK-106) exhibited the charging property similar to that of Oil-Based Ink (IK-101). As a result of the evaluation of the ejection property, shape of printed dot, image reproducibility, press life and dispersion stability, the results similar to those in Example 101 were obtained.

EXAMPLE 107
Preparation of Lithographic Printing Plate Precursor

A composition having the following component was placed in a paint shaker together with glass beads and dispersed for 80 minutes. Then, the glass beads were removed by filtration to obtain a dispersion.

| | |
|---|---|
| Silica: Silysia 445 (manufactured by Fuji Silysia Chemical Co., Ltd.) | 40 g |
| 20% Solution of Colloidal Silica: Snowtex C (manufactured by Nissan Chemical Industries, Ltd.) | 200 g |
| 50% Dispersion of Clay | 40 g |
| 10% Solution of Polyvinyl Alcohol: PVA-117 (manufactured by Kuraray Co., Ltd.) | 120 g |
| Melamine Resin | 2.0 g |
| Ammonium Chloride | 0.2 g |
| Water | 50 g |

On a support of ELP-2 Type Master (manufactured by Fuji Photo Film Co., Ltd.) used as an electrophotographic lithographic printing plate precursor for small-scale commercial printing, the above-described composition was coated using a wire bar and dried at 110° C. for 10 minutes to form an image-receiving layer having a coating amount of 6 g/m², thereby obtaining a lithographic printing plate precursor.

The surface smoothness of the image-receiving layer was 300 (second/10 ml) in terms of the Bekk smoothness, and the contact angle with water thereof was 0 degree.

The printing plate precursor was subjected to the plate-making in the same manner as in Example 101 except for using Oil-Based Ink (IK-107) shown below in place of Oil-Based Ink (IK-101) employed in Example 101.
Preparation of Oil-Based Ink (IK-107)

A mixture of 500 g of Resin Particle (LB-105) according to Preparation Example 105 of Resin Particle (LB) and 4 g of Victoria Blue B was heated to temperature of 100° C. and stirred for 3 hours under heating. After cooling to room temperature, the mixture was passed through a nylon cloth of 200 mesh to remove the remaining dye, thereby obtaining a blue-colored resin particle dispersion having an average particle size of 0.40 μm.

Then, 250 g of the above-described blue-colored resin particle dispersion and 0.20 g of zirconium naphthenate, as a charge control agent, were diluted with one liter of a solvent mixture of hexamethyl disiloxane and Isopar G (3:2 in a ratio by weight), thereby preparing blue-colored oil-based ink.

The properties of the ink thus obtained were evaluated in the same manner as in Example 101. The results obtained are shown in Table G2 below. As can be seen from the results, the charging property, ejection property and shape of printed dot are good even after the lapse of time.

TABLE G2

|  | Condition I | Condition II |
| --- | --- | --- |
| Alternating Electric Conductivity (pS/cm) | 500 | 495 |
| Charging Ratio of Particle (%) | 95 | 92 |
| Ejection Property | 100% | 100% |
| Shape of Dot | true circle | true circle |
| Thickness of Dot | 1.9 μm | 1.9 μm |

Then, using the printing plate thus prepared the printing was conducted in the same manner as in Example 101. The prints obtained had clear images without the occurrence of stain in the non-image area similar to those obtained in Example 101. The press life was good as 10,000 sheets or more. With the oil-based ink stored under the high temperature and high humidity conditions (Condition II) as described in Example 101, coagulation and precipitation of the resin particles were not observed, the change in the charging property was small, and the ejection property and shape of printed dot were substantially same as those obtained by using the fresh ink.

EXAMPLES 108 TO 123

The plate-making and printing were conducted in the same manner as in Example 107 using each of the oil-based ink shown in Table H2 below in place of Oil-Based Ink (IK-107). Each of the oil-based ink was prepared in the same manner as in Example 101 except for using 50 g (as a solid basis) of each of the resin particles shown in Table H2 below in place of 50 g (as a solid basis) of Resin Particle (LA-101) employed in Oil-Based Ink (IK-101).

TABLE H2

| Example | Oil-Based Ink | Resin Particle |
| --- | --- | --- |
| 108 | IK-108 | LB-102 |
| 109 | IK-109 | LB-103 |
| 110 | IK-110 | LB-104 |
| 111 | IK-111 | LB-106 |
| 112 | IK-112 | LB-107 |
| 113 | IK-113 | LB-108 |
| 114 | IK-114 | LB-117 |
| 115 | IK-115 | LB-118 |
| 116 | IK-116 | LB-109 |
| 117 | IK-117 | LB-110 |
| 118 | IK-118 | LB-113 |
| 119 | IK-119 | LB-114 |
| 120 | IK-120 | LB-115 |
| 121 | IK-121 | LB-116 |
| 122 | IK-122 | LB-119 |
| 123 | IK-123 | LB-121 |

The properties of each ink thus obtained were evaluated in the same manner as in Example 101. The alternating electric conductivity of the ink was in a range of from 450 to 500 pS/cm, and the charging ratio of particle thereof was in a range of from 90 to 95%. The image reproducibility was good same as in Example 5. As a result of the printing, each printing plate exhibited press life of 10,000 or more.

In case of using the oil-based ink stored under the high temperature and high humidity conditions (Condition II) as described in Example 101, the good dispersion stability, image reproducibility and press life similar to those obtained by using the fresh ink (Fresh Sample) were obtained.

EXAMPLE 124

Preparation of Water-Resistant Support

Using wood free paper having a basis weight of 100 g/m² as a substrate, one surface of the substrate was coated with a coating for an under layer having the composition shown below using a wire bar to form the under layer having a dry coating amount of 10 g/m². The smoothness of the surface of the under layer was 150 (second/10 ml) in terms of the Bekk smoothness, and it was then adjusted to 1,500 (second/10 ml) by conducting a calender treatment.

Coating for Under Layer

| Silica Gel | 10 parts |
| --- | --- |
| SBR Latex (50% aqueous dispersion, Tg: 25° C.) | 92 parts |
| Clay (45% aqueous dispersion) | 110 parts |
| Melamine (80% aqueous solution) | 5 parts |
| Water | 191 parts |

The other surface of the substrate was coated with a coating for a backcoat layer having the composition shown below using a wire bar to form the backcoat layer having a dry coating amount of 12 g/m². Then, a calender treatment was conducted so that the smoothness of the backcoat layer is adjusted to about 50 (second/10 ml) in terms of the Bekk smoothness.

Coating for Backcoat Layer

| Kaolin (50% aqueous dispersion) | 200 parts |
| --- | --- |
| Polyvinyl Alcohol (10% aqueous solution) | 60 parts |
| SBR Latex (solid content: 49%, Tg: 0° C.) | 100 parts |
| Primary Condensate of Melamine Resin (solid content: 80%, Sumirez Resin SR-613) | 5 parts |

Preparation of Lithographic Printing Plate Precursor

A mixture of 100 g of zinc oxide, 16 g of Binder Resin (B-101) shown below, 2 g of Binder Resin (B-102) shown below, 0.15 g of benzoic acid and 155 g of toluene was dispersed using a wet-type dispersing machine (Homogenizer, manufactured by Nippon Seiki Co., Ltd.) at a rotation of 6×10³ r.p.m. for 8 minutes to prepare a coating composition for an image-receiving layer.

Binder Resin (B-101)

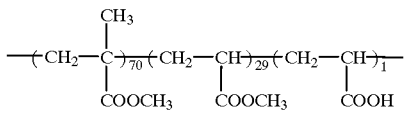

(weight ratio)

Mw: 6 x 10⁴

Binder Resin (B-102)

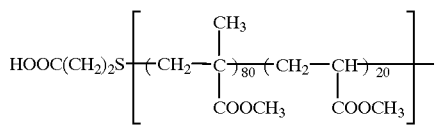

(weight ratio)

Mw: 9 x 10³

The resulting coating composition was coated on the above described water-resistant support using a wire bar and dried to form an image-receiving layer having a coating amount of 10 g/m², thereby preparing a lithographic printing plate precursor. The surface smoothness of the image-receiving layer was 250 (second/10 ml) in terms of the Bekk smoothness, and the contact angle with water thereof was 102 degrees.

Preparation of Oil-Based Ink (IK-124)

Ten grams of Resin for Dispersion Stabilization (P-101) described above, 10 g of black pigment (Microlith Black CT, manufactured by Ciba-Geigy Ltd.) and 113 g of Isopar E were placed in a paint shaker together with glass beads and dispersed for 6 hours, followed by removing glass beads to obtain a black-colored dispersion.

Forty grams (as a solid basis) of Resin Particle (LB-120) according to Preparation Example 120 of Resin Particle (LB), 66 g of the above-described black-colored dispersion and 0.02 g of octadecyl vinyl ether-maleic acid monodecy-lamide copolymer were diluted with hexamethyl disiloxane to make one liter, thereby preparing black-colored Oil-Based Ink (IK-124). The alternating electric conductivity of the ink was 490 pS/cm and the charging ratio of particles thereof was 95%.

The plate-making was conducted in the same manner as in Example 101 except for using Oil-Based Ink (IK-124) in place of Oil-Based Ink (IK-101). The resulting printing plate had clear images without disappearance of fine lines and fine letters. The thickness of dot was 2.0 µm and the dots had circular shapes without blur and distortion.

The printing plate was then subjected to printing using a full-automatic printing machine (AM-2850, manufactured by AM Co., Ltd.) provided with an oil-desensitizing solution (ELP-E2, manufactured by Fuji Photo Film Co., Ltd.) in an etcher part thereof and a solution prepared by diluting ELP-E2 four times with distilled water, as dampening water, in a dampening water saucer thereof, and black ink for offset printing.

As a result, more than 3,000 sheets of prints having clear images without the occurrence of background stain were obtained.

In case of using the oil-based ink stored under the high temperature and high humidity conditions (Condition II) as described in Example 101, the good results similar to those obtained by using the fresh ink (Fresh Sample) were obtained.

While the invention has been described in detail and with reference to specific embodiments thereof, it will be apparent to one skilled in the art that various changes and modifications can be made therein without departing from the spirit and scope thereof.

What is claimed is:

1. An oil-based ink for an electrostatic ink jet process, comprising:
   a nonaqueous carrier liquid having an electric resistance of 10⁹ Ωcm or more and a dielectric constant of 3.5 or less; and
   chargeable resin particles dispersed in the nonaqueous carrier liquid,
   wherein the resin particles dispersed are copolymer resin particles obtained by a polymerization granulation of a solution containing:
   at least one monofunctional monomer (A) which is soluble in a nonaqueous solvent and becomes insoluble in the nonaqueous solvent by polymerization;
   at least one monofunctional monomer (B) having an amino group represented by formula (I) shown below and being copolymerizable with the monomer (A); and
   at least one resin for dispersion stabilization (P) comprising a component represented by formula (II) shown below:

(I)

wherein R¹ and R², which may be the same or different, each independently represents a hydrogen atom or a hydrocarbon group having from 1 to 22 carbon atoms, or R¹ and R² may combine with each other to form a ring together with the nitrogen atom in formula (I);

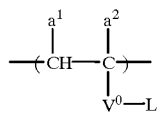

(II)

wherein, V⁰ represents —COO—, —OCO—, (CH₂)ᵣCOO—, —(CH₂)ᵣOCO—, —O— or

wherein X represents a direct bond, —O—, —OCO— or —COO—; r represents an integer of 1 to 12; L represents an alkyl group having from 8 to 32 carbon atoms or an alkenyl group having from 8 to 32 carbon atoms; a¹ and a², which may be the same or different, each independently represents a hydrogen atom, a halogen atom, a cyano group, a hydrocarbon group, —COO—D¹ or —COO—D¹ linked through a hydrocarbon group, wherein D¹ represents a hydrogen atom or a hydrocarbon group.

2. The oil-based ink according to claim 1, wherein the solution from which the copolymer resin particles are obtained further contains at least one monofunctional monomer (C) having a —PO₃H₂ group and being copolymerizable with the monomer (A).

3. The oil-based ink according to claim 1, wherein the resin for dispersion stabilization (P) contains a polymerizable double bond group represented by formula (III) shown below at one terminal of the polymer main chain thereof or in a substituent of a copolymer component constituting the polymer chain thereof:

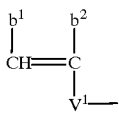

(III)

wherein, $V^1$ represents —COO—, —OCO—, —(CH$_2$)COO—, —(CH$_2$)$_s$OCO—, —O—, —SO$_2$—, —CONHCOO—, —CONHCONH—, —CON(D$^2$)—, —SO$_2$N(D$^2$)— or a phenylene group, wherein D$^2$ represents a hydrogen atom or a hydrocarbon group having from 1 to 22 carbon atoms, and s represents an integer of 1 to 4; and $b^1$ and $b^2$, which may be the same or different, each has the same meaning as defined for $a^1$ or $a^2$ in formula (II).

4. The oil-based ink according to claim 1, wherein the solution from which the copolymer resin particles are obtained further contains at least one monomer (D) represented by formula (IV) shown below:

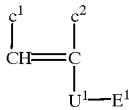

(IV)

wherein $E^1$ represents:

an aliphatic group having at least 8 carbon atoms; or a substituent having a total number of atoms of 8 or more, provided that hydrogen atoms directly attached to a carbon or nitrogen atom are excluded from the number, and represented by formula (IVa):

—(A$^1$—B$^1$)$_m$—(A$^2$—B$^2$)$_n$R$^{21}$   (IVa)

wherein $R^{21}$ represents a hydrogen atom or an aliphatic group having from 1 to 18 carbon atoms; $B^1$ and $B^2$, which may be the same or different, each independently represents —O—, —S—, —CO—, —CO$_2$—, —OCO—, —SO$_2$—, —N(R$^{22}$)—, —CON(R$^{22}$)—, —N(R$^{22}$)CO—, —N(R$^{22}$)SO$_2$—, —SO$_2$N(R$^{22}$), —NHCO$_2$— or —NHCONH—, wherein $R^{22}$ has the same meaning as defined for $R^{21}$ above; $A^1$ and $A^2$, which may be the same or different, each independently represents at least one group selected from the group consisting of groups represented by formula (IVb) shown below and hydrocarbon groups having from 1 to 18 carbon atoms:

(IVb)

wherein $B^3$ and $B^4$, which may be the same or different, each has the same meaning as defined for $B^1$ or $B^2$ above; $A^4$ represents a hydrocarbon group having from 1 to 18 carbon atoms; $R^{23}$ has the same meaning as defined for $R^{21}$ above; and m, n and p, which may be the same or different, each independently represents an integer of from 0 to 4, provided that the sum of m and n is not 0, $U^1$ represents —COO—, —CONH—, —CON(E$^2$)—, wherein $E^2$ represents an aliphatic group or a substituent represented by formula (IVa) described above, —OCO—, —CONHCOO—, —CH$_2$COO—, —(CH$_2$)$_s$OCO—, wherein s represents an integer from 1 to 4, —O— or —C$_6$H$_4$—COO—; and $c^1$ and $c^2$, which may be the same or different, each independently presents a hydrogen atom, an alkyl group, a halogen atom, a cyano group, —COO—E$^3$ or —CH$_2$COO—E$^3$, wherein E$^3$ represents an aliphatic group.

5. The oil-based ink according to claim 4, wherein the solution from which the copolymer resin particles are obtained further contains at least one monofunctional monomer (C) having a —PO$_3$H$_2$ group and being copolymerizable with the monomer (A).

6. The oil-based ink according to claim 1, wherein the monofunctional monomer (A) is a monomer represented by the following formula (V):

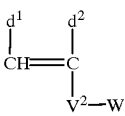

(V)

wherein $V^2$ represents —COO—, —OCO—, —CH$_2$OCO—, —CH$_2$COO—, —O—, —CONHCOO—, —CONHOCO—, —SO$_2$—, —CON(D$^3$)—, —SO$_2$N(D$^3$)— or a phenylene group, wherein D$^3$ represents a hydrogen atom or an aliphatic group having form 1 to 8 carbon atoms; W represents a hydrogen atom or an aliphatic group having form 1 to 6 carbon atoms; and $d^1$ and $d^2$, which may be the same or different, each independently presents a hydrogen atom, a halogen atom, a cyano group, a hydrocarbon group, —COO—G$^1$ or —CH$_2$—COO—G$^1$, wherein $G^1$ represents a hydrogen atom or a hydrocarbon group.

7. The oil-based ink according to claim 1, wherein the monomer (B) is used in an amount of from 1 to 45% by weight based on the total amount of the monomer (A) employed.

8. The oil-based ink according to claim 2, wherein the monomer (C) is used in an amount of from 0.2 to 2.5 in terms of a molar ratio of monomer (B)/monomer (C).

9. The oil-based ink according to claim 1, wherein the resin for dispersion stabilization (P) is a random copolymer comprising the component represented by formula (II) and a component corresponding to a monomer copolymerizable therewith.

10. The oil-based ink according to claim 1, wherein the resin for dispersion stabilization (P) is a block copolymer comprising the component represented by formula (II) and a component corresponding to a monomer copolymerizable therewith.

11. The oil-based ink according to claim 3, wherein the resin for dispersion stabilization (P) is a resin represented by the following formula (VIa):

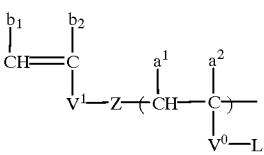

(VIa)

wherein Z represents a direct bond or a connecting group attached to one terminal of the polymer main chain; and the symbols other than Z have the same meanings as defined in formulae (II) and (III), respectively.

12. The oil-based ink according to claim 3, wherein the resin for dispersion stabilization (P) is a resin represented by the following formula (VIb):

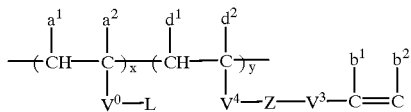 (VIb)

wherein, $a^1$, $a^2$, $V^0$, L, $b^1$, $b^2$, $d^1$ and $d^2$ each has the same meaning as defined in formulae (II), (III) and (V); x and y each represents a weight ratio of each repeating unit; $V^3$ and $V^4$, which may be the same or different, each has the same meaning as defined for $V^1$ in the formula (III); and $Z^0$ represents a group connecting $V^3$ and $V^4$ and comprising at least one of a carbon atom and a hetero atom.

13. The oil-based ink according to claim 4, wherein the monomer (D) is used in an amount of from 0.5 to 20% by weight based on the total amount of the monomers employed.

14. The oil-based ink according to claim 1, wherein the oil-based ink further comprises a charge control agent.

15. The oil-based ink according to claim 14, wherein the charge control agent is metal soap, an organic phosphoric acid and a salt thereof, an organic sulfonic acid and a salt thereof, or an amphoteric surface active compound.

16. The oil-based ink according to claim 1, wherein the oil-based ink further comprises a coloring material.

17. A method for the preparation of a printing plate by an electrostatic ink jet process comprising ejecting an oil-based ink as claimed in claim 1 from an ejection head to an image receiving material to form an image on the image receiving material.

18. The method according to claim 17, wherein the image receiving material is a printing plate precursor having a lithographically printable hydrophilic surface.

19. The method according to claim 17, wherein the image receiving material is a printing plate precursor having a hydrophobic surface.

20. A method of recording an image by an electrostatic ink jet process, comprising the steps of:

providing an oil-based ink as claimed in claim 1;

forming ink meniscus at the tip of an ejection electrode for ejecting the ink;

forming an electric field between the ejection electrode and a counter electrode bearing a recording medium, so as to increase particle density in the ink meniscus upon electrophoretic concentration of particles, and to eject agglomerations of the particles away from the ejection electrode.

* * * * *